United States Patent [19]
Brault et al.

[11] Patent Number: 6,120,592
[45] Date of Patent: Sep. 19, 2000

[54] BIODEGRADABLE FILMS CONTAINING CASEINATE AND THEIR METHOD OF MANUFACTURE BY IRRADIATION

[76] Inventors: Denis Brault, c/o Madarne Carole Lemaire, Chemin des Lvs 8, 1010, Lausanne, Switzerland; Monique LaCroix, 340, rue Green, Saint-Lambert, Quebec, Canada, J4P 1T4; Mohamed Ressouany, 531 boul, des Praires, Laval, Quebec, Canada, H7N 4Z3

[21] Appl. No.: 09/069,227

[22] Filed: Apr. 27, 1998

[30] Foreign Application Priority Data

Apr. 25, 1997 [CA] Canada ................................. 2 203 746
Sep. 30, 1997 [CA] Canada ................................. 2 217 437

[51] Int. Cl.$^7$ .................... C09D 189/00; C09D 101/28
[52] U.S. Cl. .................................. 106/140.3; 106/156.5; 106/156.51; 106/159.1
[58] Field of Search ........................... 106/156.5, 156.51, 106/159.1, 140.3

[56] References Cited

U.S. PATENT DOCUMENTS

| | | | |
|---|---|---|---|
| 1,720,897 | 7/1929 | Hawling | 106/156.51 |
| 2,109,471 | 3/1938 | Drew | 106/156.51 |
| 3,619,222 | 11/1971 | Werle et al. | 106/156.5 |
| 5,019,403 | 5/1991 | Krochta | 426/89 |

OTHER PUBLICATIONS

Davis, K.J.A., (1987) No month avail. "Protein Damage and Degradation by Oxygen Radicals, I General Aspects", *J. Bio. Chem.*, vol. 262, 20, 9895–9901.

Davies, K.J.A. et al., (1987) No month avail., "Protein Damage and Degradation by Oxygen Radicals, II, Modification of Amino Acids," *J. Biol. Chem.*, vol. 262, 20, 9902–9907.

Davies, K.J.A., (1987) No month avail., "Prtoein damage and degradation by oxygen radicals, IV. Degradation of denatured protein," *J. Biol. Chem.*, vol. 262, 20, 9914–9920.

Gontard, N., et al., (1992) No month avail., "Edible wheat gluten films: influence of the main process variables on film properties using response surface methodology," *J. Food Sci.*, vol. 57, 1, 190–195.

McHugh, T.H. et al., "Milk–protein–based edible films and coatings," *Food Technol.*, Jan. 1994 97–103.

Motoki, M. et al., "$_{s1}$–Casein film prepared using trans-plutaminase," *Agric. Biol. Chem.*, 51, 993–996 (1987) No month avail.

*Primary Examiner*—David Brunsman
*Attorney, Agent, or Firm*—Gray Cary Ware & Freidenrich, LLP; Lisa A. Haile

[57] ABSTRACT

The packing and even the excessive packaging of products for human consumption is a current practice in the industrialized countries. As this packaging is made primarily of non-biodegradable polymers, they currently cause environmental problems. These environmental problems are found not only in industrialized countries but also in developing countries. This situation supported the development of various films, more ecological, starting from biodegradable elements containing polysaccharides, proteins and/or lipids. We developed a biodegradable protein film from a casein salt. Of dairy origin, casein is abundant and could even be recovered from unsold milk. The process of polymerization is induced by gamma irradiation. Indeed, the interaction of hydroxyl radicals with tyrosins present in protein creates a covalent bond (bityrosine). The addition of a plasticizing agent is essential in order to produce a more flexible and less friable film. The presence of glycerol does not inhibit the formation of bityrosine. It protects protein from the denaturation caused by irradiation, increases the deforming capacity and decreases the breaking strength of film. The biodegradation tests, carried out in our laboratories, showed that the film produced by gamma irradiation is accessible to the enzymatic attacks from *Pseudomonas fragi*.

20 Claims, 15 Drawing Sheets

BIODEGRADABLE FILMS CONTAINING CASEINATE AND THEIR METHOD OF MANUFACTURE BY IRRADIATION

FIELD OF THE INVENTION

The invention is connected to biodegradable films made containing proteins, particularly containing caseinate, and their method of manufacture.

BACKGROUND

Plastic materials are very present in our environment. They are found everywhere and they contribute considerably to improve the well-being of humans. The reasons justifying their industrial and domestic uses are that plastics are light materials, resistant, chemically inert and economical to produce.

The extent and usefulness of plastic materials are incalculable. In spite of their benefits, they presently cause a serious problem of environmental pollution which can no longer be ignore. The recycling or the re-use of some plastic compounds only partially improves the situation, thus the interest to develop partially or totally biodegradable films.

At present, consumers require greater quality and longer shelf lives for their foodstuffs. At the same time, they demand a reduction in the quantity of packing materials used. Plastic represents one of the principal components used for the packaging of our consumer products. In 1992, according to Canada's Green Plan, packaging accounted for approximately 30% of solid waste of Canadian municipalities. As packaging and other plastics are basically resistant to the attacks of bacteria present in nature, it is no longer ecologically acceptable to dispose of our plastic wastes by burying them underground or discharging into the ocean. Alternatives to these means of disposal are thus recycling, incineration, composting and biological breakdown. Following the sensitizing of federal authorities to this problem, a national protocol on packaging was signed in April 1990 which aims at reducing wastes coming from packaging by 50% before the year 2000 (Supply and Services Canada).

Over the last few years, the general population has become more sensitized to the problems of pollution caused by plastics. This made it possible to develop starch based plastic films which are currently on the market (Pledge, 1990). The presence of starch contributes to facilitate the microbial attack via the enzymatic systems. The ultimate result sought by the addition of starch is the loss of structural integrity which translates into a loss in the molecular weight of plastic films.

At present, an active research continues in order to produce a biodegradable film which would not be detrimental for the environment and which would have the characteristics of plastic packaging. Then, one must look for a compound which would be initially biodegradable, which would resist thermal denaturation and which would show certain properties of plastic packaging.

The majority of films which are considered biodegradable are formed simply by the solubilization of degradable components in a suitable solvent. Until now, research was undertaken on films containing polysaccharides, proteins and lipids alone or in combination. Usually, the fool films are formed starting from polymers of high molecular weight in order to provide a sufficiently resistant and adherent matrix. The characteristics of the matrix will depend on the chemical structure of the polymer, on the presence of plasticizing agents and on the way in which the film is applied to the surface of products. The application of coating films to the surface of products is done by steeping, pulverization or extrusion. The principal properties sought for packaging films are resistance, malleability, impermeability to gases and moisture and the possibilities of conditioning.

A polymer is obtained by the polymerization of a monomer in order to form continuous and/or branched polymeric chains. In the case of plastic components, this polymerization is generally carried out either by heat (thermoplastic) as for the poly-iminocarbonate (Li and Kohn, 1989), or by a photosynthesis with ultraviolet radiation as for the formation of acrylic resin and methacrylic (Ciardelli et al., 1989). It is also possible to obtain polyurethane by gamma irradiation (Shintani and Nakamura, 1991). At more than 25 kGy, the effect of irradiation on polymer is limited mainly to intermolecular polymerization with little or no degradation. Proteinic polymerization can be also carried out by enzymatic processes. Indeed, collagen polymers (Richard-Blum and Ville, 1988), casein $\alpha_{s1}$, (Moloki and Al, 1987) and fibrin (Kasai and Al, 1983) were obtained in this way.

A film's cohesive strength is linked to its polymeric and chemical structure, to the nature of solvent used, to the presence of plasticizing agents or additives and to the surrounding conditions during the formation of the film (Kester and Fennema, 1986).

A direct link exists between the cohesion of film and the length and the polarity of the chains of the polymer. A uniform distribution of the polar groupings along the polymeric chains increases cohesion by increasing the probability of ionic interactions and hydrogen bonding between the chains (Banker, 1966). Generally, when one increases the cohesive structure of a film, a reduction in its flexibility, its porosity and its permeability to gas, vapor and aqueous solutions is observed (Kester and Fennema, 1986). For example, the stability of the tertiary structure of a protein affects the formation of a film and the properties resulting from film, that is, molecular flexibility, contributes to the formation of cohesive films (Graham and Phillips, 1980).

The solvents used for the formation of edible films are limited to water, ethanol or a combination of both (Kester and Fennema, 1986). Tests with ammonia and acetic acid were carried out but a problem with odor limits their use. After its evaporation, ammonia has a persistent odor which is evident on the end product (Gontard et al., 1992).

The plasticizing agents are usually grouped in the polyol family such as glycerol, sucrose and others. They can be introduced in order to give flexibility to films thereby improving their mechanical properties. The plasticizing characteristic is obtained by reducing the intermolecular forces thus affecting the film structure and increasing the mobility of the polymer chains. However, the relaxation of the film structure reduces the ability of film to act as a barrier to the diffusion of several gases and vapors (Gennadios and Weller, 1990; Peyron, 1991).

Environmental conditions influence film cohesiveness. Excessive temperatures during drying result in rapid solvent evaporation. Theses conditions can prematurely immobilize the polymeric chains before they have gathered to form a continuous and coherent film (Banker, 1996). This can generate certain defects like micro-perforations or a non-uniform thickness which inevitably will increase the permeability of film.

Polysaccharide-Based Films

Many polysaccharides were experimentally evaluated for their capacity to form films. Among others, one thinks of alginate, pectin, carrageenans, starch and cellulose derivatives. Polysaccharide polymers show excellent $O_2$ impermeability, however, they offer minimal resistance to moisture due to their absorbent character. Only films containing cellulose derivatives have remarkable impermeability to water (Kanig and Goodman, 1962; Kester and Fennema, 1986; Peyron, 1991). The principal inconvenience of polymers containing polysaccharides is that they are poor barrier to micro-organisms (Kester and Fennema, 1986; Peyron, 1991; Torres and Karel, 1985). Tests carried out with coated ground beef showed these films to be an effective protection against oxidation but showed no protection against surface bacteria (Peyron, 1991).

Lipid and Wax Based Films

Lipid based films offer excellent impermeability to moisture because of their low polarity (Feuge, 1955, Kester and Fennema, 1986; Peyron, 1991).

So far, a great range of lipids were used for the preparation of film consisting of monoglycerides, natural waxes and surface agents.

Monoglycerides

A characteristic of solid state monoglycerides is their elastic property. The majority of lipids of this type can extent up to 120% of their initial length before they break whereas acetylated glycerol monostearate can extend up to 800% its initial length before it breaks (Kester and Fennema, 1986; Peyron, 1991). It is thus a product which can be stretched easily and which shows strength with respect to mechanical constraints. These characteristics are interesting for the production of coating film.

The permeability of films produced using acetylated monoglycerides to steam is largely lower than films containing polysaccharides but it is nevertheless higher than those films containing cellulose derivatives (Kanig and Goodman, 1962). Resistance of acetylated monoglycerides to moisture transport is very dependent on the gradient of steam pressure on each side of the film (Lovergren and Feuge, 1954). Coating by acetoglyceride films made it possible to show that these provided a certain protection against surface microbial contamination (Peyron, 1991).

Natural Waxes

Natural waxes are more resistant to moisture transport than all other lipidic or non-lipidic films. On the other hand, the waxes do not adhere very well to very wet surfaces due to their very hydrophobic character (Kester and Fennema, 1988). In order to avoid any process of anaerobic degradation during the coating of a food, it is sometimes preferable to add acetylated monoglycerides to waxes in order to increase their flexibility and therefore to decrease their resistance to water and gas permeability (Kester and Fennema, 1986; Peyron, 1991).

Surface Agents

Surface agents or surface-active lipids reduce water activity ($a_w$ which represents available water) on the surface of a foodstuff. They have the property to reduce the rate of moisture loss during storage. The $a_w$ variable influences the deterioration mechanisms of foodstuffs. A weak $a_w$ value delays microbial growth as well as surface chemical and enzymatic reaction (Kester and Fennema, 1986). Therefore, coating food with a surface agent should contribute to modify these modes of deterioration by controlling the migration of water on the surface of food.

The ability to reduce evaporation is influenced by the structure of the surface agent used. The most effective surface agents are those which have a chain of 16 to 18 carbons. The presence of a double bond in the carbon chain strongly decreases the proofing properties of the coating (Kester and Fennema, 1986; Peyron, 1991).

Proteinic Films

Proteinic films offer better mechanical properties but their permeability to gases and moisture are variable. An acid treatment (towards the isoelectric point) improves resistance to moisture transport since this treatment decreases the mobility of the polymer chains (Kester and Fennema, 1986; Peyron, 1991).

Whey Proteins

Whey (mainly α-lactalbumine and β-lactoglobuline) or small-milk proteins, form a thermoirreversible gel, which is pH-dependent and heat sensitive (Schmidt and Morris, 1984; Vuillemard and Al, 1989). As an example, heating of whey proteins at temperature between 70 and 85° C. and to a concentration higher than 5%, forms a thermoirreversible gel. This gel develops by the formation of new intermolecular disulphide bonds (Vuillemard and Al, 1989).

The gelling process of whey proteins is strongly influenced by the pH of the medium during heating since a $pH \geq 6.5$ decreases the intermolecular interaction (Schmidt and Morris, 1984; Xiong, 1992). High ionic forces seem to increase proteinic stability probably through an increase of the proteins' capacity of hydration (solubility) (Xiong, 1992).

Soya Proteins

Soya proteins primarily form a hydrogel and are very susceptible to denaturation (Schmidt and Morris, 1984). These proteins are made up of 4 sub-units (2S, 7S, 11S and 15S), of high molecular weights (300,000 to 600,000) and have highly complex quaternary structures (Delisle, 1984). Generally, the gelling of soya proteins is a thermally induced phenomenon by the preparation of solution containing a concentration of at least 7% protein and at temperatures of 100° C. or more. Technical problems have limited the use of soya proteins to dairy product applications such as "tofu" and various cheeses (Schmidt and Morris, 1984).

Gluten

Gluten proteins, such as gliadine and glutenine, originate in corn flour. Gliadine is mainly hydrophobic and viscous whereas glutenine is absorbent and elastic. The elastic and cohesive characters of gluten are mainly due to the presence of disulphide bridges (Gennadios and Weller, 1990). Gluten concentration as well as the pH of proteinic solutions are the principal factors affecting the mechanical properties of gluten films. pH and the ethanol concentration affect opacity, solubility and the permeability of films to steam (Gontard and Al, 1992). Films containing gluten remain very promising but their permeability to water currently limits their development (Gennadios and Weller, 1990; Gontard and Al, 1992).

Zeine

Zeine is a protein isolated from corn. It is soluble in ethanol. It forms films with very good barrier properties to steam but its study is still limited (Kanig and Goodman, 1962; Kester and Fennema, 1986).

Casein

Bovine casein is an abundant, economic and easily accessible protein. Casein alone roughly accounts for 80% of the total proteins in cow's milk (Schmidt and Morris, 1984). It can be isolated from skimmed milk either by acidification with mineral acid, or by acidification with mixed bacterial cultures (Vuillemard and Al, 1989). The cost of 454 g of whole casein or caseinate amounts to approximately 4.

It is a phosphoprotein with amphiphilic characteristics which binds strongly to the $Ca^{2+}$ and $Zn^{2+}$ ions (Schmidt and Morris, 1984; Vuillemard et al., 1989). Due to their absorbent character, casein films do not produce an effective barrier to moisture. On the other hand, it can act as an emulsifying agent and create a stable casein-lipid emulsion (Avena-Bustillos and Krochta, 1993). The gas and moisture barrier properties of casein-based films can be improved by the polymerization of the protein with calcium ($Ca^{2+}$) but also by adjusting the pH of the medium at the isoelectric point of casein. The adjustment at the isoelectric point optimizes the protein—protein interactions, modifies the molecular configuration and would influence the mass transfer properties (Krochta, 1991 and Avena-Bustillos and Krochta, 1993).

Dairy proteins, including casein, remain a promising choice for possible production of edible film formation to meet the demands of environmentalists on packaging (McHugh and Krochta, 1994).

Composite Films

Edible films can be of heterogenous nature i.e. formed starting from a mixture of polysaccharides, proteins and/or lipids. This approach allows for the beneficial use of the functional characteristics of each film component. The preparation of composite films imposes an emulsification of the lipidic material in an aqueous phase. The preparation technique of hydrophobic films influences its barrier properties. A film formed starting from a dispersed distribution of the hydrophobic material offers weak barrier properties to steam, compared to films with a continuous layer (Martin-Polo et al., 1992). A dispersed distribution is due to the difference in polarity between the support (example: methyl cellulose) and the hydrophobic material (technique of emulsion).

Sometimes, a period of heating is necessary in order to liquefy waxes or the lipids used. This can create a thermal denaturation, structural modifications of the other components (polysaccharides or proteins) and, in some cases, the evaporation of part of the solvent (Kester and Fennema, 1986; Peyron, 1991). The pH of the medium can strongly influence the solubility of a film component as well as its concentration. Then, the choice of components, their concentrations and the conditions of the medium is crucial for the formation of film.

An example of composite film is that developed by Kamper and Fennema (198a and b). Their film is composed of ester cellulose and a mixture of fatty acid (palmitic and stearic acids). This film shows a permeability to steam comparable to that of inedible vinyl polychloride films (VPC) and low density polyethylenes (LDPE).

The composite protein-lipid films developed by Sian and Ishak (1990) which were made from soya bean milk show a dependence of films to the pH of the medium. The films prepared with a basic pH contain a greater proportion of proteins, minerals, carbohydrates and water and less fat content than those formed with an acidic pH. A basic pH causes an increase in the emulsifying capacity of the proteins which tends to disperse the fat globules in milk. Thus, the films made with basic pH, will incorporate less fat content. With an acidic pH (lower than the isoelectric area), the moisture content of films is very weak since acidification encourages the precipitation of proteins and the formation of insoluble complexes (Sian and Ishak, 1990).

In order to reduce packaging waste, research continues on plastic film formation in the presence of starch. They are composite but inedible films. The addition of starch is polyethylene films tends to produce a porous structure. As the covalent bonds between starch and polyethylene are not truly formed during conditioning, the incorporation of starch produces discontinuities in the film matrix (Lim et al., 1992). The small starch particles produce less severe discontinuities in the matrix than the large particles.

The presence of starch is certainly not without effect on the mechanical properties of polyethylene films. As the starch contents increase, the stretching strength, the percentage of elongation and opacity decrease, whereas the thickness of film increases. The loss of elastic properties is less with smaller starch particles than large one (Lim et al., 1992).

Selection of Substrates for the Formation of a Film

According to various studies on edible films, it seems that dairy proteins have good properties for the formation of a film. Casein salts seem to be a judicious choice because of their greater solubility than native casein. A minimal quantity of proteins is necessary in order to obtain a film which can be manipulated while still having resistance and adequate flexibility. This source of proteins is, moreover, very accessible and inexpensive. Because of these considerations, we chose caseinate extracts for the formation of a proteinic film.

Casein and Caseinates

Bovine casein is composed of four major proteinic complexes, named $\alpha_{A1 \; and \; 2}$, β- and κ-caseins. All in all, a casein molecule consists of a primarily hydrophobic core of α and of β-casein and surrounded by κ-casein on the surface (Schmidt and Morris, 1984). The stability of micelles is ensured by the κ-caseins and the calcium colloidal phosphates found on the periphery (Schmidt and Morris, 1984). Casein contains many uniformly distributed proline residues. That gives it an open structure thus limiting the formation of alpha helixes and beta layers (Modler, 1985). This open conformation shows a certain resistance to the thermal denaturation and offers an easy access to the enzymatic attacks (Schmidt and Morris, 1984; Vuillemard et al., 1989, McHugh and Krochta, 1994).

Caseinates are obtained either by the acidification with mineral acid (HCl or $H_2SO_4$), or by the acidification by mixed cultures made up of Streptococcus subspecies *lactis* and/or *cremoris,* at the isoelectric point of casein (pH of 4,6). The neutralization of the insoluble precipitates of casein or lactic acids by alkalis allows for the dissolution in salts of sodium of calcium, potassium, magnesium, or ammonium (Schmidt and Morris, 1984; Vuillemard et al., 1989; McHugh and Krochta, 1994). The solubilized caseinates are dehydrated thereafter. Salts of caseins thus obtained are soluble with pH higher than 5.5

The Polymerization Process

The polymerization of proteinic solution is possible via hydroxyl radicals (•OH). These radicals are formed by the radiolysis of water, induced by gamma radiation of $Co^{60}$ (Fricke and Hart, 1966).

Reaction Mechanisms

The irradiation of a $Co^{60}$ protein solution in the presence of nitrogen protoxide (100% $N_2O$) produces mainly •OH radicals thanks to the interaction of the solvated electron with a molecule of $N_2O$.

Irradiation under 100% $N_2O$ produces approximately 8% of hydrogen radical (•H) (Adams et al., 1971; Singh and Singh, 1983; Singh and Vadasz, 1983). However, irradiation of a bovine serum albumin solution (BAS) under an atmosphere of 100% $N_2O$ or 100% $N_2$ and in the presence of radicalizing absorber (for example: T-butyl alcohol, mannitol, uric acid) showed that the •H radical is not involved in the formation of covalent bonds or the process of fragmentation (Davies et al., 1987a).

$N_2O$ is a very stable gas and is generally inert at room temperature. Its dissociation begins at more than 300 degrees Celsius where it becomes a powerful oxidizing agent (Merck & Co., Inc., 1960).

Irradiation in the presence of oxygen ($O_2$) produces superoxide radicalizing ions (•$O_2$) either by the direct interaction of $e^-_{aq}$ with an $O_2$ molecule, or by the indirect interaction of an •H radical with an $O_2$ molecule.

TABLE 1

Reactional mechanism of the solvate electron and the •H radical with the oxygen of the medium $e^-_{aq} + O_2 \rightarrow \cdot O_2^-$
$\cdot H + O_2 \rightarrow \cdot HO_2 \rightarrow \cdot O_2^- + H^+$ At neutral pH, the radical hydrodioxyle (•$HO_2$) is quickly deprotonized ($pK_a$ 4.8) to form even more superoxide radicals (Ferradini and Pucheault, 1983 and Fridovich, 1983).

The exposure to •OH radicals alone induces a polymerization with little or no fragmentation, whereas the simultaneous exposure to the radicals •OH+•$O_2^-$(+$O_2$) induced, at the same time, a polymerization and a fragmentation. The exposure to the radicalizing ion •$O_2^-$ only, does not have any effect on the molecular weight (Davies, 1987). In a process of polymerization, one desires the creation of covalent bonds and to avoid fragmentation. Thus, the use of •OH radicals alone is essential for the formation of a polymer. Therefore, irradiation under an atmosphere saturated with $N_2O$ is of primary importance.

Interactions of Amino Acids with Free Radicals

Some amino acids are more likely than others to interact with •OH radicals. It is the case with molecules of cysteine, histidine, tryptophan and tyrosin (Delincée, 1983; Yamamoto, 1977). The tyrosin molecules can be formed by the addition of a hydroxyl grouping (OH) on a phenylalanine molecule during irradiation. All the amino acid residues can interact with •OH radicals and become radicals themselves. However, in the majority of cases, the amino acid radicals decrease (lose their radicalizing state) without having interacted with the medium (Davies et al., 1987a).

The exposure of protein to •OH radicals under an $N_2O$ atmosphere simultaneously produces the formation of a new connection and a loss of tryptophan residue (Davies et al., 1987a). In addition, this new connection, which forms bityrosine, has a covalent nature and is formed between two tyrosin residues.

The tyrosyl radical is formed by the subtraction of a hydrogen atom on the hydroxyl function of the tyrosin residue by the •OH radical. The tyrosyl radical thus formed can react with another tyrosyl radical or a tyrosin molecule, to form a stable biphenolic compound. An ortho-orientator effect is involved in the formation of new biphenolic connections, the form 2,2'-biphenyl appears to be the main connection produced (Prutz, 1983).

It is thus easy to note that the coupling in the para position (4 and 4') of the tyrosyls shows a stearic obstruction by the R residue. Then, the enolisation of quinones, mainly formed in the coupling reaction, is limited when the 4 or 4' position is involved. There are trace amounts of the phenoxy-phenol 0-2' form whereas the peroxide form (0,0') is not found (Prutz, 1983).

The formation of bityrosine is more an intermolecular connection than intramolecular and it represents an important factor in the polymerization process of proteins treated with •OH radicals (Davies, 1987).

Nearly 90% of the proteinic polymerization induced by the •OH radical is attributed to the formation of new intermolecular covalent bonds other than the disulphide bridges. The remaining 10%, represents the aggregation generated by the noncovalent interactions and the disulphide bridges (Davies, 1987).

Studies undertaken in the presence of radicalizing inhibitors (mannitol, T-butyl alcohol with or without the presence of nitrogen) showed that the •OH radical is the principal agent responsible for the destruction of tryptophan residues under irradiation in the presence of $N_2O$ (100%) (Davies et al., 1987a). The radicals •H, •$O_2^-$ and $e^-_{aq}$ are not involved directly in a degradation mechanism with a tryptophan residue (Davies et al., 1987a). Radical •$O_2^-$ and oxygen ($O_2$) can interact on the products initially processed by the •OH radical resulting thus from an effect of amplification on the proteinic damage, i.e., the tryptophan loss and the formation of bityrosine (Davies et al., 1987a).

The phenomena of polymerization induced by the •OH radical and the fragmentation induced by the •OH+$O_2^-$($O_2$) radicals were found on 16 different proteins (Davies, 1987). The modifications of the primary structure like the tryptophan loss and the formation of bityrosine are also observed on these same 16 proteins (Davies, 1987; Davies et al., 1987a). Then, it is probable that the effects of the oxygen radicals on the secondary and tertiary structures observed on a model protein like BAS, can spread to the whole of the proteins (Davies and Delsignore, 1987).

The Influence of Plasticizing Agents

The addition of a polyalcohol (sugars or glycerol) in a proteinic medium, improves the stability of protein and acts as a plasticizing agent when it is present in a proteinic polymer (Lee and Timasheff, 1981). This plasticizing agent is introduced to the polymer structure and can join with it in order to reduce cohesion in the structure in order to extend it, slacken it and soften it, thus changing the physical chemical properties of the polymer (Banker, 1966). The polyalcohol will support the original or folded state of the globular protein rather than a denatured state. These molecules generate cohesive forces responsible for the increase in tension forces on the hydration interface of the protein (Arakawa and Timasheff, 1982; Gekko and Morikawa, 1981).

Some polyalcohols can act like absorbers of •OH radicals and can therefore inhibit the polymerization process.

Davies et al. (1987a) showed that the modifications of the primary sequence in amino acids of BAS are inhibited by more than 90% by the addition of 1 mM of mannitol (polyalcohol) during exposure to •OH or •OH+•$O_2^-$(+$O_2$) radicals. A similar phenomenon is observed during the irradiation of casein in the presence of lactose (Umemoto et al., 1968). Increasing the concentration of mannitol from 10 to 100 mM has only a weak effect on the process of radicalizing inhibition (Davies et al., 1987a).

Mannitol is known to be a powerful biological antioxidant. It can thus quickly absorb •OH radicals. By this fact, it strongly inhibits the production of bityrosine and it protects effectively against the loss of tryptophan during the exposure of protein (BAS) to •OH radicals (Davies et al., 1987a).

In regarding glycerol as a polyalcohol, particular attention will have to be given in order to evaluate its antioxidant capacity at the time of the exposure to •OH radicals.

Protein-Polyalcohol Interaction

In general, the major part of the hydrophobic groupings are isolated inside globular protein whereas the absorbent groupings are found on the surface. On the other hand, a great proportion of proteinic surface is regarded as being hydrophobic. This surface is occupied by atoms or functional groupings which are unsuitable for hydrogen bonding (Bull and Breese, 1968).

Certain non-polar residues located on the surface migrate with difficulty inside protein due to the high compaction of the protein's three-dimensional structure (Gekko and Morikawa, 1981). Consequently, water and some cosolvants such as polyhydric compounds (sugars, glycerol and other polyalcohols) must be excluded from the non-polar areas of the protein surface. This exclusion depends on the absorbent character of the polyhydric compound, this is, the more absorbent the compound is, the more strongly it will be excluded from the hydrophobic surface. Then, the preferential hydration of a protein in a polyhydric aqueous solution is the result of a fragile balance between three forces: repulsion and attraction between the protein and the polyhydric compound and the steric obstruction effect (Gekko and Morikawa, 1981).

Glycerol Action Mechanism

Glycerol induces a proteinic stabilization by decreasing the surface stress of water surrounding proteins. The preferential interaction of a protein in an aqueous glycerol solution is due to the repulsion forces between glycerol (an absorbent compound) and the non-polar areas located on the surface of the protein (Gekko and Morikawa, 1981).

Gekko and Timasheff (1981) showed that the chemical potential (or the coefficient of activity) of a protein increases with the increase in glycerol concentration in the medium. An increase in the chemical potential of an aqueous solution corresponds to a reduction in its solubility in this medium. Then, the presence of glycerol in an aqueous medium would increase the hydrophobic property of the protein. This would result in unfavourable thermodynamic interactions between proteins and glycerol (Gekko and Timasheff, 1981). Thus the non-polar areas of protein, located on the surface, will interact unfavourably with the water-glycerol solvent. These hydrophobic areas, located on the surface of the protein, will be attracted towards the inside, that is to say towards the non-polar areas. However, the covalent bonds between the amino acids of the protein generate a strong compaction and a steric obstruction, thus inhibiting the migration towards the interior of these hydrophobic areas (Gekko and Timasheff, 1981). Therefore, glycerol and water molecules will be distributed outside the protein thus keeping constant the chemical potential of the components. The preferential interactions phenomenon of the components of a solvent is thus expressed generally by variations of the chemical potential (Gekko and Timasheff, 1981).

Glycerol must then penetrate inside the water envelope surrounding the protein so that it occupies an integral part of this dissolved envelope. This implies that there must be a fragile balance between the repulsion of the non-polar areas, the attraction of the polar areas located on the surface of the protein and the attraction phenomenon between glycerol and water molecules. Then, the interactions between glycerol and the protein are primarily non-specific. These effects are valid only for large concentrations of glycerol, about one to four molarity (Gekko and Morikawa, 1981).

The Influence of Buffers

Buffers generate important modifications on the formation rate of bityrosine and on tryptophan loss. The Tris and HEPES buffers (4-(2-hydroxyethyl)-1-piperazineethanesulfonique acid) show a significant protection against tryptophan loss and the production of bityrosine whereas the carbonate buffer favours tryptophan loss and increases the production of bityrosine. This increase reflects more the implication of carbonate during dosages rather than a real production of bityrosine (Davies et al., 1987a). The phosphate buffer presents the most similarity with water but it is necessary to consider a possible iron contamination in all phosphate salts. The presence of iron can falsely show a production of bityrosine during dosages (Davies et al., 1987a and Davies and Delsignore, 1987).

As the exposure of a buffer-free BAS solution to •OH radicals does not show pH variation (Davies et al., 1987a), the presence of a phosphate buffer is not justified considering the risks of being confronted with iron contamination.

Biodegradability

All commercial plastic packaging is not biodegradable because their molecular weights are too high and their structures are too rigid to be attacked by micro-organisms. Linear polyethylene is the only plastic packaging having biological breakdown potential when its molecular weight is drastically reduced by photodegradation (Klemchuk, 1990).

Biodegradation is a process by which bacteria, moulds, yeasts and their enzymes consume a substance as a source of food so that the original form of this substance disappears (Klemchuk, 1990). Under appropriate conditions, a biodegradation process from two to three years is a reasonable period for the assimilation and the complete disappearance of the product (Klemchuk, 1990).

Tests carried out with moulds showed that only aliphatic polyesters and aliphatic polyurethanes are biodegradable under 85% relative humidity at 28–30° C. Nonetheless, until now, these polymers have not been marketed on a large scale as packaging (Klemchuk, 1990).

Research on the biodegradability of polyethylene films in the presence of starch, with activated charcoal, was undertaken by the team of Ndon (Ndon et al., 1992). Their work made it possible to show that the degradation of carbon coming from starch present in plastic is weak compared to the conversion of carbon coming from pure starch. The rate of degradation and the extent of carbon molecule withdrawal are higher under aerobic conditions than under anaerobic conditions. The study of the distribution of molecular weights of plastics does not indicate any decomposition of polyethylene.

Susceptibility to Proteolysis

Davies et al. (1987; 1987b) showed that when BAS was treated with •OH radicals, it became more susceptible to proteolysis by cellular enzymes. According to these authors, the simple process of denaturation (unfolding or increase in the hydrophobicity) can explain the strong increase in susceptibility to proteolysis. The oxidation and proteolyses reactions seem to be connected (Davies, 1987). Indeed, it was observed that *Escherichia coli*, cellular extracts of human and rabbit erythrocytes and rabbit reticulocytes all recognize and degrade proteins modified by oxidation. However, the recognition and degradation mechanisms of proteins modified by the cellular enzymes are poorly understood (Davies, 1987).

Casein is an excellent proteinic substrate. Its open conformation provides it with easy access to enzymatic attack and this, even before its exposure to •OH radicals (Davies, 1987).

Biodegradation by Pseudomonas

Pseudomonas is recognized as being a type of bacterial which can synthesize a very diverse number of enzymes. Being psychrotrophic, it is responsible for the putrefaction of refrigerated foods. It can however decompose certain chemicals like pesticides and is resistant to certain disinfectants (compounds of quaternary ammonium) and antibiotics (Tortora et al., 1989). It is found in a majority of natural sites (water-ground-air), foodstuffs (milk-dairy products-egg-meats) and in some animals (Palleroni, 1984). Pseudomonas is a Gram-stick, chimioorganotrophe, aerobic and mobile with one or more polar flagellums. It can grow between 4 and 43° C. but does not tolerate acidic media (Palleroni, 1984). Certain species of Pseudomonas are chimiolithotrophes optional.

The majority of the Pseudomonas species degrade κ-casein before the population reaches $10^4$ UFC/ml. β-casein is more susceptible to degradation than α for the majority of species. This phenomenon is only observed when the bacterial population is higher than $10^6$–$10^7$ UFC/ml (Adams et al., 1976).

The use of Pseudomonas for the degradation of various components is very interesting given its resistance to various stress conditions (For example: temperature, carbon source) and its capacity to synthesize an significant amount of enzymes (Tortora et al., 1989).

SYNOPSIS OF THE INVENTION

The subject of this invention is a manufacturing process of biodegradable proteinic films which contain caseinates, allowing for the fast, simple and inexpensive formation of proteinic films. Glycerol acts like a plasticizing agent in order to add flexibility and to facilitate the handling of film. The process of polymerization by irradiation improves the mechanical properties of film while insuring the polymerization process via hydroxyl radicals. The irradiation of a caseinate-glycerol-water mixture allows for the creation of a proteinic film with good elasticity, resistance and deformation properties. Glycerol unexpectedly improves polymerization of the molecules without harming the film's properties.

The film itself is also the subject of this invention. The film which is obtained is sterile, viscoelastic, and resistant to rupture; it is adequately impermeable to water, gases and the micro-organisms. It is biodegradable, non-toxic and even edible.

The manufacturing process of this film is thus unique in that it is a good compromise of maintaining both cohesion and elasticity. Indeed, cohesion is obtained without compromising flexibility, porosity and permeability to gases and water which are all parameters known to be affected by an increase in cohesion.

DESCRIPTION OF THE INVENTION

An explicit description of the material and various techniques used will be presented and illustrated in the following figures. This description does not limit the scope of the invention but rather is provided as an illustration.

EXAMPLE 1

Preparation of the Protein Solutions

Figure 1A:
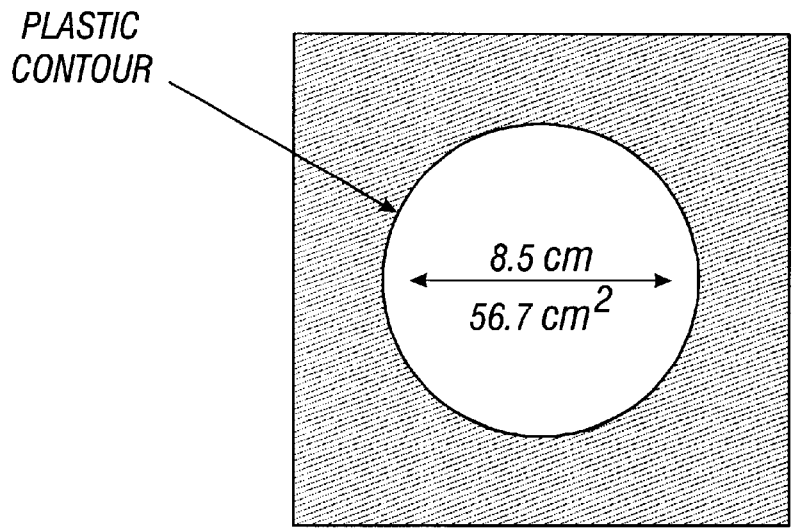
FIG. 1: Diagram of the assembly used for making the films.

In this research project, three caseinates (see compositions at table 2) were initially used, that is, two sodium caseinates (alanate-110 and 180) and a calcium caseinate (alanate-380, New Zealand Milk Products, Inc. CA, USA). The protein contents are certified higher than 91.0% and this purity was laboratory tested (LECO, FP-428, ML, USA). Purity is 94,099%, 94,526% and 93,575% for alanates 110, 180 and 380 respectively. These results in total nitrogen contents will be retained for the calculation of the protein concentrations (% P/P) at the time of the formulation of the various compositions of the solutions.

TABLE 2

Composition of the three caseinates (alanates) used in this research project.

| ELEMENTS | ALANATE 110 | ALANATE 180 | ALANATE 380 |
|---|---|---|---|
| PROTEINS (N × 6.38) % | 91.1 | 91.1 | 91.8 |
| MINERALS (%) | 3.6 | 3.5 | 3.8 |
| MOISTURE (%) | 4.1 | 4.0 | 3.9 |
| LIPIDS (%) | 1.1 | 1.1 | 0.7 |
| LACTOSE (%) | 0.1 | 0.1 | 0.1 |
| pH (5% AT 20° C.) | 6.6 | 6.6 | 7.0 |

The values of the various components of three caseinates come from the product bulletins provided by New Zealand Milk Products, Inc., CA, USA.

Before the period of irradiation, the caseinates are dissolved in distilled water, previously filtered by inverse osmosis. Solubilization is made continuously under magnetic agitation and without heat. Two concentrations are used: 5.0% and 7.5% P/P of proteins. A concentration lower than 5% generates films of inadequate thickness for handling whereas a concentration higher than 7.5%, produced films that were too thick. These two concentrations are selected strictly to validate the film properties, they are otherwise not restrictive.

According to the composition of the medium, a quantity of glycerol (purity ≧95%; A & C, Montreal, Canada) can be added to concentrations of 1.0%, 2.5% and 5.0% P/P. A glycerol concentration higher than 5.0% P/P produces films in a gel state, which are therefore difficult to handle adequately.

After complete solubilization of proteins, a 15 minutes vacuum, under magnetic agitation, is applied; followed immediately by an $N_2O$ bubbling (LINDE, Union Carbide, Toronto, Canada) for a second 15 minutes period under agitation. After the gasing stage, the solution is transferred in screw-top test tubes, under $N_2O$ flow. The test tubes are sealed with paraffin and are then irradiated.

EXAMPLE 2

Irradiation of the Proteinic Solutions

The irradiation is carried out in a $Co^{60}$ irradiator of the Gammacell 220 type (NORDION INTERNATIONAL INC, located in the Canada Irradiation Center (C.I.C), Laval, Canada) at an average dosage of 2, 18 kGy/h for amounts of irradiation of 4, 8, 12, 15, 20, 30 and 40 kGy.

For the irradiation, the test tubes are placed in a glass beaker located in the center of the irradiation room. In this way, the test tubes are in the zone of 100±5% of the dose according to the isodose curves of the Gammacell 220 irradiator.

After each irradiation period, a 20 to 30 minute wait in darkness is allocated so that the longest radicalizing reactions are completed and to avoid photodecomposition of the biphenyls (Lehrer and Fasman, 1967; Prutz, 1983).

EXAMPLE 3

Formation of Film

Before and after each irradiation, the pH (Corning pH-meter, PS 15) and the Brix degree of the solutions (Fisher refractometer, 13-946-70c, No 4754, Montreal, CANADA) are checked in order to quickly evaluate any change during the irradiation.

The pH measurement ensures the constancy of the pH solutions, before and after each irradiation. The refractometer allows the evaluation of the quantity of soluble solids present in the solutions. Its use makes it possible to see any variations of the quantity of solubilized solids before and after irradiation.

A homogenisation of the solutions by successive inversions is carried out before each recording of the data in order to prevent the formation of a protein deposit.

Figure 1B:
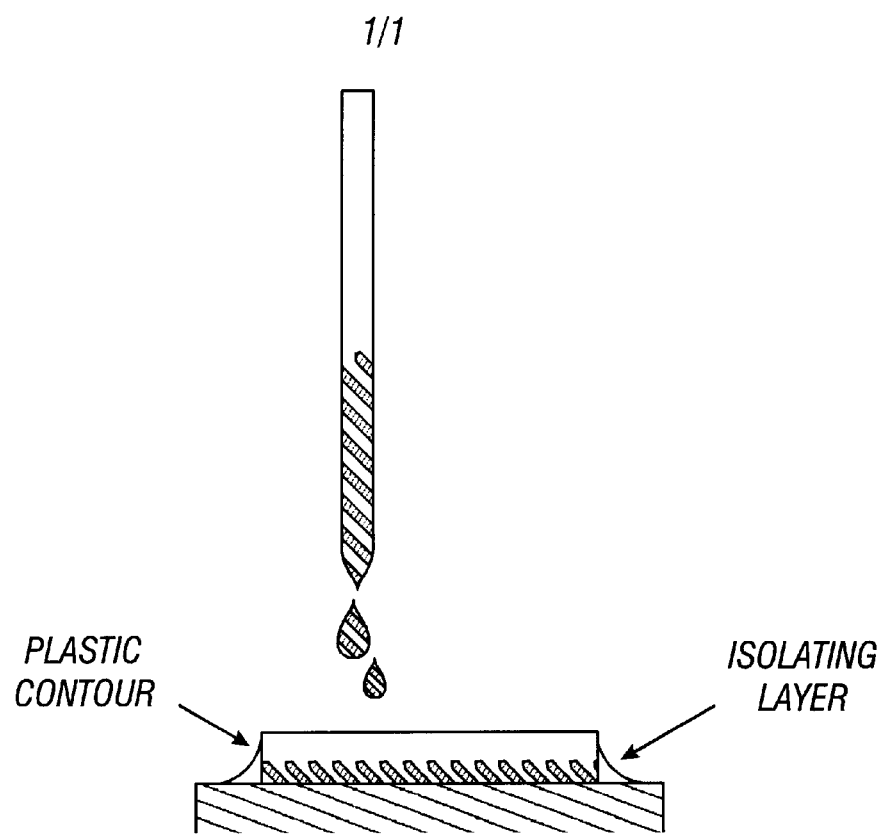

After verifying the pH and Brix degree, five milliliters (5 ml) of the protein solution is pipetted and uniformly deposited in a support of polymethacrylate (Plexiglas). Detailed attention is given in order to avoid the formation of air bubbles. The support has an internal diameter of 8.5 cm for a surface of 56.7 $cm^2$ (see FIG. 1). Thereafter, the support is kept level as much as possible. A 12 to 14 hour drying period (that is to say overnight) at room temperature, is allocated in order to obtain the film. This method of film formation is adapted from the Gontard (1992) and Krochta (1991) research teams.

After drying, the film is withdrawn from its support and its thickness is measured using a Digimatic Indicator (Mitutoyo, Japan).

EXAMPLE 4

Mechanical Properties

All the films produced in this manner are cut to obtain a sample with a 4.0 cm diameter. Thereafter, the samples are humidified and balanced during 48 hours, at 25 C., in a desiccator containing a solution saturated with sodium bromide (Gontard et al., 1992). This handling ensures an atmosphere of 56% relative humidity (Ganzer and Rebenfield, 1987) and this water content was measured. The humidified samples are then firmly immobilized between two Plexiglas plates exposing a surface of 3.2 cm in diameter for the measurement of the mechanical properties.

For all tested films, two mechanical properties were determined: breaking load and strain at failure. For certain films containing glycerol, a third mechanical property was evaluated, Viscoelasticity. These three properties are measured using a Voland Texturometer (Stevens-LFRA Texture Analyser, TA-1000 model, N.Y., USA) connected to a printer (Texture Technologies Corp., L 6512 model, N.Y., USA). A punch of two millimeter (2 mm) diameter is used for all measurements. Some trials were carried out with a 3 mm diameter punch and the readings exceeded the maximum detection limit of the texturometer. The calculation of the results is always according to the punch's descent speed and the tape speed of the printer paper. Before each use, the texturometer is calibrated against a mass standard (100 to 1000 g) and the speed of the printer is verified as a function of time.

For the three mechanical properties, the tests were carried out in triplicate. The average obtained, as well as its standard deviation, were represented on a graph.

a) Breaking Load and the Strain at Failure

Figure 2:
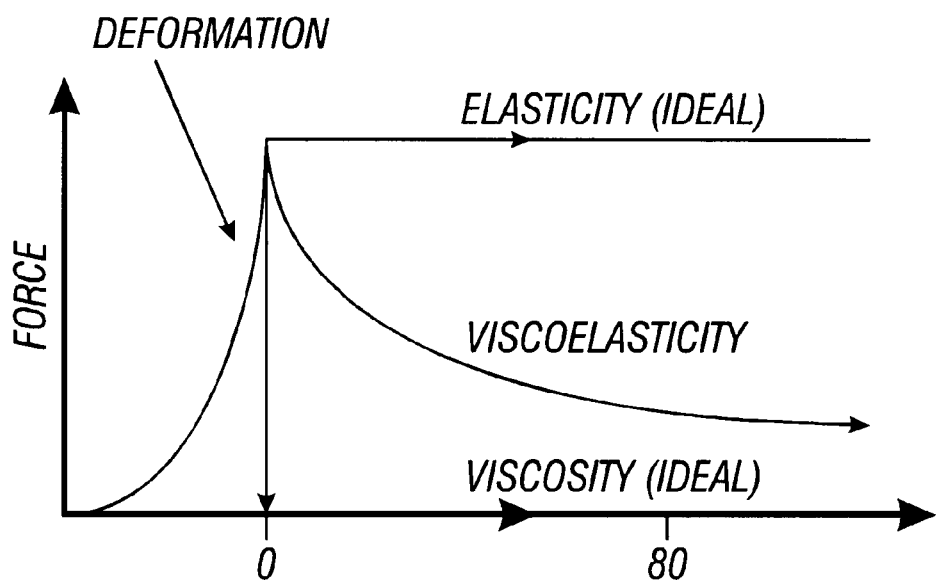
FIG. 2: Curve of relieving and equation for the calculation of the coefficient of relieving (Peleg, 1979).

The breaking load and the strain at failure are calculated simultaneously for all the samples. The speed of descent of the punch is 1.0 mm/s and the unfolding speed of the printer paper is 50 cm/min. The push of the punch is recorded in grams and is converted into units of force (N).

b) Viscoelasticity the viscoelasticity of a film is measured by the relaxation curve obtained following the application of a force maintained by the punch on the film. The speed of descent of the punch is of 1.0 mm/s and that of the unfolding of the printer paper is 10 cm/min. In the present case, the deformation is three millimeters (3 mm) and the forces measured at time 0 and 60 seconds are retained for the calculation of the relaxation coefficient Y(1 min) (Peleg, 1979) according to the equation defined in FIG. 2.

In accordance with this equation, the relaxation coefficient of relieving Y(1 min) varies between 1 and 0. An elastic film will show a low Y(1 min) ration since the initial and final forces would then be nearly identical.

During relaxation, energy is dissipated thus creating irreversible internal disturbances. A continuously decreasing tension is necessary to maintain the sample in its deformed state (Gontard et al., 1992).

EXAMPLE 5

Dosages by Fluorometry

A fraction of the irradiated protein solution is kept in the liquid state in order to measure the rates of bityrosine formation and tryptophan loss. In all cases, dosages are performed within 24 hours following the period of irradiation.

Before carrying out the dosages, a $\frac{1}{100}$ dilution is performed using a HEPES buffer (A & C, Montreal, Canada) 20 mM, pH 7.0 (Davies et al., 1987a), in order to avoid a saturation of the apparatus.

The bityrosine formation and tryptophan loss measurements are followed by fluorescence (Davies et al., 1987a) with the help of a spectrofluorometer (Spectrofluorometer 2070, Varian, CA, USA). The spectrofluorometer is equipped with a xenon lamp (75 W) and the capacity of the cell is 15 µl. The detectors are photomultipliers for excitation and emission and the detectability threshold 0.03 quinine sulfate ppb in a solution of $H_2SO_4$ 0.1M (values reported by Varian). The spectrofluorometer is connected to a HPLC (Liquid Chromatograph: VISTA 5500, Varian, CA, USA) which is connected to an auto-injection system (Auto Sampler 9090, Varian, CA, USA). this entire system is in permanent communication with a computer terminal (COMPAQ/Deskpro 486/33M) which allows for the acquisition and the processing of data (Varian Star Workstation, Copyright 1989-1992, Varian Associates, Inc, CA, USA).

During dosages, no separation column is used but only a fixed flow of one milliliter per minute (1 ml/min). The injection volume is 90 µl and a 100 µl twist is used to receive the injection. The period for data acquisition is fixed at 90 seconds in duration. The rates of bityrosine formation or tryptophan loss are obtained by the calculation of the surface under the curve in arbitrary surface units.

As dosages are purely qualitative, we concentrated mainly on the stability and the reproductive capacity of the apparatus. Thus, several series of dosages on the three caseinates used and on a tryptophan solution (Sigma, Mississauga, CANADA) were made at the tryptophan excitation and emission wavelengths. For three different concentrations, the results showed a variance lower than 4% between dosages and a variation equal or lower than 8.5% between the three concentrations for the same caseinate. The variation between the concentrations would be mainly justified by predosage handling.

Tests have shown that the HEPES buffer (20 mM, pH 7.0), glycerol (2.5%) or a mixture of the two do not generate characteristic signals, truly higher than the background noise, for the various wavelengths used for irradiated and non-irradiated solutions.

For all the various compositions of the solutions, the rates of bityrosine formation and tryptophan loss were measured in triplicate. The average and the standard deviations were represented on a graph.

a) Bityrosine Dosage

The rate of bityrosine formation is measured at the excitation and emission wavelengths of 305 nm and 415 nm (±5 nm) respectively. These wavelengths were determined using an irradiated tyrosin solution (50 ppm) (Sigma, Mississauga, CANADA). The casing of the apparatus is adjusted to 1 and an attenuation factor of 4 is applied. As we did not find bityrosine commercial standards, our results could only be interpreted in a qualitative way.

b) Tryptophan Dosage

The rate of tryptophan loss is followed at the excitation and emission wavelengths of 255 nm and 351 nm (±5 nm) respectively. These wavelengths were established using an irradiated tryptophan solution (50 ppm). The casing of the apparatus is 1 and an attenuation factor of 32 is applied. The oxidation of a solution of tryptophan residue by •OH radicals is directly connected to the loss of intensity of the fluorescence signal during its dosage (Davies et al., 1987a).

As dosage by fluorescence is much more complex with proteins than with only one amino acid (Davies et al., 1987a), we did not try to convert the fluorescence intensity into quantities of tryptophan residues, but we only noted experimentally a possible loss of the signal.

EXAMPLE 6

Checking of the Biodegradability

The biodegradability was verified using *Pseudomonas fragi* because this bacterial species is frequently used in the laboratory and also because the Pseudomonas stock is recognized as a bacterium which is able to synthesize a very wide number of enzymes (Tortora, G. J. et al., 1989). The foremost synthesized proteases for the biodegradation of casein are metalloproteases and serine proteases (Alichanidis and Andrews, 1977; Davies, 1987; Davies et al., 1987b).

Three tests were carried out in triplicate:

1. film sample +0.85%-NaCl (negative control)
2. *P. fragi*+0.85%-NaCl (control)
3. film sample+*P. fragi*+0.85%-NaCl Each medium contains 99 ml water with 0.85% P/V of NaCl (Anachemia, Montreal, Canada) and according to the case, 1 ml of inoculum or a film sample or, both are added. The mediums are incubated at 25±2° C. and are continuously under agitation (140±5 rpm).

Only one type of film was selected in this section. It is composed of 5.0% P/P calcium caseinate with 2.5% P/P glycerol and irradiated at 20 kGy. The samples are prepared according to the methods described in example 1 to 3. An irradiation dose of 20 kGy is considered a sterilization dose. Naturally, a precaution specific to the maintenance of sterility is applied.

The inoculation of the mediums is done starting from a mother culture whose time of incubation is 16 to 18 hours.

Beforehand, the mother culture was inoculated twice in a nutritive bubble (Nutrient Broth, Difco Laboratories, Detroit, USA) in order to adapt the stock and to collect it in an exponential growth phase.

One milliliter (1 ml) of this mother culture is taken and diluted until a factor of $\frac{1}{10}^4$ with a saline solution (0.85%-NaCl). Three successive centrifugations are made at 3000 rpm for 10 minutes, at 4° C. After each centrifugation, nine of the ten milliliters are withdrawn and replaced by physiological [distilled?] water, then homogenized with the vortex. The inoculation of the mediums is done after the third centrifugation and dissolution. From these handlings and dilutions, the initial counts of the mediums are roughly 100 UFC/ml.

The bacterial counts are done in duplicate on "Trypsic Soy Agar" medium (TSA, Ditco Laboratories, Detroit, USA). The counting method used is that advised by the Health Protection Branch (Health and Welfare Canada, 1979). The inoculum is deposited on the surface of the agar by smearing. Incubation is done at 23° C.±2° C. and the bacterial counts are checked at 24 and 48 hours after setting on the plate. Bacterial counts which ranged between 30 and 300 were retained.

EXAMPLE 7

Statistical Analyses

The results obtained are analyzed statistically by variance analysis and the DUNCAN multiple comparison test with P σ 0.05, whereas the STUDENT statistical analysis is used only during the variance analysis and test of comparison per pair with P σ 0.05 (Snedecor and Cochran, 1978).

Results

This section will be divided into three main parts. The first part will present the results of a series of experiments on the evaluation of the behavior of the three caseinates used according to the amount of irradiation. After discussing these results, a selection of one of the three caseinates will be made for the continuation of the experimentation. In the second part, we will discuss a second series of experiments on the behavior of the caseinate chosen in the presence of glycerol and according to the amount of irradiation given. Finally, in the third part, measurements of the biodegradability will be presented.

Observations and Visual Aspect of the Films

Before elaborating on the results, we would like to describe to the reader the physical and visual aspects of the films. At first sight, the non-irradiated films are transparent and the colourless as are the caseinate films without glycerol, irradiated at 4 to 12 kGy. On the other hand, in the absence of a plasticizing agent, the fragility of these films is so great that they cannot be handled without damaging them. These observations apply for the two protein concentrations used (5.0% P/P and 7.5% P/P).

The irradiation causes a yellowing of the films formed in the presence of glycerol and this rate of yellowing seems to be proportional to the amount of irradiation received. The presence of glycerol tends to create a certain opacity and it seems to be proportional to the glycerol content. Whereas for the same glycerol concentration, protein content affects the aspect of film for the same amount of irradiation. At 2.5% P/P or 5.0% P/P of glycerol, the films produced with 7.5% P/P of proteins are more transparent than those produced with 5.0% P/P. Therefore the glycerol/protein ratio seems to be a factor influencing the opacity of films.

According to the glycerol and protein contents, the thickness varies from 27 to 64 µm with a variation equal or lower than 8% (see table 3). Coating film must be as thin as possible and preferably its thickness must be equal or lower than 50 µm. A thicker edible film would likely affect the aesthetic properties of the packed product or its components.

Naturally, glycerol content modifies the texture of the film and with a concentration of 5.0% P/P, its handling requires more delicacy. Whatever the composition or the amount of irradiation, no film, once formed, released perceptible odors.

TABLE 3

Variation of the thickness of films according to their protein composition with or without glycerol on all the irradiation doses.

| % P/P ALANATE/ % P/P GLYCEROL | THICKNESS (µm) | DOSE (kGy) |
| --- | --- | --- |
| 5.0%–110/0% | 27 ± 2 | 0 to 2 |
| 5.0%–180/0% | 27 ± 2 | 0 to 12 |
| 5.0%–380/0% | 28 ± 2 | 0 to 12 |
| 7.5%–110/0% | 44 ± 2 | 0 to 12 |
| 7.5%–180/0% | 42 ± 2 | 0 to 12 |
| 7.5%–380/0% | 41 ± 2 | 0 to 12 |
| 5.0%–380/1.0% | 32 ± 2 | 0 to 12 |
| 5.0%–380/2.5% | 38 ± 3 | 0 to 40 |
| 5.0%–380/5.0% | 44 ± 2 | 0 to 40 |
| 7.5%–380/2.5% | 62 ± 5 | 0 to 20 |
| 7.5%–380/5.0% | 64 ± 5 | 0 to 40 |

5.0%–110/0% means 5.0% P/P of protein 110 with 0% P/P glycol.

Comparison of the Three Proteins

In this first part, a comparison of two mechanical properties and characteristics of fluorescence were observed with the aim of selecting one of three caseinates for the continuation of the experiments.

Initially, the breaking force as a function of the amount of irradiation will be discussed; followed by strain at failure in function to the dose and finally, the dosages by fluorescence according to the amounts received, will be presented. For these three points of comparisons, two protein concentrations were studied in the absence of a plasticizing agent.
a) Breaking Force (Load??)

As there is a direct relation between the breaking load and the thickness of film, we decided to calculate the ration of one to the other. This was done in order to avoid possible variations of force which are simply due to variations of thickness. This ratio is represented by the symbol F/E and is expressed in N/µm.

Figure 3A:
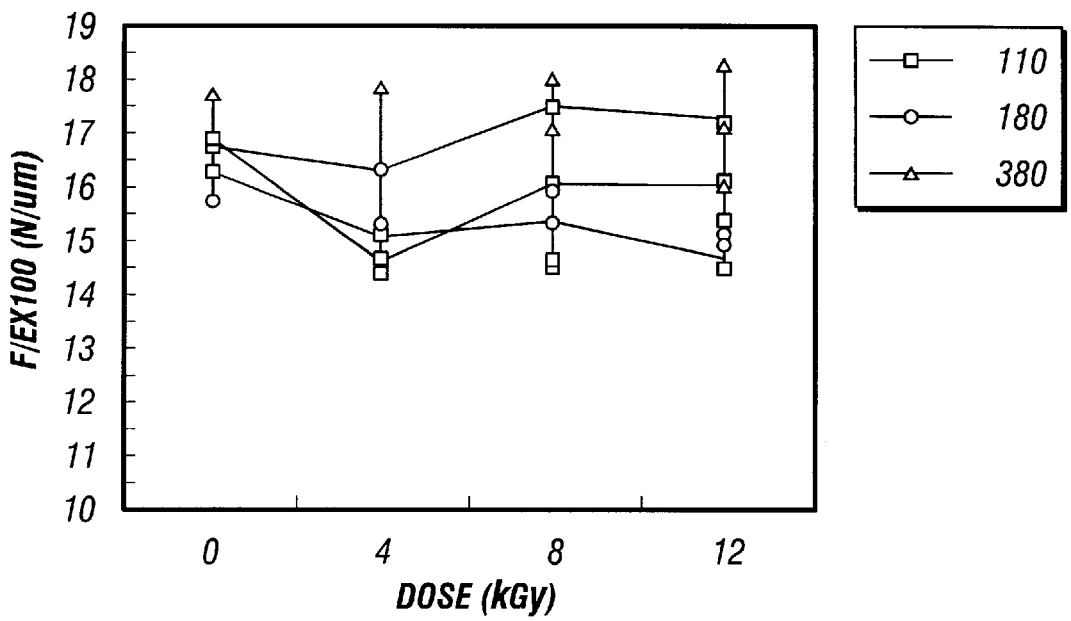
FIG. 3: F/E Ration (Rupture strength versus film thickness ratio) as a function of the irradiation dose received for the 110, 180 and 380 alanates, for protein concentrations of 5.0% P/P and 7.5% P/P.
Figure 3B:
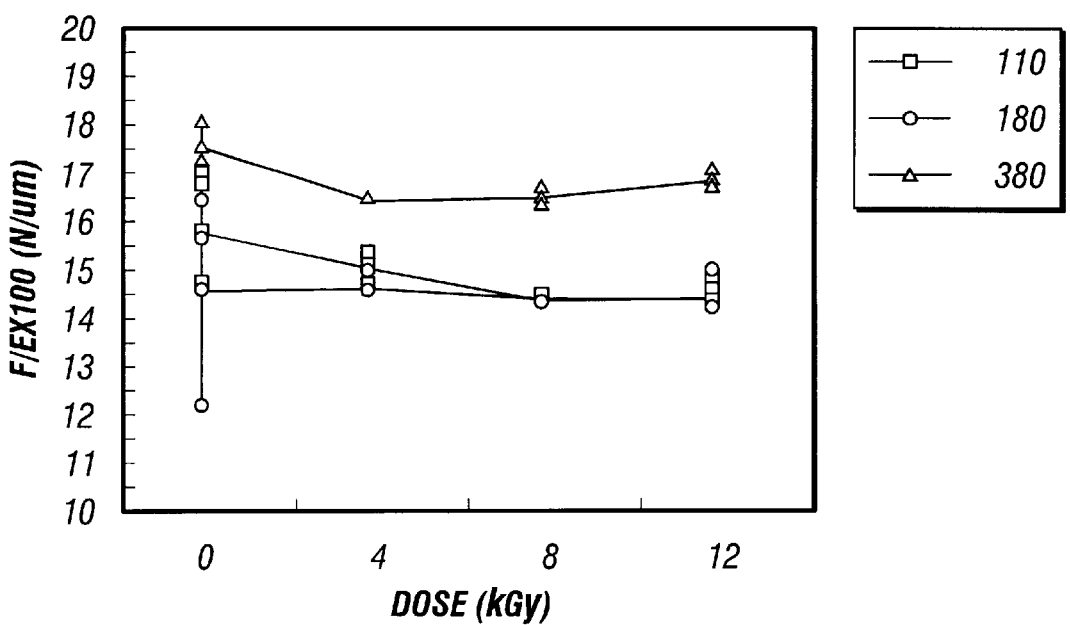

With a concentration of 5.0% P/P, the F/E ratio varies from 14.7 to 17.4 for the three caseinates and for irradiation doses. There is no significant difference (P>0.05) for the F/E ratio, in function of the irradiation dose, between the three caseinates at this concentration. There is only one exception for the 12 kGy dose where there is a significant variation (P>0.05) between sodium caseinates (alanate 180) and calcium (alanate 380) (see table 4 and FIG. 3). On the other hand, without being clearly dissociated, calcium caseinate (alanate 380) shows a higher F/E ratio than those of the two sodium caseinates for the irradiation doses of 4, 8 and 12 kGy (see table 4).

For the 7.5% concentration, the F/E ratio varies from 14.2 to 17.4 for the three caseinates for all three irradiation doses. With this concentration, the calcium caseinate (alanate 380) has a relationship F/E significantly higher (P 0.05) to the two other sodium caseinates (alanates 110 and 180) during the irradiation between 4 and 12 kGy (see table 5 and FIG. 3). With 0 kGy, there is no significant difference (P>0.05)

between caseinates of sodium (alanate 110) and calcium (alanate 380). The films formed starting from calcium caseinate (alanate 380) require a larger force for rupture compared to those made from the two sodium caseinates (alanates 110 and 180) (see table 5).

For the three caseinates, there is no significant difference (P>0.05) for the F/E ratio between the two protein concentrations used (5.0% and 7.5%) and this, according to the amounts of irradiation (0 to 12 kGy). The only exceptions are sodium caseinate (alanate 110) at 12 kGy and calcium caseinate (alanate 380) at 8 kGy where the difference is considered significant (P σ 0.05).

Thus, the irradiation of calcium caseinate (alanate 380) to a concentration of 7.5% protein creates a film more resistant to rupture than the two other proteins. Whereas at a concentration of 5.0%, there is no significant difference (P>0.05) between three caseinates.

TABLE 4

F/E ratio according to the amount of irradiation received for alanates 110, 180 and 380 with a concentration of 5.0% P/P of proteins.

| DOSE (kGy) | F/Ex 100 (N/$\mu$m) ALANATE-110 | F/Ex 100 (N/$\mu$m) ALANATE-180 | F/Ex 100 (N/$\mu$m) ALANATE-380 |
|---|---|---|---|
| 0 | 16.9 ± 0.4$^{1,a}$ | 16.2 ± 0.4$^{3,a}$ | 16.8 ± 0.9$^{5,a}$ |
| 4 | 14.6 ± 0.1$^{2,b}$ | 15.0 ± 0.3$^{4,b}$ | 16.3 ± 1.5$^{5,b}$ |
| 8 | 16.0 ± 1.6$^{1,2,c}$ | 15.3 ± 0.7$^{4,c}$ | 17.4 ± 0.5$^{5,c}$ |
| 12 | 16.0 ± 0.8$^{1,2,de}$ | 14.7 ± 0.2$^{4,d}$ | 17.2 ± 1.0$^{5,e}$ |

The term F/E expresses the ratio of the breaking load versus the thickness of film. For each line, two averages followed by the same letter are not significantly different between them (P>0.05). for each column, tow averages followed by the same figure are not significantly different between them (P>0.05).

TABLE 5

F/E ratio according to the amount of irradiation received for alanates 110, 180 and 380 with a concentration of 7.5% P/P of proteins.

| DOSE (kGy) | F/Ex 100 (N/$\mu$m) ALANATE-110 | F/Ex 100 (N/$\mu$m) ALANATE-180 | F/Ex 100 (N/$\mu$m) ALANATE-380 |
|---|---|---|---|
| 0 | 15.6 ± 0.9$^{1,ab}$ | 14.5 ± 1.8$^{3,a}$ | 17.4 ± 0.4$^{4,h}$ |
| 4 | 14.9 ± 0.4$^{1,2,c}$ | 14.5 ± 0.2$^{3,c}$ | 16.4 ± 0.0$^{5,d}$ |
| 8 | 14.3 ± 0.0$^{2,c}$ | 14.2 ± 0.2$^{3,c}$ | 16.3 ± 0.2$^{5,f}$ |
| 12 | 14.2 ± 0.3$^{2,g}$ | 14.3 ± 0.5$^{3,g}$ | 16.7 ± 0.2$^{5,h}$ |

The term F/E expresses the ration of the breaking load versus the thickness of film. For each line, two averages followed by the same letter are not significantly different between them (P>0.05). For each column, two averages followed by the same figure are not significantly different between them (P>0.05).

b) The Strain at Failure

With a concentration of 5.0% P/P, the deformation is approximately 2,3±0,1 mm for the three caseinates and for all levels of irradiation. There significant variations (P>0.05) for the three caseinates as a function of the doses of irradiation except for calcium caseinate between the amounts of 4 and 12 kGy (see table 6). At 7.5% P/P proteins, the deformation is approximately 2,6±0,2 mm for all three caseinates and for all amounts of irradiation. For the same amount of irradiation, there is no significant difference (P>0.05) between the three caseinates. On the other hand, for the sodium caseinates (alanate 110) and calcium (alanate 380), there is a significant variation (P>0.05) between the amounts of 0 and 12 kGy (see table 7).

Figure 4A:
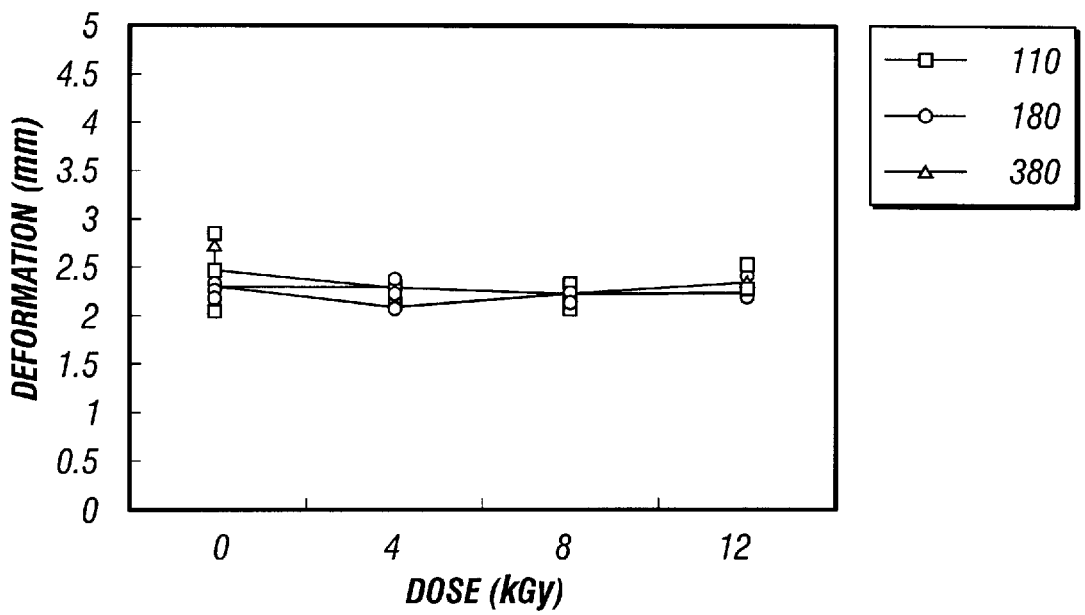
FIG. 4: Deformation at rupture according to the amount of irradiation received for the alanates 110, 180 and 380 with protein concentrations of 5.0% P/P and 7.5% P/P
Figure 4B:
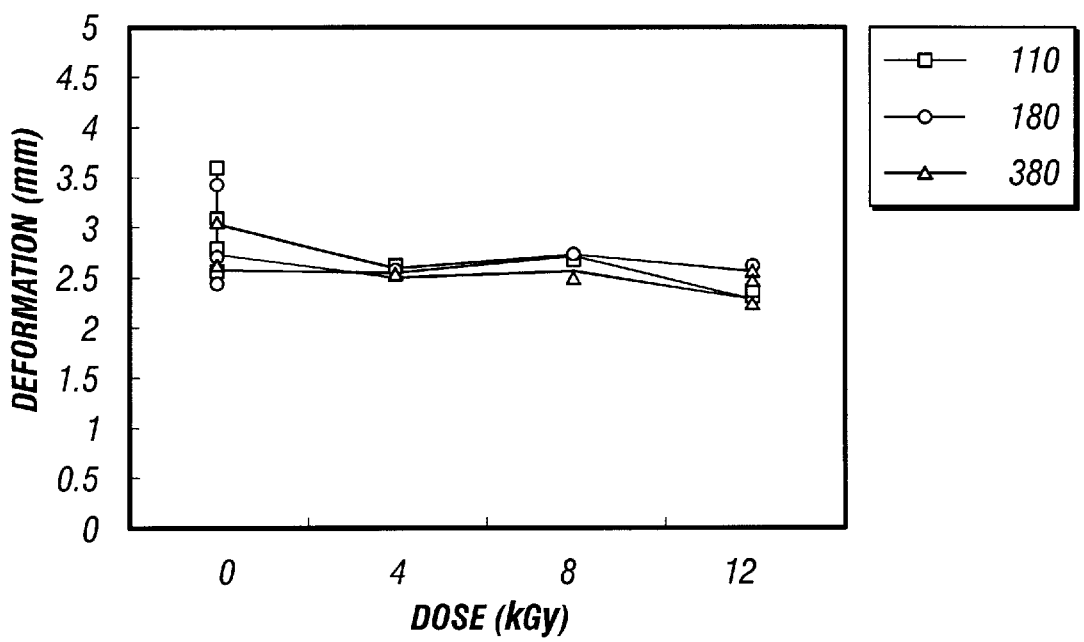

For the two concentrations used, there is no significant difference (P>0.05) between the three caseinates for the deforming capacity as a function of the amounts of irradiation (see FIG. 4). The deformation is greater by some tenths of millimeters for a concentration of 7.5% compared to 5.0% but this variation is not considered significant (P>0.05) (see tables 6 and 7).

TABLE 6

Strain at failure according to the amount of irradiation received for alanates 110, 180 and 380 with a concentration of 5.0% protein P/P.

| DOSE (kGy) | DEFORMATION (mm) ALANATE-110 | DEFORMATION (mm) ALANATE-110 | DEFORMATION (mm) ALANATE-110 |
|---|---|---|---|
| 0 | 2.4 ± 0.2$^{1,a}$ | 2.3 ± 0.2$^{2,a}$ | 2.3 ± 0.1$^{3,4,a}$ |
| 4 | 2.3 ± 0.1$^{1,b}$ | 2.3 ± 0.1$^{2,b}$ | 2.2 ± 0.1$^{3,b}$ |
| 8 | 2.3 ± 0.1$^{1,c}$ | 2.3 ± 0.1$^{2,c}$ | 2.3 ± 0.2$^{3,4,c}$ |
| 12 | 2.4 ± 0.3$^{1,d}$ | 2.3 ± 0.2$^{2,d}$ | 2.4 ± 0.1$^{4,d}$ |

For each line, tow averages followed by the same letter are not significantly different between them (P>0.05). For each column, two averages followed by the same figure are not significantly different between them (P>0.05).

TABLE 7

Strain at failure according to the amount of irradiation received for alanates 110, 180 and 380 with a concentration of 7.5% protein P/P.

| DOSE (kGy) | DEFORMATION (mm) ALANATE-110 | DEFORMATION (mm) ALANATE-110 | DEFORMATION (mm) ALANATE-110 |
|---|---|---|---|
| 0 | 3.0 ± 0.5$^{1,a}$ | 2.6 ± 0.2$^{3,a}$ | 2.7 ± 0.1$^{4,a}$ |
| 4 | 2.6 ± 0.2$^{1,2,b}$ | 2.5 ± 0.1$^{3,b}$ | 2.5 ± 0.1$^{4,5,b}$ |
| 8 | 2.7 ± 0.2$^{1,2,c}$ | 2.7 ± 0.1$^{3,c}$ | 2.6 ± 0.2$^{4,5,c}$ |
| 12 | 2.4 ± 0.1$^{2,d}$ | 2.6 ± 0.2$^{3,d}$ | 2.3 ± 0.2$^{5,d}$ |

For each line, tow averages followed by the same letter are not significantly different between them (P>0.05). For each column, two averages followed by the same figure are not significantly different between them (P>0.05).

Viscoelasticity was not evaluated for these films as the deformation applied to measure this parameter is three millimeters (3 mm) and according to FIG. 4, the strain at failure is lower than this value.

c) Rate of Bityrosine Formation

The real rate of bityrosine formation produced by irradiation is measured by subtracting the average value obtained at 0 kGy from those obtained from the various amounts of irradiation. Indeed, a signal of fluorescence is perceived at 0 kGy. The initial presence of bityrosine or the contribution of other neighbouring components can cause this signal of fluorescence. This contribution is the consequence of protein dosages with these multiple functional groupings in the vicinity of to the other.

We observed an increase in the formation of bityrosine with an increase in the amount of irradiation for the three caseinates and this, for the two concentrations used.

At 5.0% concentration, the rate of bityrosine formation is significantly higher (P σ 0.05) for calcium caseinate (alanate 380) compared to the two sodium caseinates (alanates 110 and 180) for irradiation of 4, 8 and 12 kGy (see table 8). Moreover, with 12 kGy, the second sodium caseinate (alanate 180) produced significantly more (P σ 0.05) bityrosine than the first (alanate 110).

Figure 5A:
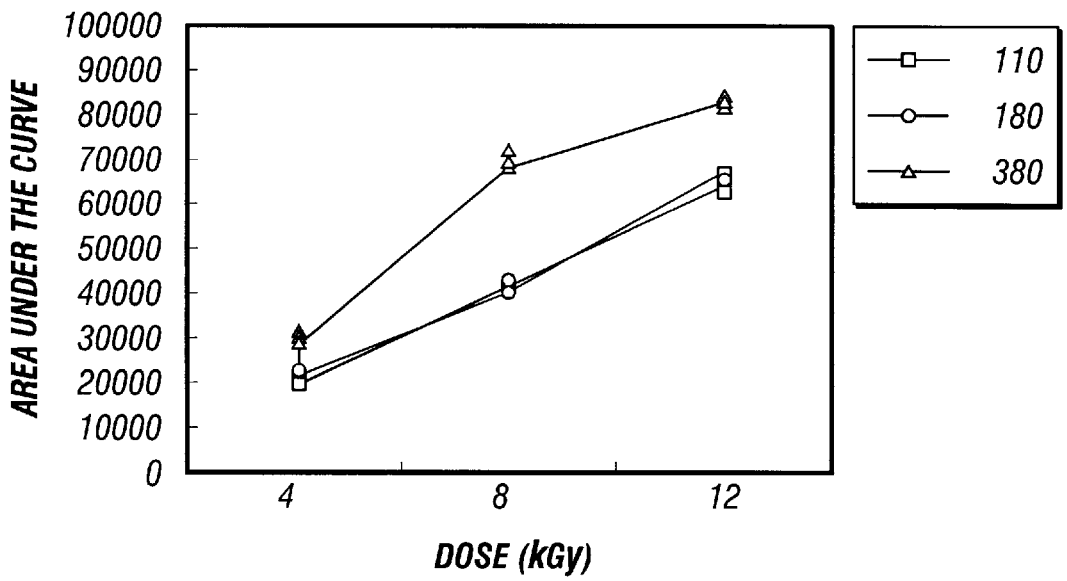
FIG. 5: Rate of formation of bityrosine according to the amount of irradiation received for alanates 110, 180 and 380 with protein concentrations of 5.0% P/P and 7.5% P/P
Figure 5B:
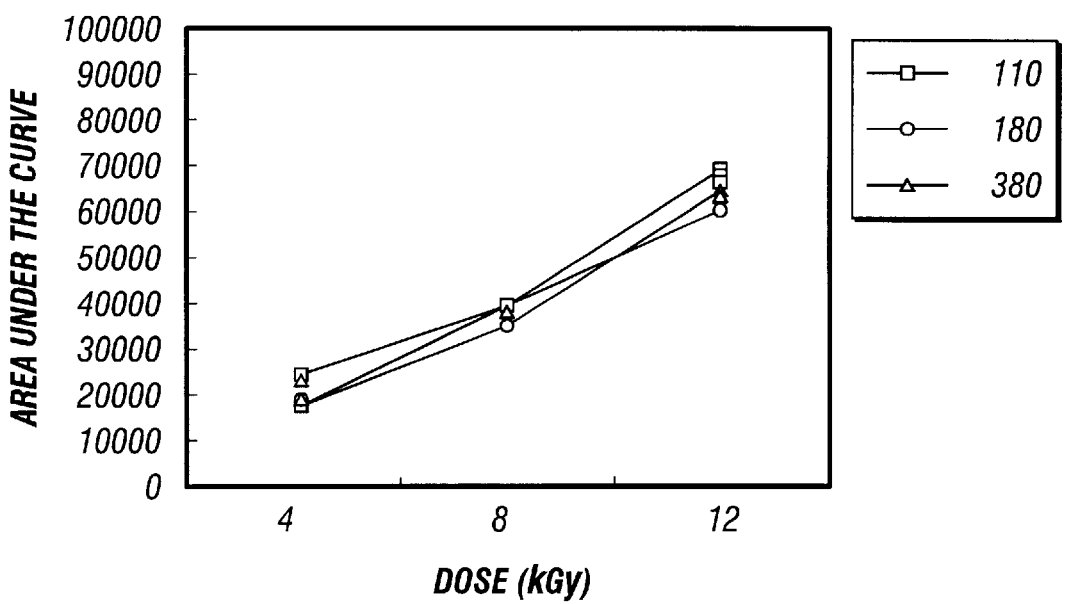

For 7.5% concentration, sodium caseinate (alanate 110) produced significantly more (P σ 0.05) bityrosine than the caseinates of sodium (alanate 180) and calcium (alanate 380) and this, at levels of 4 and 12 kGy (see table 8 and FIG. 5), whereas at 8 kGy, no significant difference (P>0.05) was perceived between the three caseinates (see table 9).

There exists a significant difference (P σ 0.05) between the two protein concentrations but this difference is not shown for all the levels of irradiation. Indeed, the first sodium caseinate (alanate 110) produced significantly (P σ 0.05) more bityrosine at 7.5% concentration for the 12 kGy level than at 5.0% concentration. The second sodium caseinate (alanate 180) produced significantly (P σ 0.05) more bityrosine at 5.0% concentration with levels of 4 and 8 kGy than at 7.5% concentration. Finally, the calcium caseinate (alanate 380) produced significantly (P σ 0.05) more bityrosine at 5.0% concentration for levels of 4, 8 and 12 kGy compared with 7.5% concentration (see tables 8 and 9).

TABLE 8

Rate of bityrosine formation according to the amount of irradiation received for alanates 110, 180 and 380 at a concentration of 5.0% P/P of proteins.

| DOSE (kGy) | ALANATE-110 | ALANATE-180 | ALANATE-380 |
|---|---|---|---|
| 4 | 19354 ± 11421[1,a] | 20730 ± 762[4,a] | 28552 ± 1621[7,b] |
| 8 | 41071 ± 453[2,c] | 39651 ± 2095[5,c] | 66803 ± 2391[8,d] |
| 12 | 62999 ± 659[3,c] | 66271 ± 1287[6,f] | 82504 ± 1650[9,g] |

There is no unit as these rates are measured by the surface under the curves obtained. For each line, two averages followed by the same letter are not significantly different between them (P>0.05). For each column, two averages followed by the same figure are not significantly different between them (P>0.05).

TABLE 9

Rate of bityrosine formation according to the amount of irradiation received for alanates 110, 180 and 380 at a concentration of 7.5% P/P of proteins.

| DOSE (kGy) | ALANATE-110 | ALANATE-180 | ALANATE-380 |
|---|---|---|---|
| 4 | 24429 ± 1307[1,a] | 17067 ± 547[4,h] | 17192 ± 707[7,b] |
| 8 | 38741 ± 599[2,c] | 35287 ± 1893[5,c] | 39344 ± 687[8,c] |
| 12 | 69305 ± 795[3,d] | 64735 ± 769[6,c] | 61076 ± 607[9,f] |

There is no unit as these rates are measured by the surface under the curves obtained. For each line, two averages followed by the same letter are not significantly different between them (P>0.05). For each column, two averages followed by the same figure are not significantly different between them (P>0.05).

d) Tryptophan proportioning

Figure 6:
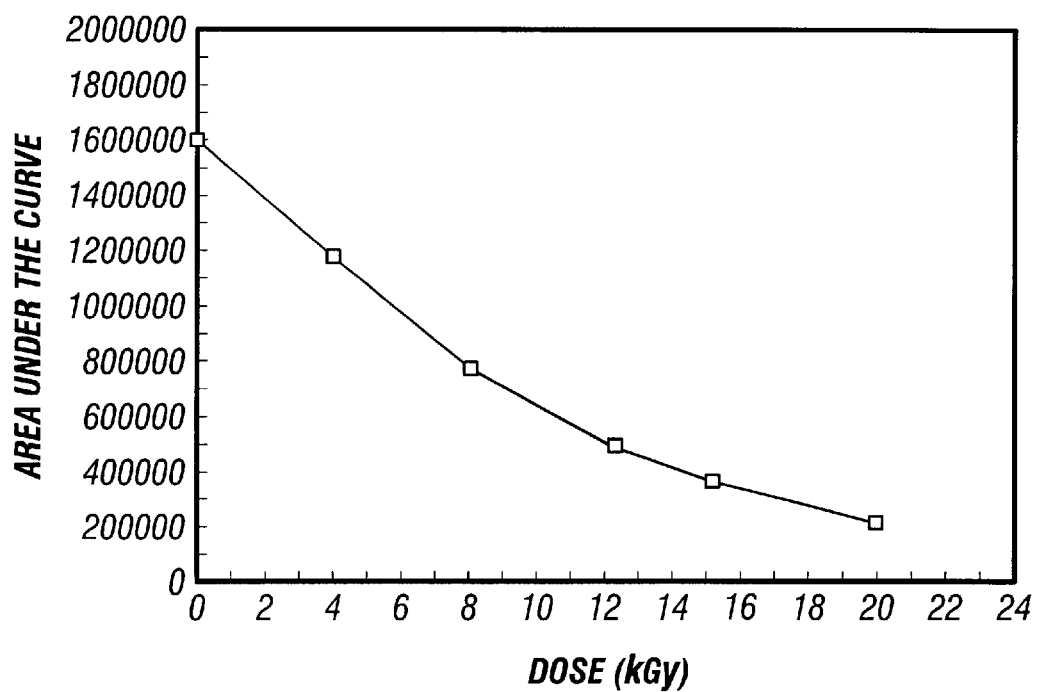
FIG. 6: Oxidation of tryptophan according to the amount of irradiation

The oxidation of a solution of tryptophan residue by •Oh radicals is directly connected to the loss of intensity of the fluorescence signal. FIG. 6 shows the influence of irradiation on a solution of 500 tryptophan PPM.

There is no regular and continuous signal loss as function of the level of irradiation during dosage of caseinates. Even if a significant difference (P σ 0.05) is sometimes perceived between the levels of irradiation for the three caseinates, in no case is there a continuous fall of the signal. This state is perceived for two concentrations (see tables 10 and 11 and FIG. 6).

TABLE 10

Tryptophan dosage according to the level of irradiation received for alanates 110, 180 and 380 with a concentration of 5.0% P/P of proteins

| DOSE (kGy) | ALANATE-110 | ALANATE-180 | ALANATE-380 |
|---|---|---|---|
| 0 | 775511 ± 3047[1,a] | 733889 ± 3222[5,b] | 764770 ± 2693[8,c] |
| 4 | 742878 ± 3570[2,d] | 712041 ± 9816[6,e] | 793769 ± 1677[9,f] |
| 8 | 710587 ± 2122[3,g] | 741933 ± 2615[5,h] | 749959 ± 8149[10,h] |
| 12 | 712735 ± 7679[3,i] | 695793 ± 8417[7,j] | 778002 ± 10064[11,k] |

There is no unit as these rates are measured by the surface under the curves obtained. For each line, two averages followed by the same letter are not significantly different between them (P>0.05). For each column, two averages followed by the same figure are not significantly different between them (P>0.05).

TABLE 11

Tryptophan dosage according to the level of irradiation received for alanates 110, 180 and 380 with a concentration of 5.0% P/P of proteins

| DOSE (kGy) | ALANATE-110 | ALANATE-180 | ALANATE-380 |
|---|---|---|---|
| 0 | 1056499 ± 5231[1,a] | 1022490 ± 8765[5,b] | 128405 ± 22051[8,c] |
| 4 | 1021131 ± 8183[2,d] | 1074262 ± 5076[6,e] | 1101364 ± 3365[9,f] |
| 8 | 1042411 ± 8518[3,g] | 1040796 ± 14792[5,7,g] | 1100961 ± 4713[9,h] |
| 12 | 988217 ± 7563[4,i] | 1054722 ± 13728[6,7,j] | 1108578 ± 14058[8,9,k] | here is no unit as these rates are measured by the surface under the curves obtained. For each line, two averages followed by the same letter are not significantly different between them (P>0.05). For each column, two averages followed by the same figure are not significantly different between them (P>0.05).

e) Selection of the Protein

The physical chemical behavior of the protein solutions during the irradiation treatment enabled us to select the most adequate protein extract for the manufacture of a film. To accomplish this, we studied: 1. the rheological parameters: resistance until rupture and the strain at failure 2. chemical parameters: rates of bityrosine formation and tryptophan loss.

The results obtained for the F/E ratio for calcium caseinate (alanate 380), with a concentration of 5.0%, are slightly higher than the two sodium caseinates (alanates 110 and 180) for levels (4, 8 and 12 kGy. On the other hand, at a concentration of 7.5%, the F/E ratio for calcium caseinate (alanate 380) is significantly higher (P σ 0.05) than the two sodium caseinates (alanates 110 and 180) at 4, 8 and 12 kGy (see tables 4 and 5 and FIG. 3).

The results of measurements of bityrosine formation showed that with 5.0% concentration, calcium caseinate (alanate 380) showed a significantly higher production of bityrosine (P σ 0.05) than the two sodium caseinates (alanates 110 and 180) at 4, 8 and 12 kGy. With 7.5% concentration, the first sodium caseinate (alanate 110) produced significantly more (P σ 0.05) bityrosine at levels of 4 and 12 kGy, whereas at 8 kGy, the three caseinates produced an equivalent quantity of bityrosine (see tables 8 and 9 and FIG. 5).

During the irradiation of the proteinic solutions, the observation of the solutions enabled us to note that the viscosity of sodium caseinates (alanates 110 and 180) increases with the amount of irradiation. This state is perceptible at the time of handling when the solutions are treated at 8 and 12 kGy. At the other end, the viscosity of calcium caseinate (alanate 380) is quasi unchanged as a function of irradiation levels.

According to tables 6 and 7 and FIG. 4, the protein films formed without a plasticizing agent have a low deformation capacity. Then, the presence of a plasticizing agent becomes essential for obtaining a film with a more adequate deformation capacity.

Therefore, according to the preceding results, we chose calcium caseinate (alanate 380) to continue the tests with a plasticizing agent, that is, glycerol.

The Effect of Glycerol in Calcium Caseinate

In this second part, the influence of glycerol as a plasticizing agent was studied. To this end, the three mechanical properties and the dosages of fluorescence were evaluated for purposes of comparison.

Under certain treatment conditions, it is sometimes difficult if not impossible to obtain films with 5.0% protein and 5.0% glycerol without radiation treatment.

a) The Force at Rupture

Figure 7A:
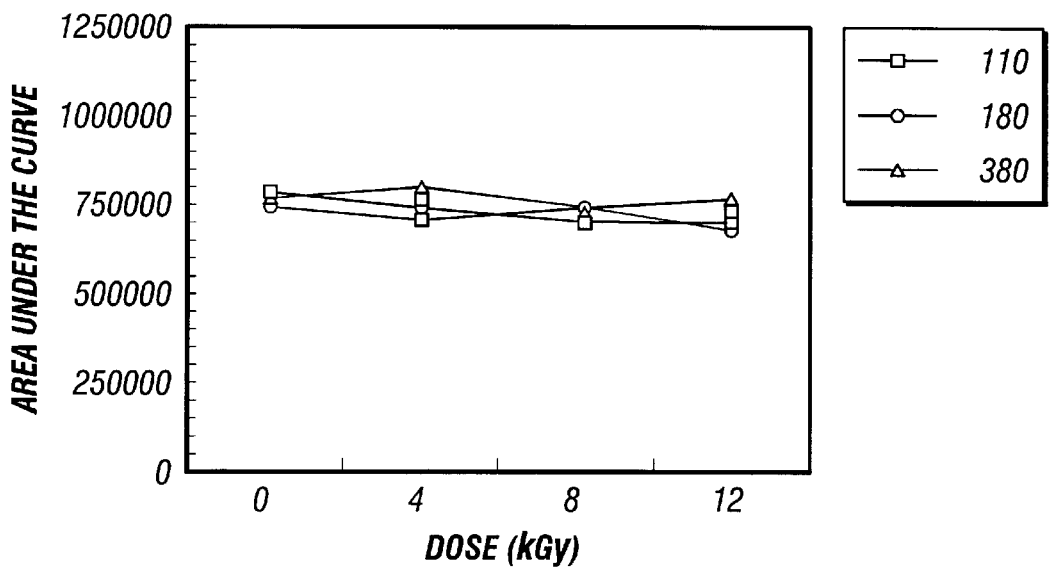
FIG. 7: Tryptophan dosage according to the amount of irradiation received for alanates 110, 180 and 380 with protein concentrations of 5.0% P/P and 7.5% P/P
Figure 7B:
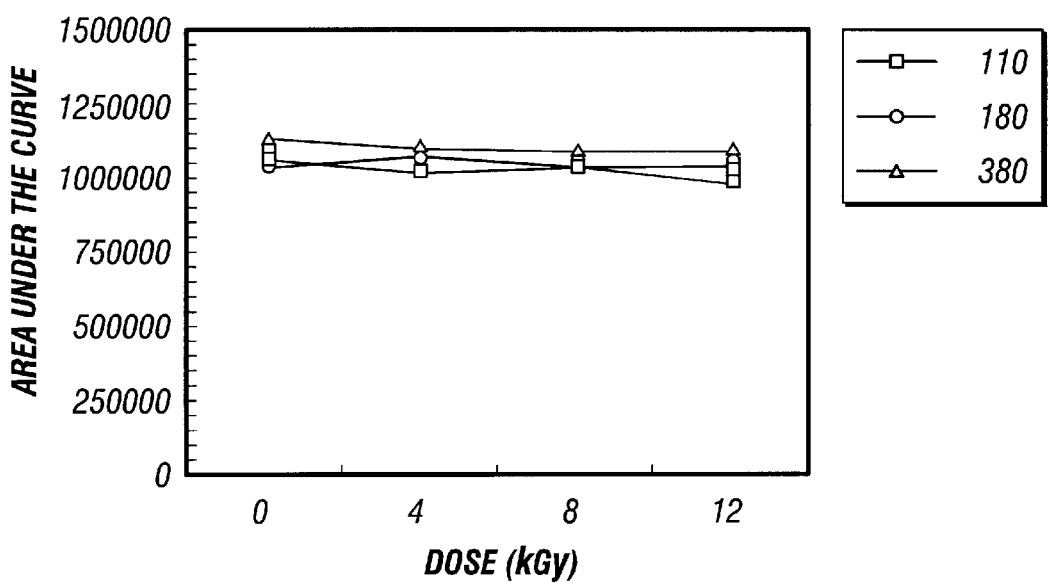

FIG. 7 and tables 12 and 13 show that for concentrations of 5.0% and 7.5%, the F/E ratio decreases as glycerol content increases. Then, a lesser force is necessary to rupture the film when glycerol content increases.

At a concentration of 5.0% protein and 0% glycerol, the F/E ratio remains high and stable (16.3 to 17.4) as a function of the level of irradiation. At 1.0% glycerol, the ratio varies between 11.8 and 13.9 for levels of 0 to 12 kGy and these two extreme values are considered significantly different ($P \delta 0.05$) between them. On the other hand, the F/E ratio increases significantly ($P \delta (0.05)$) at 15 and 20 kGy to reach 16.3 and 17.2 respectively. At a 2.5% glycerol concentration, the F/E ratio grows significantly ($P \delta 0.05$) with the increase in the level of irradiation. It goes from 5.6 to 12.1 and a maximum is reached at 30 kGy. For 5.0% glycerol concentration the F/E ratio also increases significantly ($P \delta 0.05$) as a function of the level of irradiation. It increases from 2.7 to 4.5 and also reaches its maximum at 30 kGy. (see table 12 and FIG. 7). Under these conditions, irradiation contributes to create a more resistant film.

For a protein concentration of 7.5% with 0% of 2.5% glycerol, there is little variation of the F/E ratio for levels varying between 0 and 12 kGy. Indeed, the ratio varies from 16.3 to 17.4 and 10.4 to 11.2 per 0% and 2.5% of glycerol respectively. On the other hand, at glycerol 2.5%, the F/E ratio undergoes an increase but it is not significant (P>0.05) at levels of 15 and 20 kGy. At 5.0% glycerol, the F/E ratio increases significantly ($P \delta 0.05$) with the increase in the level of irradiation; it increases from 4.3 to 6.3 with a maximum at 30 kGy (see table 13 and FIG. 5).

At 5.0% protein the F/E ratio decreases significantly ($P \delta 0.05$) with the addition of glycerol whatever its concentration (1.0%, 2.5% and 5.0%) and this, for all the tested levels of irradiation. In the presence of 7.5% protein, the same phenomenon is observed for levels between 0 and 20 kGy.

At 5.0% glycerol, we observe a significant increase ($P \delta 0.05$) of F/E with the increase in the protein contents and this, for all levels of irradiation. At glycerol 2.5%, we observe the same phenomenon save for the samples treated at 15 kGy.

TABLE 12

The F/E ratio according to the level of received irradiation and the glycerol contents for alanate 380 with a protein concentration of 5.0% P/P.

| DOSE (kGy) | F/E × 100 (N X μm) 5.0%/0% | F/E × 100 (N X μm) 5.0%/1.0% | F/E × 100 (N X μm) 5.0%/2.5% | F/E × 100 (N X μm) 5.0%/5.0% |
|---|---|---|---|---|
| 0 | 16.8 ± 0.9[1,a] | 12.5 ± 0.3[2,3,b] | 5.6 ± 02[5,c] | — |
| 4 | 16.3 ± 1.5[1,d] | 13.9 ± 1.3[3,e] | 5.9 ± 0.1[5,f] | 2.7 ± 0.2[10,g] |
| 8 | 17.4 ± 0.5[1,h] | 12.6 ± 1.1[2,3,i] | 6.9 ± 0.1[6,j] | 3.3 ± 0.1[11,12,k] |
| 12 | 17.2 ± 1.0[1,l] | 11.8 ± 0.1[2,m] | 7.0 ± 0.2[6,n] | 3.8 ± 0.4[11,13,o] |
| 15 | — | 16.3 ± 0.1[4,p] | 10.5 ± 0.4[7,q] | 3.6 ± 0.3[11,12,13,r] |
| 20 | — | 17.2 ± 0.6[4,s] | 10.1 ± 0.4[8,t] | 4.0 ± 0.3[13,u] |
| 30 | — | — | 12.1 ± 0.1[9,v] | 4.5 ± 0.3[14,w] |
| 40 | — | — | 10.7 ± 0.3[7,x] | 3.2 ± 0.3[12,y] |

The term F/E expresses the ratio of the breaking load versus the thickness of film. The Expression 5.0%/1.0% means 5.0% protein with 1.0% glycerol. For each line, two averages followed by the same letter are not significantly different between them (P>0.05). For each column, two averages followed by the same figure are not significantly different between them (P>0.05).

TABLE 13

The F/E ratio according to the level of received irradiation and glycerol contents for alanate 380 with a protein concentration of 7.5% P/P.

| DOSE (kGy) | F/E × 100 (N X μm) 7.5%/0% | F/E × 100 (N X μm) 7.5%/2.5% | F/E × 100 (N X μm) 7.5%/5.0% |
|---|---|---|---|
| 0 | 17.4 ± 0.4[1,a] | 11.0 ± 1.0[3,b] | 4.3 ± 0.2[4,c] |
| 4 | 16.4 ± 0,0[2,d] | 11.2 ± 0.5[3,e] | 4.4 ± 0.2[4,f] |
| 8 | 16.3 ± 0.2[2,g] | 10.4 ± 1.5[3,h] | 4.6 ± 0.1[4,i] |
| 12 | 16.7 ± 0.2[2,j] | 10.5 ± 0.9[3,k] | 5.8 ± 0.2[5,l] |
| 15 | — | 12.5 ± 1.4[3,m] | 5.2 ± 0.2[6,n] |
| 20 | — | 12.1 ± 0.1[3,o] | 5.7 ± 0.15[5,p] |
| 30 | — | — | 6.3 ± 0.1[7] |
| 40 | — | — | 5.9 ± 0.2[5] |

The term F/E expresses the ratio of the breaking load versus the thickness of film. The Expression 7.5%/2.5% means 7.5% protein with 2.5% glycerol. For each line, two averages followed by the same letter are not significantly different between them (P>0.05). For each column, two averages followed by the same figure are not significantly different between them (P>0.05).

b) The Strain at Failure

Figure 8A:
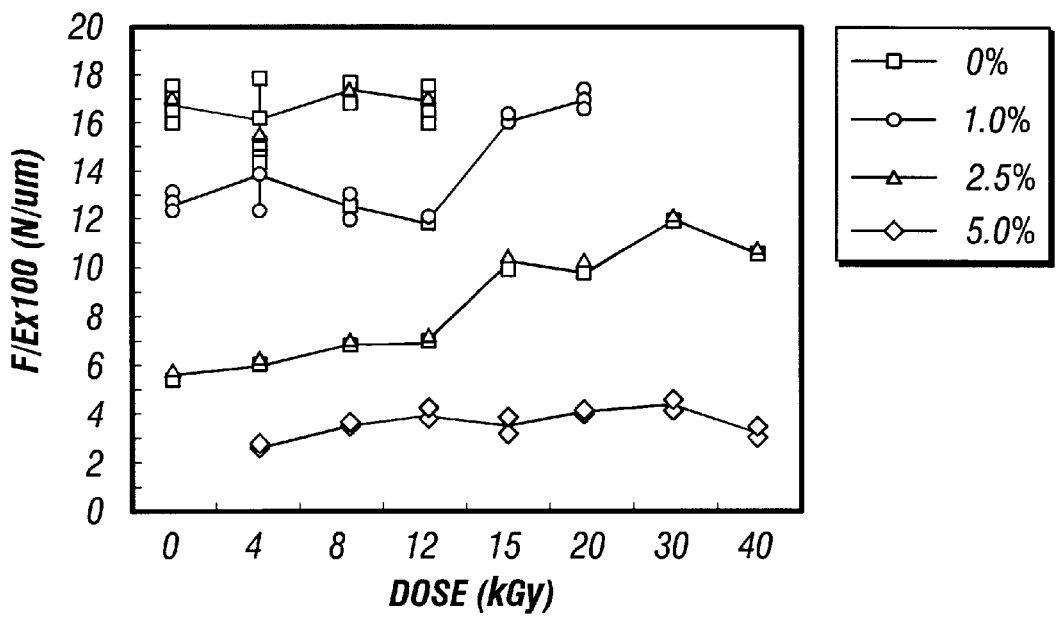
FIG. 8: F/E ration (ration of the breaking load versus the thickness of film) according to the amount of received irradiation and glycerol contents for alanate 380 with protein concentrations of 5.0% P/P and 7.5% P/P
Figure 8B:
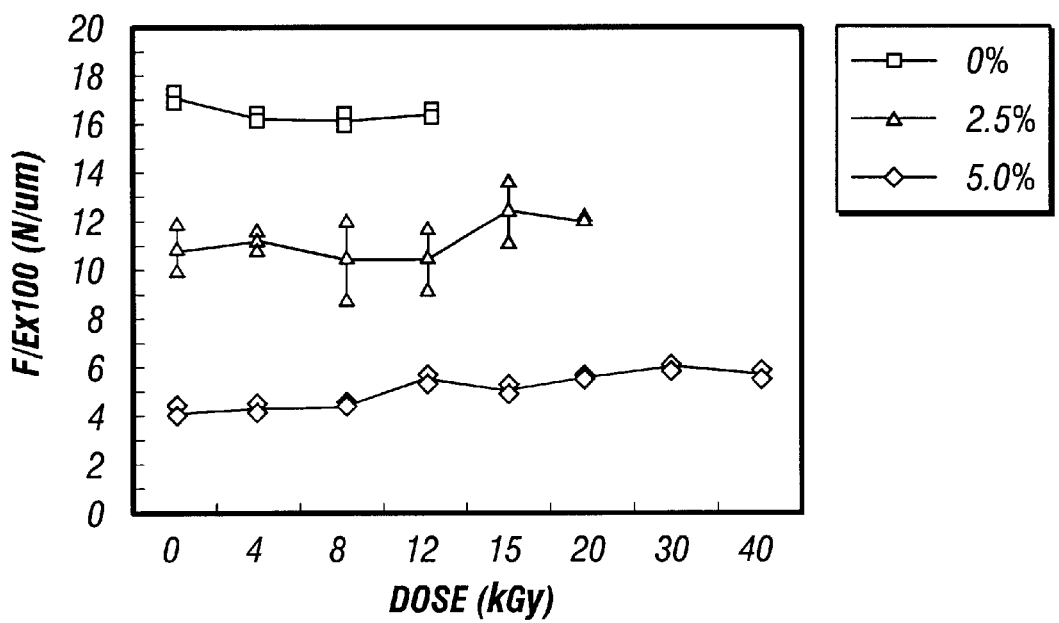

According to FIG. 8 and tables 14 and 15, the presence of glycerol strongly increases the deforming capacity of films.

Figure 9A:
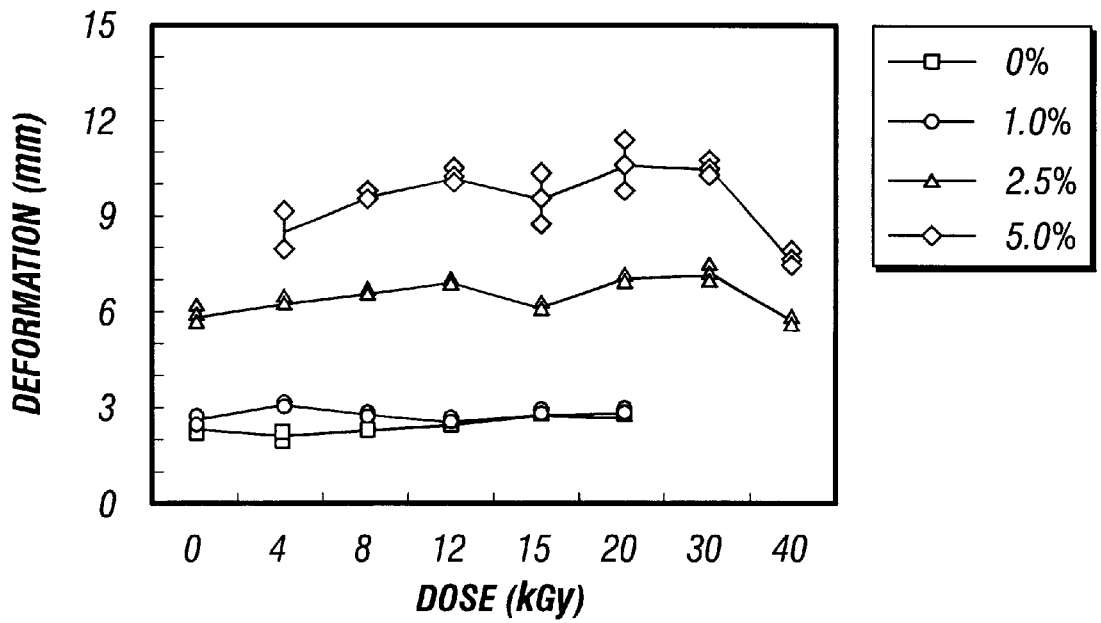
FIG. 9: Deformation according to the amount of received irradiation and glycerol contents for alanate 380 with protein concentrations of 5.0% P/P and 7.5% P/P
Figure 9B:
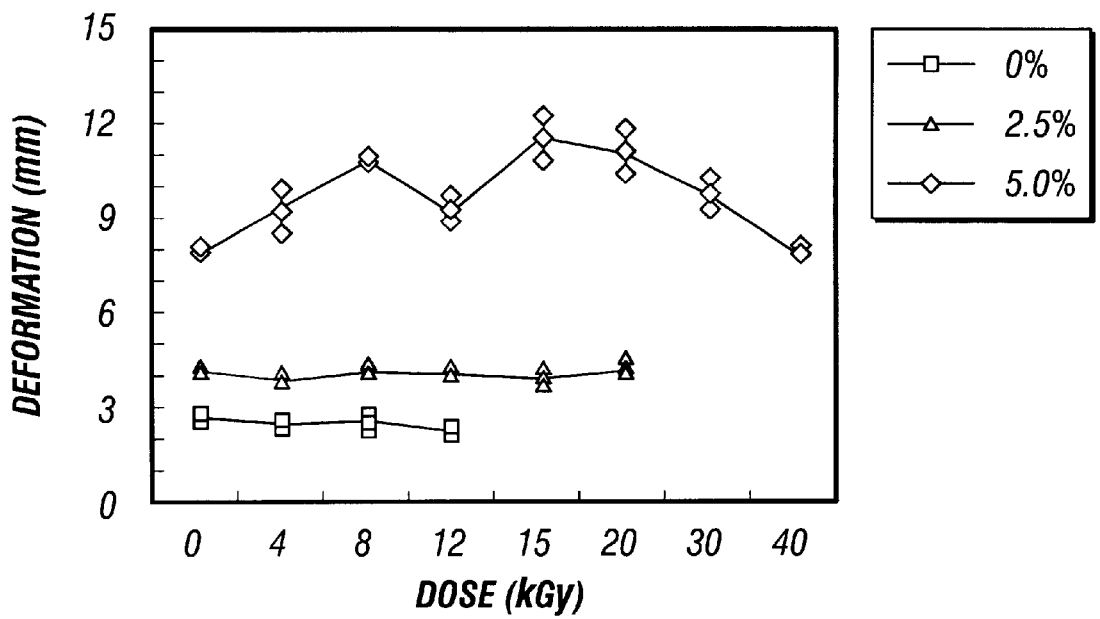

At 5.0% protein, the amount of irradiation and the addition of 1.0% glycerol do not bring comparatively important changes to the deforming capacity of films in the absence of glycerol. The deformation varies from 2.2 mm to 2.4 mm and from 2.6 mm to 2.9 mm for 0% and 1.0% glycerol respectively. Whereas in 2.5% and 5.0% glycerol, the deforming capacity increases significantly ($P \delta 0.05$) with the increase in the level of irradiation. The deformation varies from 5.7 mm to 7.4 mm for 2.5% glycerol and from 7.6 mm to 10.8 mm for glycerol 5.0%. A maximum is reached between 20 and 30 kGy for these two concentrations of glycerol (see table 14 and FIG. 9). Therefore, irradiation contributes to improve the deforming capacity of films. The difference between the deformation and the three concentrations of glycerol is considered significant ($P \delta 0.05$) at all levels of irradiation.

For a 7.5% concentration of protein, the presence of 2.5% of glycerol does not bring a significant different (P>0.05) in the deformation as a function of the levels of irradiation (0 to 20 kGy). The deformation varies from 3.8 mm to 4.2 mm between levels of 0 and 20 kGy. On the other hand, the difference in deformation between 0% and 2.5% of glycerol is considered significant (P δ 0.05) for levels 0 to 12 kGy. With the addition of 5.0% of glycerol, the deformation is significantly higher (P δ 0.05) than in the presence of 2.5% or the in absence of glycerol. The deformation values vary from 7.7 mm to 11.6 mm as a function of the levels of irradiation to a maximum value towards 15 to 20 kGy (see table 15 and FIG. 9).

At 2.5% glycerol, the deformation to 5.0% of proteins is significantly higher (P δ 0.05) than at 7.5% of proteins for levels of 0 to 20 kGy (see tables 14 and 15).

For a 5.0% glycerol concentration, there is a significant difference (P δ 0.05) of the deformation between the two protein concentrations. The deformation is higher at protein 7.5% compared to 5.0% for levels of 4, 8, 15, 20 and 40 kGy. It is significantly higher (P δ 0.05) than for levels of 8, 15 and 40 kGy. At 12 and 30 kGy, the deformation with 7.5% protein is lower than that obtained at 5.% (see tables 14 and 15). However, this difference is significantly lower (P δ 0.05) only at 12 kGy.

Therefore, deformation as a function of the level of irradiation is higher in the presence of 5.0% glycerol and this, for the two protein concentrations. The effect of the level of irradiation on deformation is more evident in the presence of 7.5% of proteins and 5.0% of glycerol. In the presence of 2.5% glycerol and 5.0% protein, the deformation undergoes a slight increase as a function of the level amount but it is considered significant (P δ 0.05).

TABLE 14

Strain at failure as a function of the level of received irradiation and glycerol contents for alanate 380 at a protein concentration of 5.0% P/P.

| DOSE (kGy) | DEFORMATION (mm) 5.0%/0% | DEFORMATION (mm) 5.0%/1.0% | DEFORMATION (mm) 5.0%/2.5% | DEFORMATION (mm) 5.0%/5.0% |
|---|---|---|---|---|
| 0 | $2.3 \pm 0.1^{1,2,a}$ | $2.6 \pm 0.1^{3,a}$ | $5.7 \pm 0.4^{6,b}$ | — |
| 4 | $2.2 \pm 0.1^{1,c}$ | $2.9 \pm 0.1^{4,d}$ | $6.1 \pm 0.2^{6,7,e}$ | $8.5 \pm 04^{10,f}$ |
| 8 | $2.3 \pm 0.2^{1,2,g}$ | $2.8 \pm 0.1^{3,4,5,h}$ | $6.6 \pm 0.1^{7,8,i}$ | $9.5 \pm 0.1^{11,j}$ |
| 12 | $2.4 \pm 0.1^{2,k}$ | $2.6 \pm 0.1^{3,5,k}$ | $7.0 \pm 0.3^{8,9,l}$ | $10.3 \pm 0.3^{12,13,m}$ |
| 15 | — | $2.9 \pm 0.2^{4,5,n}$ | $6.2 \pm 0.2^{6,7,o}$ | $9.6 \pm 0.6^{11,12,p}$ |
| 20 | — | $2.9 \pm 0.2^{4,q}$ | $7.3 \pm 0.3^{9,r}$ | $10.8 \pm 0.7^{13,s}$ |
| 30 | — | — | $7.4 \pm 0.5^{9,t}$ | $10.7 \pm 0.2^{13,u}$ |
| 40 | — | — | $5.9 \pm 0.2^{6,v}$ | $7.6 \pm 0.3^{14,w}$ |

The expression 5.0%/1.0% means protein 5.0% with glycerol 1.0%. For each line, two averages followed by the same letter are not significantly different between them (P>0.05). For each column, two averages followed by the same figure are not significantly different between them (P>0.05).

TABLE 15

Strain at failure as a function of the amount of received irradiation and glycerol contents for alanate 380 with a protein concentration of 7.5% P/P.

| DOSE (kGy) | DEFORMATION (mm) 7.5%/0% | DEFORMATION (mm) 7.5%/2.5% | DEFORMATION (mm) 7.5%/5.0% |
|---|---|---|---|
| 0 | $2.7 \pm 0.1^{1,a}$ | $4.1 \pm 0.4^{3,b}$ | $7.7 \pm 0.2^{4,c}$ |
| 4 | $2.5 \pm 0.1^{1,2,d}$ | $3.8 \pm 0.3^{3,e}$ | $9.4 \pm 0.5^{5,6,f}$ |
| 8 | $2.6 \pm 0.2^{1,2,g}$ | $4.0 \pm 0.3^{3,h}$ | $11.0 \pm 0.1^{7,i}$ |
| 12 | $2.3 \pm 0.2^{2,j}$ | $4.0 \pm 0.3^{3,k}$ | $9.1 \pm 0.3^{5,l}$ |
| 15 | — | $3.9 \pm 0.4^{3,m}$ | $11.6 \pm 0.6^{7,n}$ |
| 20 | — | $4.2 \pm 0.2^{3,o}$ | $11.2 \pm 0.6^{7,p}$ |
| 30 | — | — | $10.0 \pm 0.5^{6}$ |
| 40 | — | — | $8.3 \pm 0.3^{4}$ |

The expression 7.5%/2.5% means protein 7.5% with glycerol 2.5%. For each line, two averages followed by the same letter are not significantly different between them (P>0.05). For each column, two averages followed by the same figure are not significantly different between them (P>0.05).

c) Viscoelasticity

Figure 10:
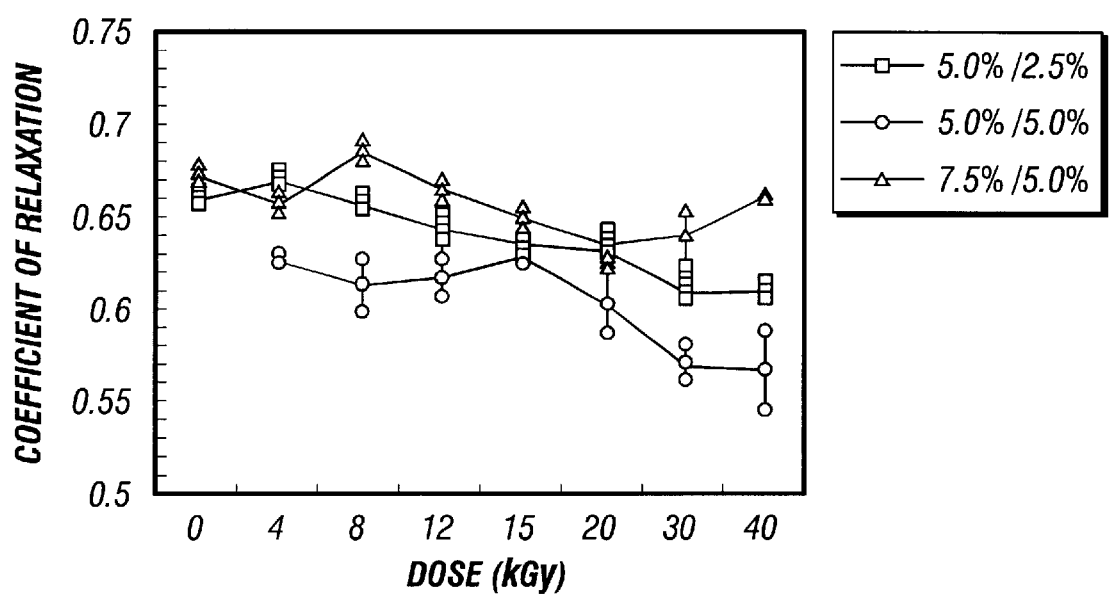
FIG. 10: Viscoelasticity according to the amount of received irradiation and glycerol contents for alanate 380 with protein concentrations of 5.0% P/P and 7.5% P/P

A characteristic sought in a film is its elasticity, i.e., a film having a low relaxation coefficient. According to relaxation results, films irradiated with calcium caseinate (alanate 380) are viscoelastic products with a relaxation coefficient varying between 0.57 to 0.69 according to the composition of the films (see table 16 and FIG. 10).

Only films able to deform with more than three millimeters (3.0 mm) can be studied as viscoelasticity is measured following a sustained deformation of 3.0 mm. In the present case, three compositions of mediums were retained, that is, 5.0% protein with 2.5% and 5.0% glycerol and 7.5% proteins with 5.0% glycerol.

For a concentration of 5.0% proteins with 2.5% and 5.0% glycerol, irradiation tends to produce a more elastic film since the relaxation coefficients decrease significantly (P δ 0.05) with the increase in the level of irradiation. The values of coefficients vary from 0.66 to 0.61 and 0.63 to 0.57 for glycerol concentrations of 2.5% and 5.0% respectively. A minimum relaxation coefficient is obtained between 30 and 40 kGy for these two glycerol concentrations (see table 16 and FIG. 10). The difference between the two glycerol concentrations is significant (P δ 0.05) at all levels of irradiation except for levels of 15 and 20 kGy. Thus, the addition of 5.0% glycerol produces a more elastic film with a weaker relaxation coefficient.

With a protein concentration of 7.5% and 5.0% glycerol, irradiation tends to lower significantly (P δ 0.05) the relaxation coefficient except when one irradiates at 8 kGy where a maximum value is reached. The values of coefficients vary from 0.67 to 0.63 according to the amounts of irradiation. Then, irradiation contributes to produce a more elastic film with a minimal value following a treatment located between 20 and 40 kGy (see table 16 and FIG. 10).

At 5.0% glycerol, the relaxation coefficients at 5.0% protein are significantly lower (P δ 0.05) than those obtained 7.5% proteins for all levels of irradiation.

TABLE 16

Relaxation coefficients as a function to the level of received irradiation and glycerol contents for alanate 380 with protein concentrations of 5.0% P/P and 7.5% P/P

| DOSE (kGy) | 5.0%/2.5% | 5.0%/5.0% | 7.5%/5.0% |
|---|---|---|---|
| 0 | 0.66 ± 0.01[1,2] | — | 0.67 ± 0.01[10] |
| 4 | 0.67 ± 0.00[1,a] | 0.63 ± 0.00[7,b] | 0.66 ± 0.01[11,12,c] |
| 8 | 0.66 ± 0.01[2,3,d] | 0.61 ± 0.01[7,8,e] | 0.69 ± 0.01[13,f] |
| 12 | 0.65 ± 0.01[3,4,g] | 0.62 ± 0.01[7,8,h] | 0.66 ± 0.01[10,11,f] |
| 15 | 0.64 ± 0.00[4,5,j] | 0.63 ± 0.01[7,j] | 0.65 ± 0.01[12,14,k] |
| 20 | 0.63 ± 0.01[5,l] | 0.60 ± 0.02[8,l] | 0.64 ± 0.01[15,m] |
| 30 | 0.61 ± 0.01[6,n] | 0.57 ± 0.01[9,o] | 0.64 ± 0.01[15,p] |
| 40 | 0.61 ± 0.01[6,q] | 0.57 ± 0.02[9,r] | 0.63 ± 0.00[15] |

The expression 5.0%/2.5% means protein 5.0% with glycerol 2.5%. For each line, two averages followed by the same letter are not significantly different between them (P>0.05). For each column, two averages followed by the same figure are not significantly different between them (P>0.05). The statistical evaluation with glycerol 5.0% is made only for one concentration of 5.0% and protein 7.5%.

d) Rate of Bityrosine Formation

The average value obtained with 0 kGy was subtracted from those obtained from the various levels of irradiation with the aim of obtaining the real rate of bityrosine formation.

Figure 11A:
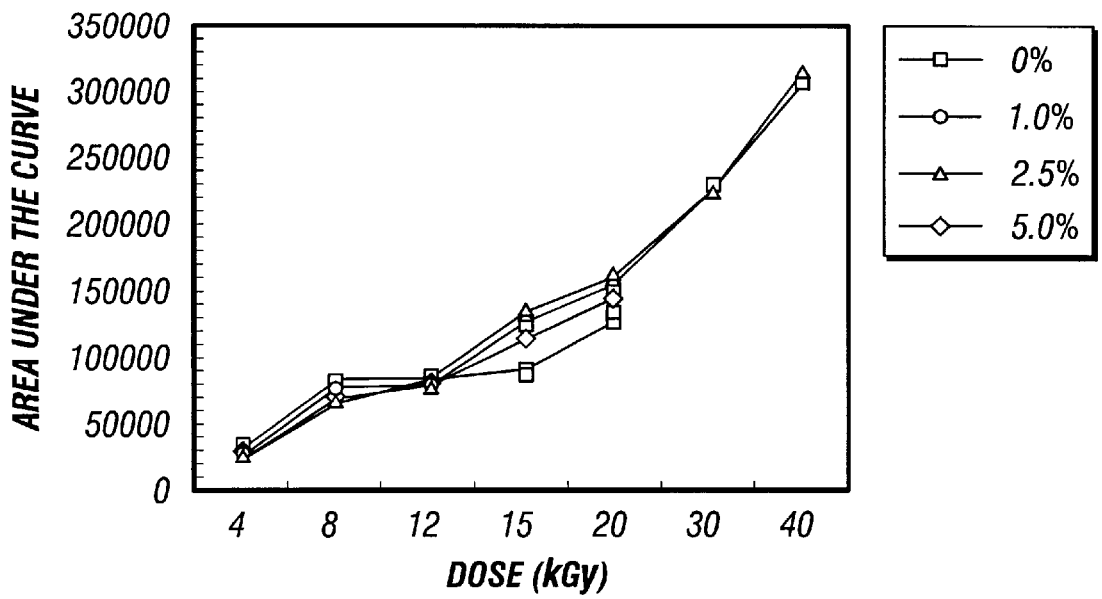
FIG. 11: Rate of formation of bityrosine according to the amount of received irradiation and glycerol contents for alanate 380 with protein concentrations of 5.0% P/P and 7.5% P/P
Figure 11B:
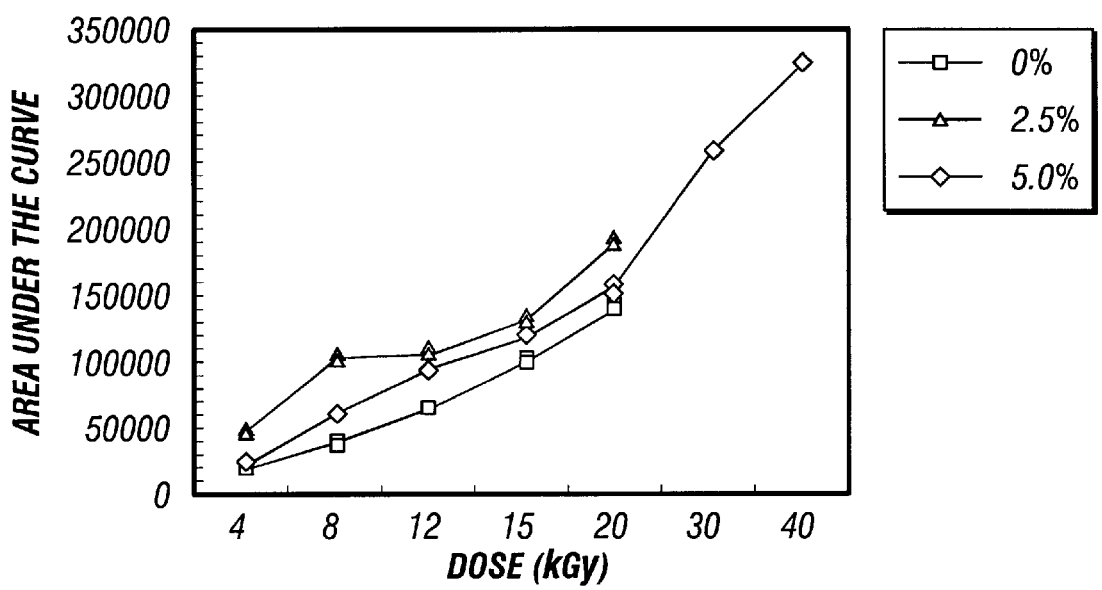

The rate of bityrosine formation increases proportionally with the increase in the level of irradiation for the two protein concentrations (see tables 17 and 18 and FIG. 11). The rate of bityrosine formation increases by 23,000 to 350,000 (in arbitrary units of area) for amounts varying from 4 to 40 kGy for the two protein concentrations.

For a 5.0% protein concentration, the rate of bityrosine formation is significantly higher (P δ 0.05) in the presence of glycerol (1.0%, 2.5% and 5.0%) compared to its absence (0%) for levels of 15 and 20 kGy (see table 17). At 7.5% protein, the presence of glycerol (2.5% and 5.0%) significantly increases (P δ 0.05) the rate of bityrosine formation for levels of 4 to 20 kGy (see table 17 and FIG. 11).

Moreover, we note than in the presence of 2.5% glycerol, the rate of bityrosine formation in the sample of protein containing 7.5% doubled compared to the sample containing protein containing 5.0% (43513 vs. 20503) and when this one is irradiated at 4 kGy (see tables 17 and 18). We also note an increase of approximately 10% of the bityrosine content when the protein samples (5.0% and 7.5%) are irradiated at 20 kGy in absence and in the presence of glycerol 2.5%. On the other hand, there is no relation between the rate of bityrosine formation and the protein concentration in the presence of 5.0% glycerol.

As glycerol alone in the buffer does not absorb and does not emit at the of excitation and emission wavelengths used, it seems to favour the formation of bityrosine. There exists a linear relation between the rate of bityrosine formation and the levels of irradiation for the various protein-glycerol mixtures that were tested.

TABLE 17

Rate of bityrosine formation according to the level of received irradiation and glycerol contents for alanate 380 with a protein concentration of 5.0% P/P.

| DOSE (kGy) | 5.0%/0% | 5.0%/1.0% | 5.0%/2.5% | 5.0%/5.0% |
|---|---|---|---|---|
| 4 | 28552 ± 1621[1,a] | 21836 ± 1484[6,bc] | 20503 ± 941[11,b] | 23126 ± 1482[18,c] |
| 8 | 66803 ± 2391[2,d] | 76436 ± 1006[7,e] | 66439 ± 1805[12,d] | 81304 ± 2395[19,f] |
| 12 | 82504 ± 1650[3,g] | 79531 ± 1964[8,h] | 75782 ± 1206[13,i] | 85465 ± 1392[20,j] |
| 15 | 89584 ± 1817[4,k] | 113309 ± 2249[9,l] | 134112 ± 1328[14,m] | 125394 ± 1551[21,n] |
| 20 | 129044 ± 931[5,n] | 146654 ± 1511[10,p] | 163519 ± 1126[15,q] | 158853 ± 2892[22,r] |
| 30 | — | — | 254378 ± 1440[16,s] | 256610 ± 2398[23,s] |
| 40 | — | — | 348299 ± 4022[17,t] | 336676 ± 2254[24,u] |

There is not unit as these rates are measured by the surface under the curves obtained. Expression 5.0%/2.5% means protein 5.0% with glycerol 2.5%. For each line, two averages followed by the same letter are not significantly different between them (P>0.05). For each column, two averages followed by the same figure are not significantly different between them (P>0.05).

TABLE 18

Rate of bityrosine formation according to the level of received irradiation and glycerol contents for alanate 380 with protein concentration of 7.5% P/P.

| DOSE (kGy) | 7.5%/0% | 7.5%/2.5% | 7.5%/5.0% |
|---|---|---|---|
| 4 | 17192 ± 1621[1,a] | 43513 ± 1328[6,b] | 20803 ± 928[11,e] |
| 8 | 39344 ± 687[2,d] | 97240 ± 4388[7,e] | 57961 ± 897[12,f] |
| 12 | 61076 ± 607[3,g] | 103811 ± 1653[8,h] | 92734 ± 1901[13,i] |
| 15 | 955871 ± 1252[d,j] | 128415 ± 1232[9,k] | 117110 ± 1398[14,l] |
| 20 | 1392491 ± 1697[5,m] | 184986 ± 1581[10,n] | 151133 ± 1653[15,o] |
| 30 | — | — | 290277 ± 1848[16] |
| 40 | — | — | 3627561 ± 1564[17] |

There is no unit for these rates are measured by the surface under the curves obtained. Expression 7.5%/2.5% means 7.5% protein with 2.5% glycerol. For each line, two averages followed by the same letter are not significantly different between them (P>0.05). For each column, two averages followed by the same figure are not significantly different between them (P>0.05).

e) Dosage of Tryptophan

Figure 12A:
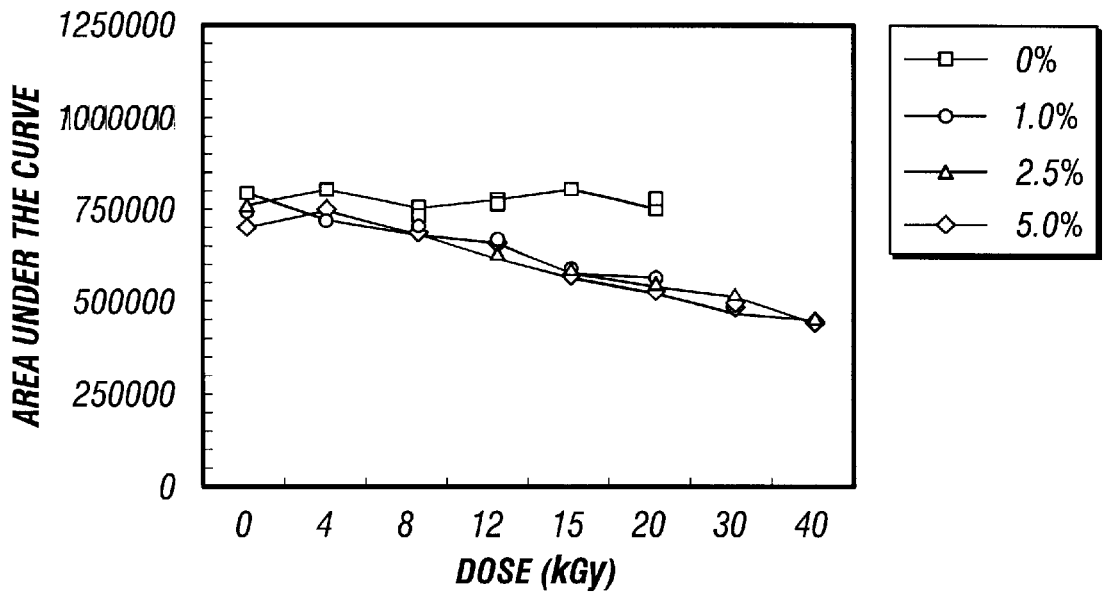
FIG. 12: Tryptophan proportioning according to the amount of received irradiation and the glycerol contents for alanate 380 with protein concentrations of 5.0% P/P and 7.5% P/P
Figure 12B:
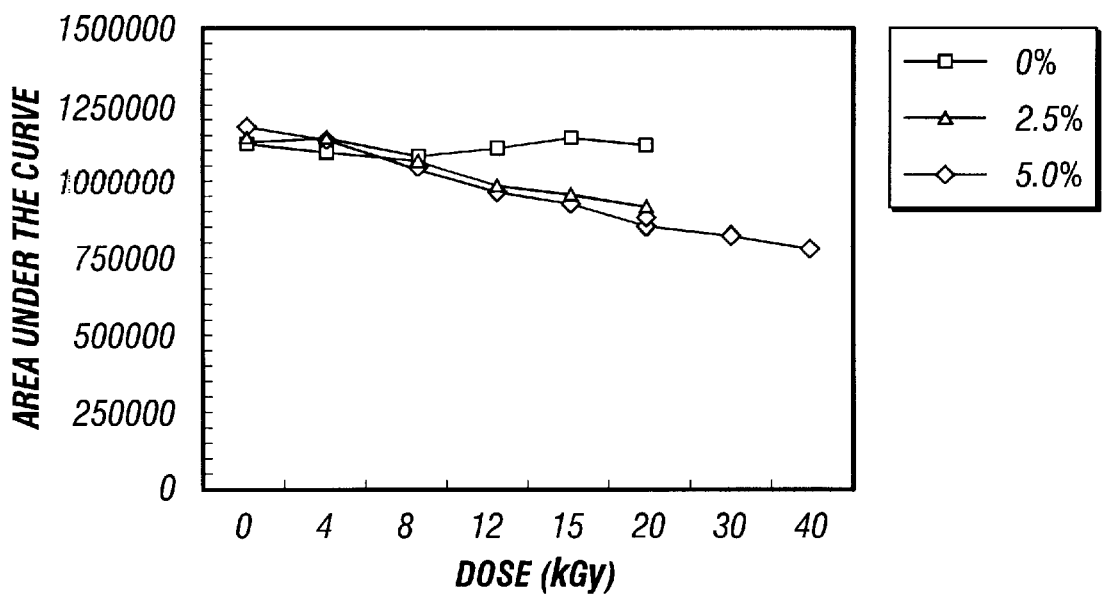
Figure 13A:
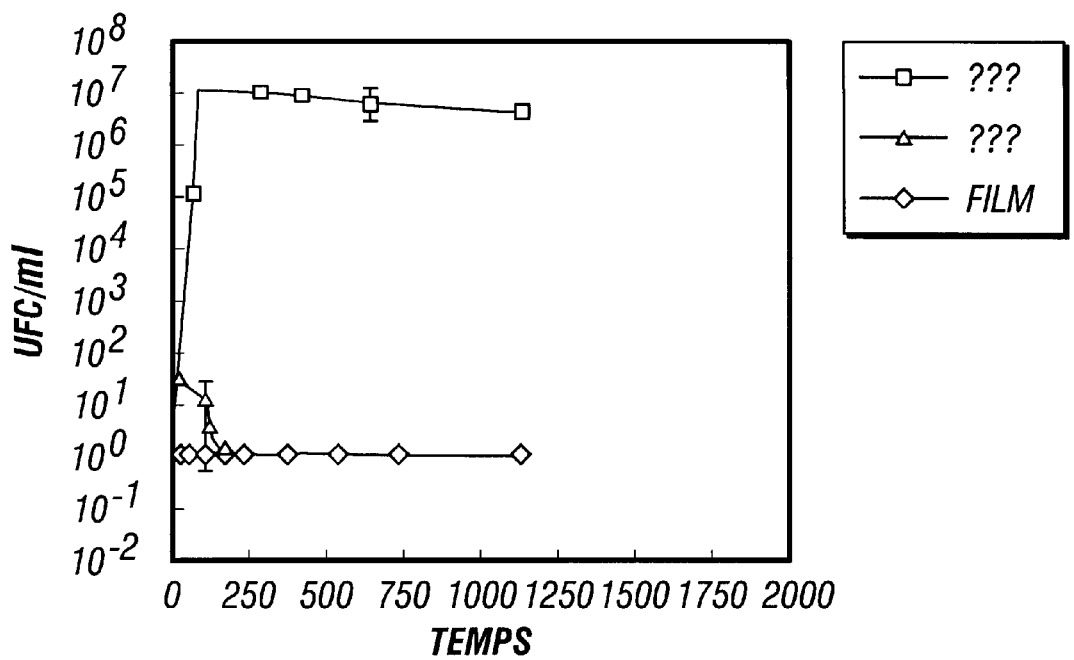
FIG. 13: Test #1 of the growth of *Pseudomonas fragi* in the presence and absence of a film sample of alanate 380 composed of 5.0% P/P proteins and 2.5% P/P of glycerol, 20 kGy irradiation
Figure 13B:
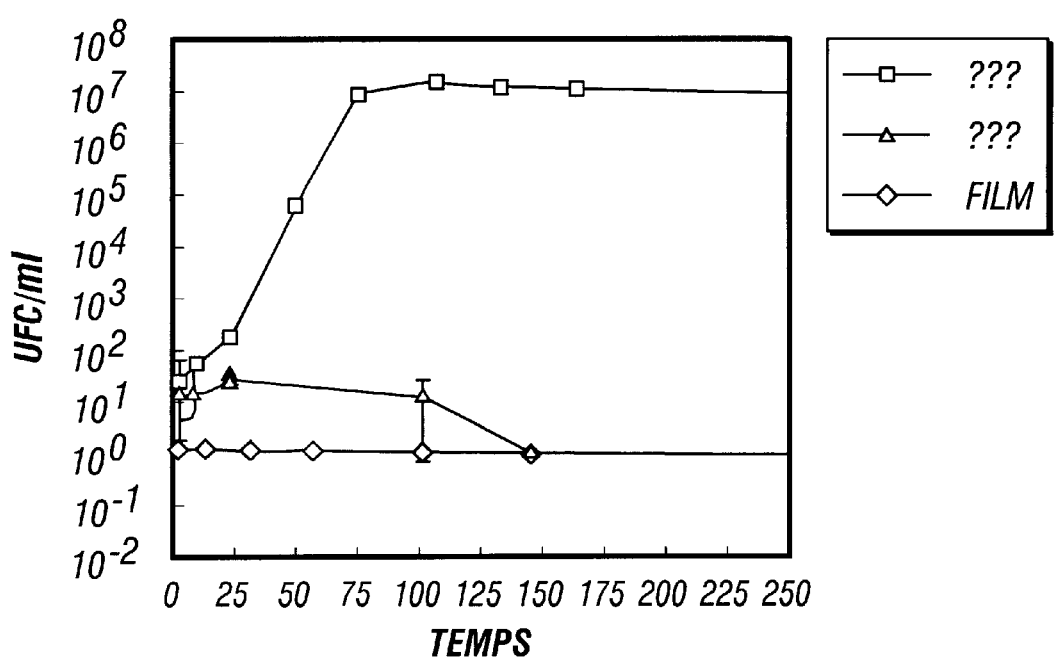
Figure 14A:
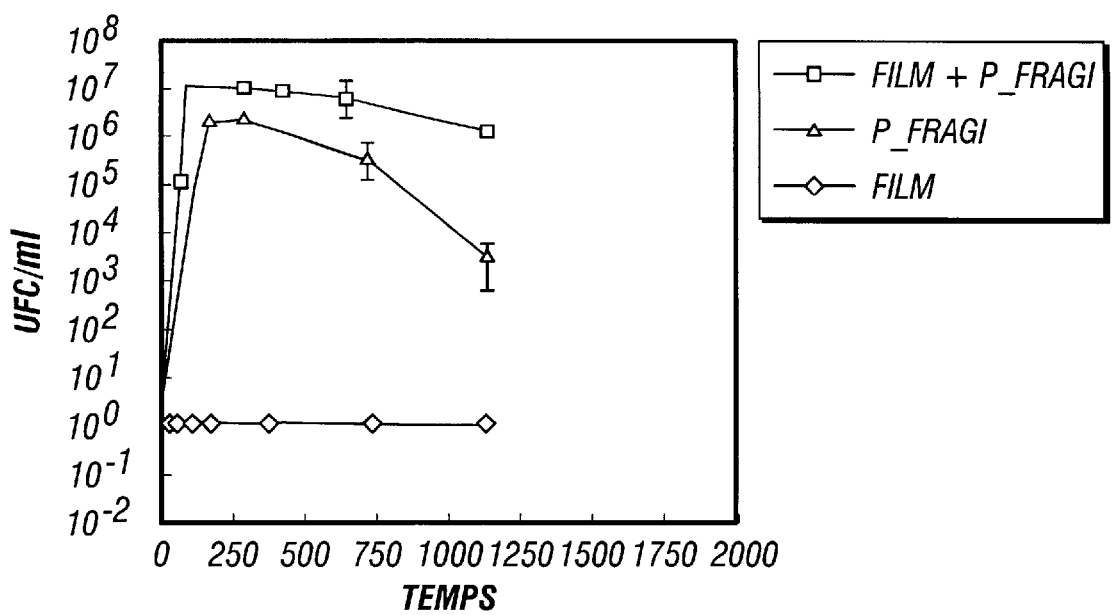
FIG. 14: Test #2 of the growth of *Pseudomonas fragi* in the presence and absence of a film sample of alanate 380 composed of 5.0% P/P of proteins and 2.5% P/P of glycerol, 20 kGy irradiation
Figure 14B:
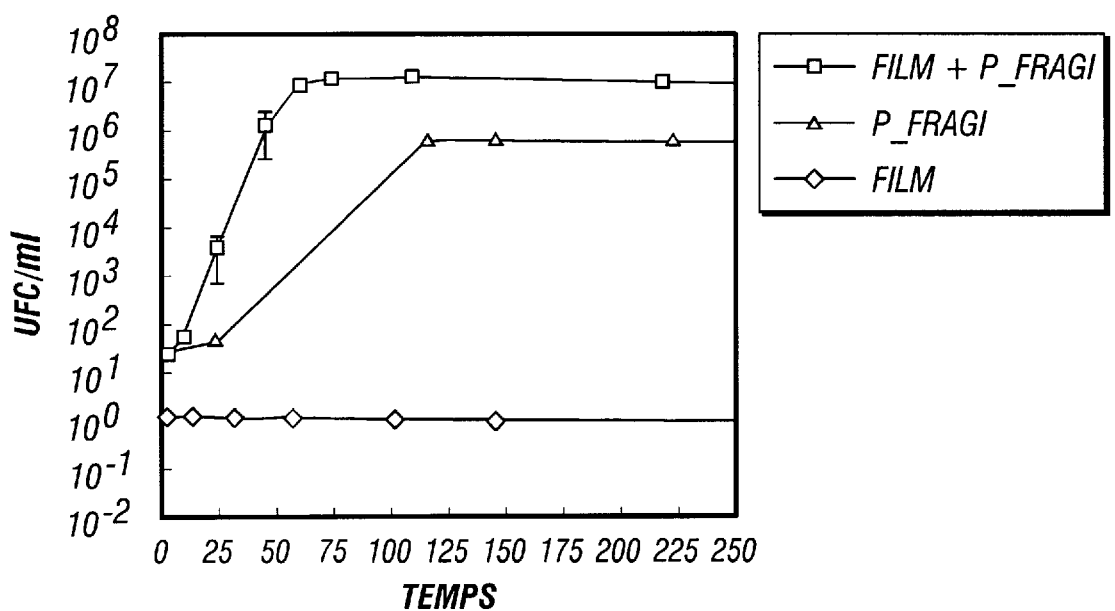
Figure 15A:
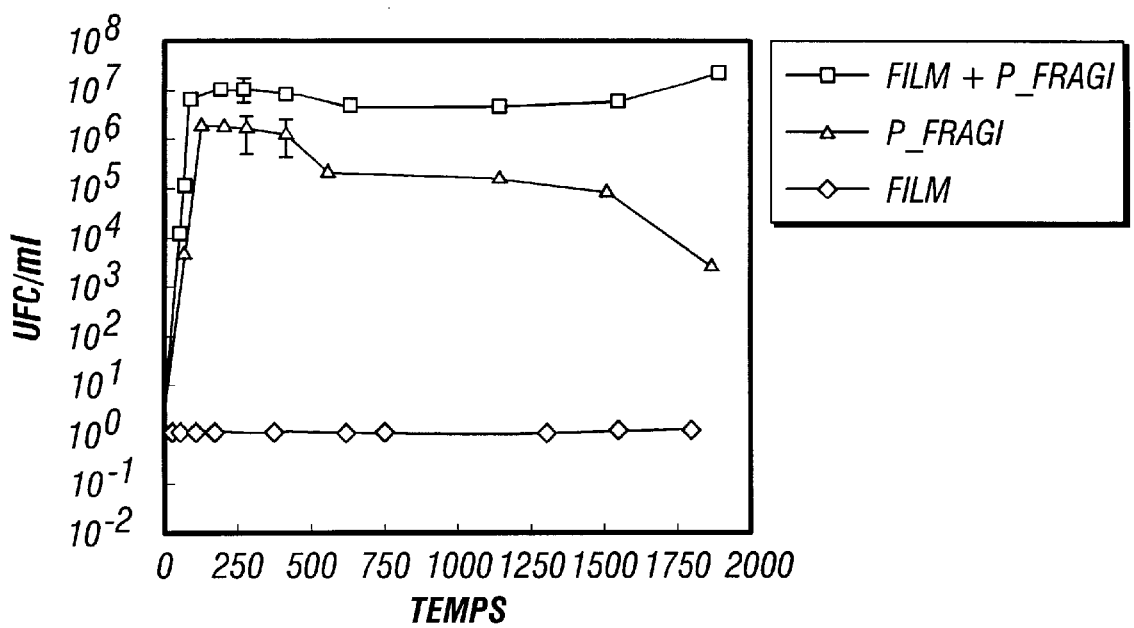
FIG. 15: Test #3 of the growth of *Pseudomonas fragi* in the presence and absence of a film sample of alanate 380 composed of 5.0% P/P of proteins and 2.5% P/P of glycerol, 20 kGy irradiation
Figure 15B:
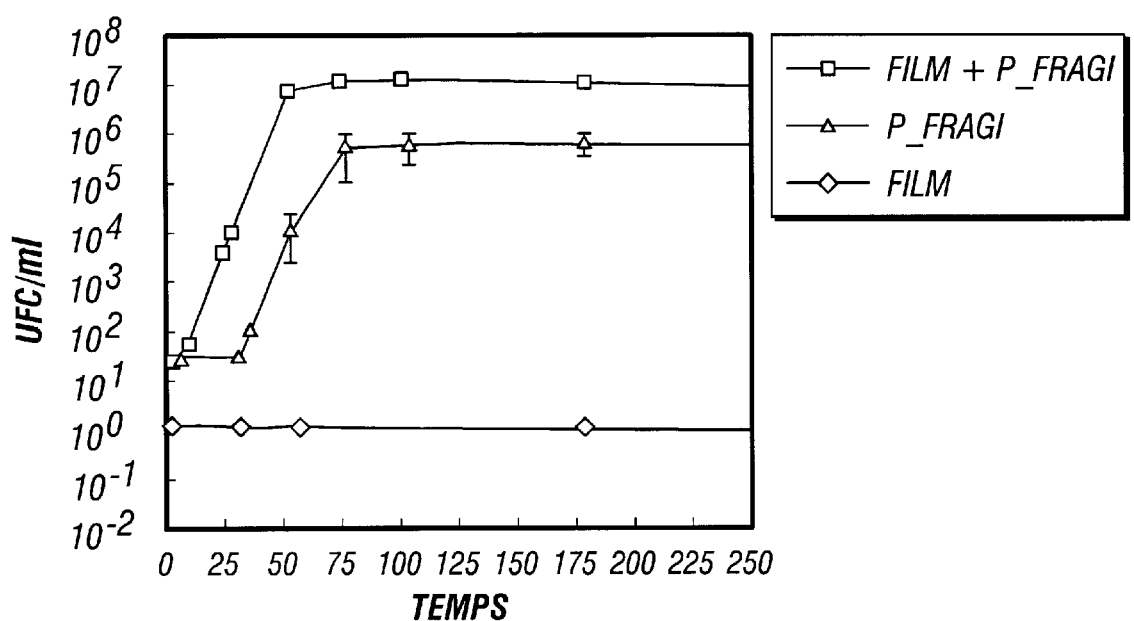
Figure 13A:
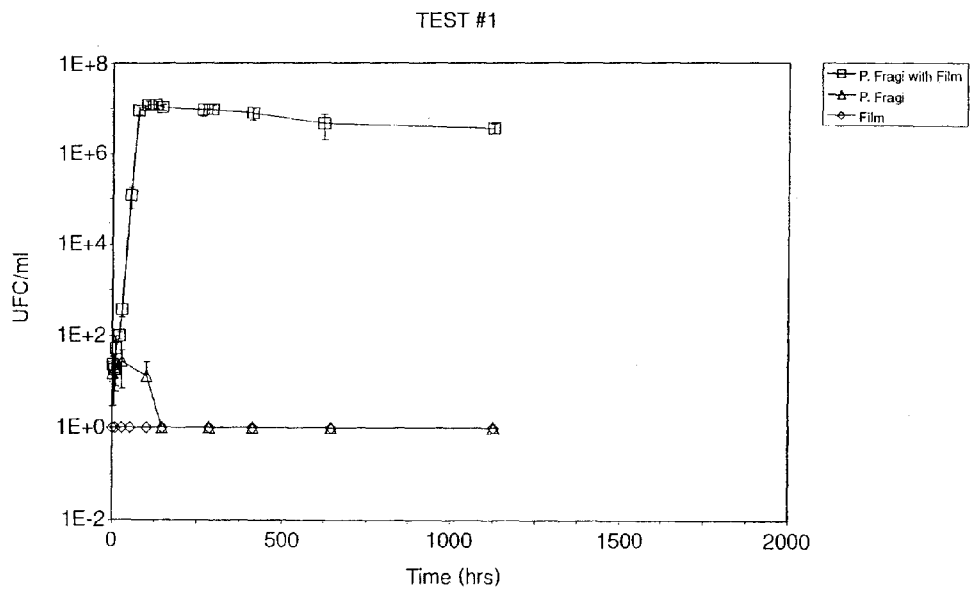
Figure 13B:
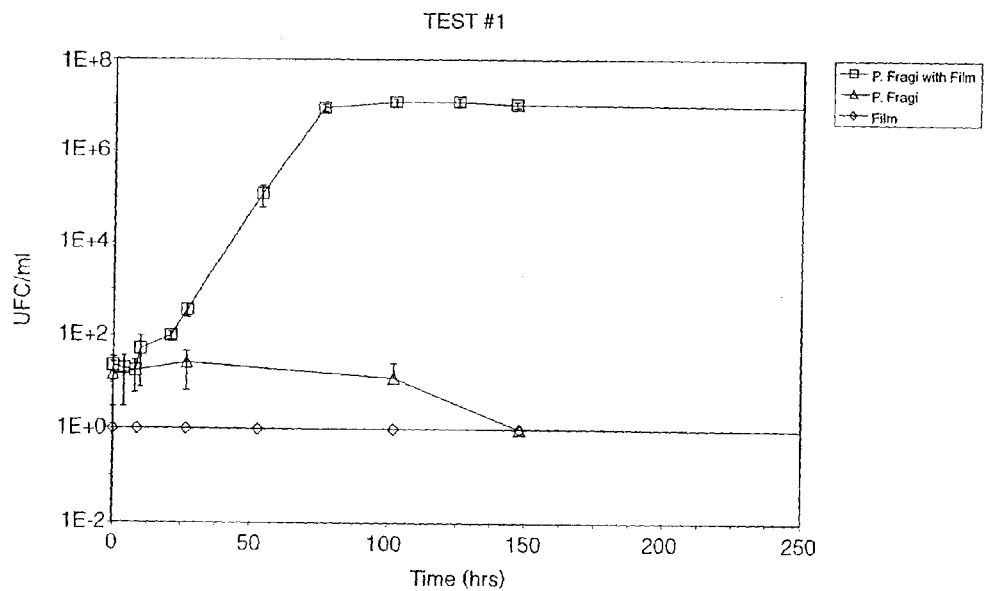
Figure 14A:
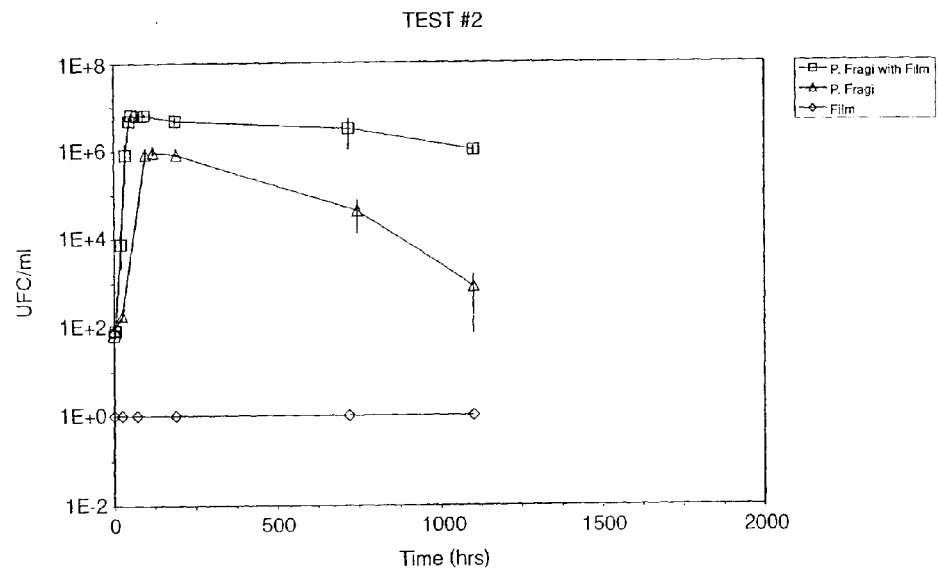
Figure 14B:
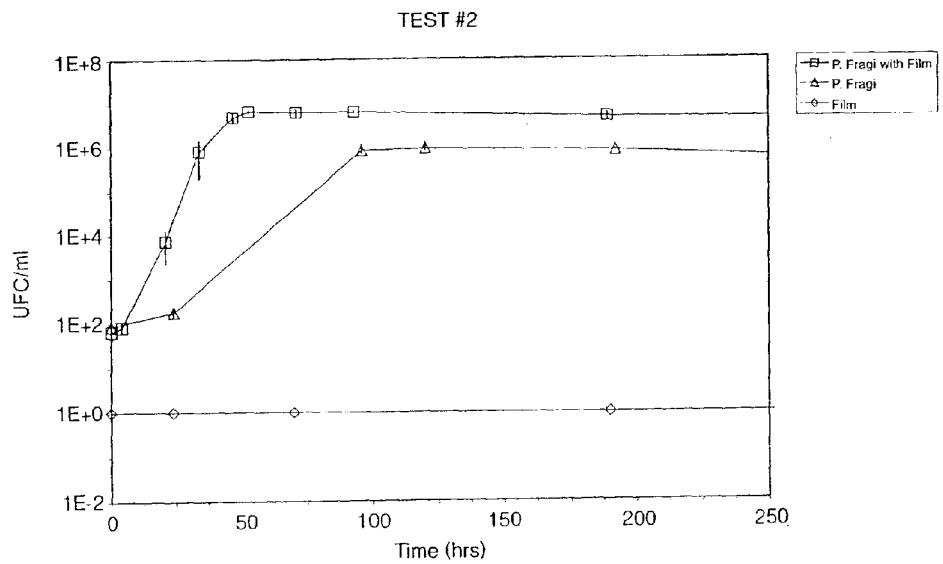
Figure 15A:
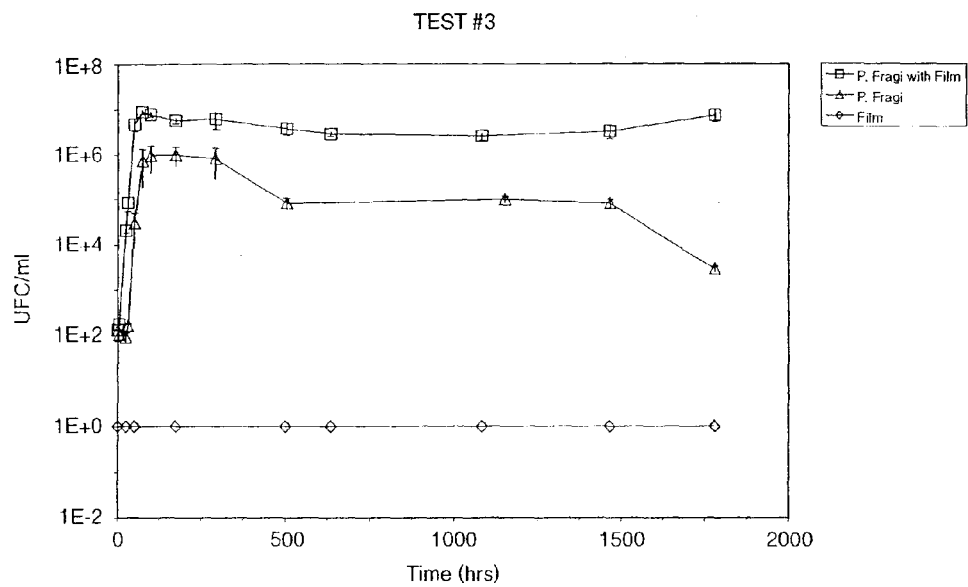
Figure 15B:
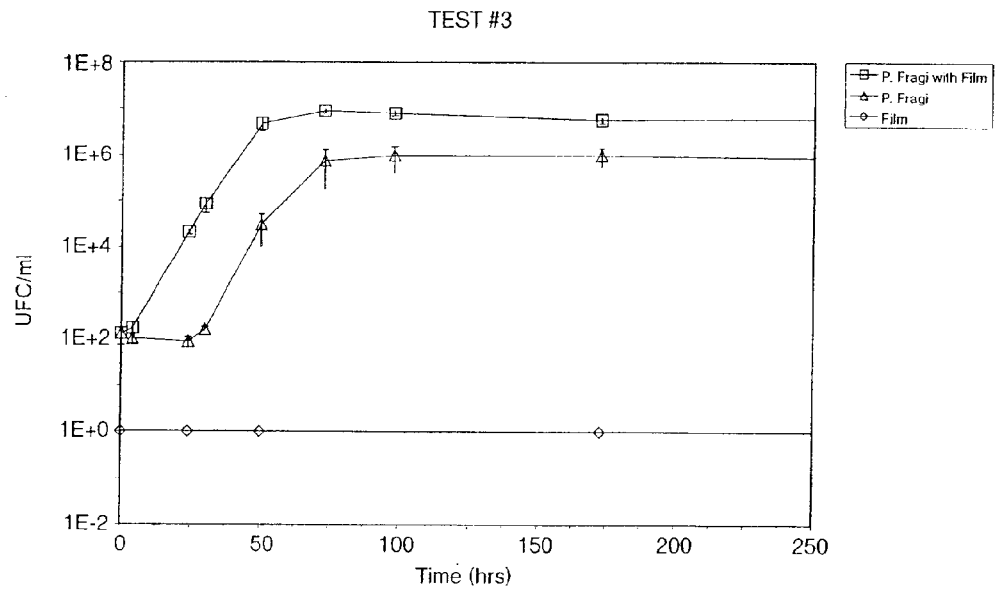

In the presence of glycerol, the rate of tryptophan loss due to the irradiation treatment is significant (p δ 0.05), that is, a fall of the fluorescence signal is perceived with the increase in the level of irradiation (see tables 19 and 20 and FIG. 12).

At 5.0% protein concentration, the decrease of the signal is significant (P δ 0.05) in the presence of glycerol (1.0%, 2.5% and 5.0%) compared to its absence for levels varying from 4 to 20 kGy. The signal varies approximately from 760,000 to 560,000 between 0 and 20 kGy and decreases approximately to 470,000 for the level of 40 kGy when the dosages are done on mediums in the presence of glycerol (1.0%, 2.5% and 5.0%). However, there is not regular and continuous signal loss as a function of the level of irradiation to 0% glycerol. The average signal obtained between 0 and 20 kGy is 778,000 for a protein concentration of 5.0%. Even if sometimes a significant different (p δ 0.05) to 0% glycerol is perceived between the levels of irradiation, there is no constant fall of the signal. Thus, the perceived signal with 0% glycerol is significantly higher (p δ 0.05) than the one perceived in the presence of glycerol for levels of irradiation higher or equivalent to 4 kGy (see table 19 and FIG. 12).

At 7.5% proteins, the loss of the signal in the presence of glycerol is significant (P δ 0.05) at 12, 15 and 20 kGy in the presence of 2.5% and 5.0% glycerol compared to its absence. In the presence of glycerol (2.5% or 5.0%), the signal varies approximately 1,115,000 to 900,000 between 0 and 20 kGy and decreases up to 814,000 for the level of 40 kGy at 5.0% glycerol. On the other hand, in the absence of glycerol, there is no regular and continuous signal loss during irradiation. An average signal of 1,122,000 is obtained for levels of irradiation of 0 to 20 kGy. Thus, the signal obtained in the absence of glycerol is significantly higher (P δ 0.05) than that obtained in its presence for levels of irradiation higher than 8 kGy (see table 20 and FIG. 12).

For an irradiation level equivalent or higher than 12 kGy, the signal perceived at 7.5% proteins is significantly lower (Pδ0.05) in presence of 5.0% glycerol than 2.5% glycerol (see table 20 and FIG. 12).

TABLE 19

Tryptophan dosage as a function of the level of received irradiation and glycerol contents for alanate 380 with a protein concentration of 5.0% P/P.

| DOSE (kGy) | 5.0%/0% | 5.0%/1.0% | 5.0%/2.5% | 5.0%/5.0% |
|---|---|---|---|---|
| 0 | 764770 ± 2693[1,a] | 796315 ± 3894[6,b] | 782666 ± 23326[10,ab] | 700887 ± 4245[18,c] |
| 4 | 793769 ± 1677[2,d] | 710132 ± 2361[7,c] | 714711 ± 6221[11,e] | 739892 ± 10315[19,f] |
| 8 | 749959 ± 8149[3,g] | 677805 ± 7018[8,h] | 686849 ± 3743[12,h] | 684373 ± 7521[20,h] |
| 12 | 778002 ± 10064[4,i] | 669722 ± 10182[8,j] | 623320 ± 4653[13,k] | 623178 ± 2164[21,k] |
| 15 | 814920 ± 2447[5,l] | 585219 ± 2866[9,m] | 585219 ± 2866[14,m] | 583052 ± 1559[22,m] |
| 20 | 765954 ± 9612[1,n] | 579666 ± 7450[9,o] | 561248 ± 11830[15,p] | 546316 ± 3320[23,p] |
| 30 | — | — | 531297 ± 5928[16,q] | 494688 ± 2136[24,r] |
| 40 | | | 471847 ± 4943[17,s] | 466259 ± 3208[25,t] |

With amounts higher or equivalents to 15 kGy, the presence of glycerol favours a reduction in the signal obtained in the 5.0% proteins solutions. This fall of signal seems to be more important with the increase in glycerol content. It becomes a significant (P δ 0.05), however, between 5.0% and 2.5% glycerol for levels of 30 and 40 kGy (see table 19 and FIG. 12).

There is no unit as these rates are measured by the surface under the curves obtained. The expression 5.0%/2.5% means 5.0% protein with 2.5% glycerol. For each line, two averages followed by the same letter are not significantly different between them (P>0.05). For each column, two averages followed by the same figure are not significantly different between them (P>0.05).

TABLE 20

Tryptophan dosage as a function of the level of received irradiation and glycerol contents for alanate 380 with a protein concentration of 7.5% P/P.

| DOSE (kGy) | 7.5%/0% | 7.5%/2.5% | 7.5%/5.0% |
|---|---|---|---|
| 0 | 1128405 ± 22051[1,a] | 1140330 ± 12521[4,ab] | 1179255 ± 31338[9,b] |
| 4 | 1101364 ± 3365[2,c] | 1146510 ± 20464[4,d] | 1131341 ± 8699[10,d] |
| 8 | 1100961 ± 4713[2,e] | 10081601 ± 16486[5,ef] | 1070098 ± 14308[11,f] |
| 12 | 1108578 ± 14058[1,2,m] | 1006871 ± 7153[6,h] | 980093 ± 10770[12,i] |
| 15 | 1158964 ± 5372[3,j] | 972919 ± 5338[7,k] | 935709 ± 8417[13,l] |
| 20 | 1133910 ± 21926[1,3,m] | 934142 ± 7591[8,n] | 876339 ± 9557[14,o] |
| 30 | — | — | 847660 ± 3469[15] |
| 40 | | | 814091 ± 11282[16] |

There is no unit as these rates are measured by the surface under the curves obtained. The expression 7.5%/2.5% means 7.5% protein with 2.5% glycerol. For each line, two averages followed by the same letter are not significantly different between them (P>0.05). For each column, two averages followed by the same figure are not significantly different between them (P>0.05).

Biodegradability

In this section, the results of the biodegradability of a type of film will be presented. The tests were repeated in triplicate with three recoveries.

The results of the first test show that when P. fragi is in contact with film, the bacterial growth is fast and a maximum of population (approximately 107 UFC/ml of medium) is reached after approximately 80 hours of agitation (see table 21 and FIG. 13). The population tends to decrease very slowly as a function of time and this one remained higher than $10^6$ UFC/ml after 1127 hours of experimentation. On the other hand, in the absence of film, the population remained appreciably the same at 20 UFC/ml for the first 100 hours. Thereafter, it decreased and remained <5 UFC/ml until the end. In presence of single film, the bacterial population is <5 UFC/ml from beginning to end of the experimentation.

TABLE 21

Results of test #1 countings of Pseudomonas fragi in the presence and/or in the absence of a film sample of alanate 380 composed of 5.0% P/P proteins and 2.5% P/P glycerol irradiated at 20 kGy.

| TIME (h) | P. fragi WITH FILM (UFC/ml) | P. fragi ONLY (UFC/ml) | FILM ONLY (UFC/ml) |
| --- | --- | --- | --- |
| 0 | 23 ± 12 | 15 ± 12 | <5 |
| 4 | 20 ± 17 | — | — |
| 8 | 18 ± 12 | — | — |
| 9 | — | — | <5 |
| 10 | 53 ± 45 | — | — |
| 21 | 100 ± 18 | — | — |
| 27 | 370 ± 120 | 27 ± 20 | <5 |
| 53 | — | — | <5 |
| 54 | $12 \times 10^4 \pm 61 \times 10^3$ | — | — |
| 76 | $89 \times 10^5 \pm 18 \times 10^5$ | — | — |
| 102 | $12 \times 10^6 \pm 24 \times 10^5$ | 13 ± 13 | <5 |
| 125 | $12 \times 10^6 \pm 23 \times 10^5$ | — | — |
| 146 | $10.4 \times 10^6 \pm 16 \times 10^5$ | — | — |
| 148 | — | <5 | <5 |
| 267 | $92 \times 10^5 \pm 27 \times 10^5$ | — | — |
| 287 | — | <5 | <5 |
| 293 | $93 \times 10^5 \pm 22 \times 10^5$ | — | — |
| 413 | $77 \times 10^5 \pm 24 \times 10^5$ | — | — |
| 414 | — | <5 | <5 |
| 624 | $46 \times 10^5 \pm 26 \times 10^5$ | — | — |
| 646 | — | <5 | <5 |
| 1127 | $36 \times 10^5 \pm 87 \times 10^4$ | <5 | <5 |

In the second test, the bacterial growth is rapid in the presence of film and a maximum (approximately 107 UFC/ml) is reached after approximately 60 hours of agitation (see table 22 and FIG. 14), the maximum population was reached more quickly but the initial population was 70 UFC/ml compared to 20 UFC/ml for the first time. The population only decreased very slightly as a function of time and remains at 106 FC/ml after about a hundred hours of agitation. Thereafter, the population decreased regularly as a function of time to read approximately $10^3$ UFC/ml after 1102 hours (see table 22 and FIG. 14). In presence of film only, the bacterial calculation is <5 UFC/ml over the duration of the experimentation.

TABLE 22

Results of test #2 counting the in presence and/or absence of a film sample of alanate 380 composed of 5.0% P/P proteins and 2.5% P/P glycerol, irradiation at 20 kGy.

| TIME (h) | P. fragi WITH FILM (UFC/ml) | P. fragi ONLY (UFC/ml) | FILM ONLY (UFC/ml) |
| --- | --- | --- | --- |
| 0 | 67 ± 45 | 87 ± 27 | <5 |
| 4 | 83 ± 22 | — | — |
| 21 | 7400 ± 5300 | — | — |
| 24 | — | 180 ± 44 | <5 |
| 34 | $81 \times 10^4 \pm 62 \times 10^4$ | — | — |
| 47 | $48 \times 10^5 \pm 12 \times 10^5$ | — | — |
| 53 | $66 \times 10^5 \pm 67 \times 10^4$ | — | — |
| 70 | — | — | <5 |
| 71 | $62 \times 10^5 \pm 14 \times 10^5$ | — | — |
| 93 | $64 \times 10^5 \pm 64 \times 10^4$ | — | — |
| 96 | — | $83 \times 10^4 \pm 14 \times 10^4$ | — |
| 120 | — | $91 \times 10^4 \pm 13 \times 10^4$ | — |
| 189 | $47 \times 10^5 \pm 10 \times 10^5$ | — | — |
| 190 | — | — | <5 |
| 192 | — | $80 \times 10^4 \pm 69 \times 10^3$ | — |
| 720 | $31 \times 10^5 \pm 21 \times 10^5$ | — | <5 |
| 746 | — | $43 \times 10^3 \pm 30 \times 10^3$ | — |
| 1102 | $99 \times 10^4 \pm 26 \times 10^4$ | 800 ± 730 | <5 |

For the third test, bacterial growth is very fast in the presence of film and is maximum (approximately 107 UFC/ml) after about sixty hours of agitation. The initial population was approximately 130 UFC/ml and the maximum was reached within a time similar to the second test. In this test, the population also tends to decrease according to time but after 1200 hours of agitation, this population tends to increase slightly thereafter (see table 23 and FIG. 15). In absence of film, the population remains stable (approximately 110 UFC/ml) for first period the 24 hours and increases quickly to $10^6$ UFC/ml after a hundred hours of agitation. Then, the population decreases by one logarithmic unit and remains stable for the interval from 500 to 1500 hours. Thereafter, the population falls quickly to 2800 UFC/ml after 1779 hours of agitation (see FIG. 15). In presence of film only, the population is <5 UFC/ml throughout the experiment.

The experiments of biodegradability were stopped after obtaining the stability of the P. fragi population in the mediums in the presence of film and when the population had distinctly decreased, in the mediums in the absence of film (tests 2 and 3). For the three tests, the film was not entirely biodegraded at the time of stopping the experimentation.

Various attempts were made in order to follow the rate of biodegradation of film by P. fragi as a function of time by soluble nitrogen dosage. In no case were we able to could recover film after complete immersion in the mediums without losing a significant quantity of it. Indeed, the film has a tendency to disorganize once immersed in water, so that it loses its initial structure. Then, a recovery by filtration and/or evaporation was not effective to isolate the film from the mediums during the biodegradation tests.

TABLE 23

Results of test #3 countings of *Pseudomonas fragi* in the presence and/or absence of a film sample of alanate 380 composed of 5.0% P/P proteins and 2.5% P/P glycerol, irradiated at 20 kGy.

| TIME (h) | P. fragi WITH FILM (UPC/ml) | P. fragi ONLY (UFC/ml) | FILM ONLY (UFC/ml) |
|---|---|---|---|
| 0 | 130 ± 56 | 130 ± 39 | <5 |
| 4 | 170 ± 47 | 103 ± 29 | — |
| 24 | $21 \times 10^3 \pm 2700$ | 88 ± 22 | <5 |
| 30 | $85 \times 10^3 \pm 31 \times 10^3$ | 160 ± 18 | — |
| 50 | $47 \times 10^5 \pm 14 \times 10^5$ | $30 \times 10^3 \pm 20 \times 10^3$ | <5 |
| 73 | $87 \times 10^5 \pm 98 \times 10^4$ | $75 \times 10^4 \pm 57 \times 10^4$ | — |
| 98 | $78 \times 10^5 \pm 10 \times 10^5$ | $98 \times 10^4 \pm 59 \times 10^4$ | — |
| 173 | $56 \times 10^5 \pm 85 \times 10^4$ | $10 \times 10^5 \pm 45 \times 10^4$ | <5 |
| 291 | $61 \times 10^5 \pm 25 \times 10^5$ | $83 \times 10^4 \pm 55 \times 10^4$ | — |
| 503 | $38 \times 10^5 \pm 11 \times 10^3$ | $82 \times 10^3 \pm 23 \times 10^3$ | <5 |
| 634 | $29 \times 10^5 \pm 33 \times 10^4$ | — | <5 |
| 1083 | $26 \times 10^5 \pm 49 \times 10^4$ | — | <5 |
| 1152 | — | $10 \times 10^4 \pm 16 \times 10^3$ | — |
| 1465 | $33 \times 10^5 \pm 11 \times 10^5$ | $82 \times 10^3 \pm 19 \times 10^3$ | <5 |
| 1779 | $74 \times 10^5 \pm 21 \times 10^5$ | 2800 ± 480 | <5 |

Analysis of Results for the Three Alanates

Of the three caseinates used, calcium caseinate (alanate 380) has a behavior to irradiation which differs from that of the two sodium caseinates (alanates 110 and 180). Various measurements of the rheological and physical chemical properties showed that:

The breaking load (F/E ratio) of calcium caseinate (alanate 380) is higher compared to the two sodium caseinates (alanates 110 and 180). At 5.0% P/P and 7.5% P/P, the calcium caseinate (alanate 380) has a higher F/E ratio than the two sodium caseinates (alanates 110 and 180) for levels of 4, 8 and 12 kGy. However, there is no direct relation between protein concentration and film resistance. Indeed, for a concentration of 5.0% P/P, the F/E ratio is higher than the one at 7.5% P/P for the three caseinates. The only exceptions are for the two sodium caseinates (alanates 110 and 180) irradiated at 4 kGy where the ratio is very slightly lower (see tables 4 and 5). Therefore, all things considered, a film produced with a greater quantity of proteins does not form obligatorily a more resistant film after irradiation.

At 5.0% protein, irradiation up to 12 kGy of the second sodium caseinate (alanate 180) generates a significant reduction (P $\delta$ 0.05) in the F/E ratio. This phenomenon is observed for the first sodium caseinate (alanate 110) at a level of 4 kGy only. Irradiation up to 12 kGy of calcium caseinate (alanate 380) does not have a significant effect (P>0.05) on the F/E ratio (see table 4).

In the absence of glycerol, irradiation generates a significant reduction (P $\delta$ 0.05) in the F/E ratio for the sodium caseinates (alanate 110) and the calcium caseinates (alanate 380) at a concentration of 7.5%. Irradiation up to 12 kGy does not have a significant effect (P>0.05) on the F/E ratio for the second sodium caseinate (alanate 180) at 7.5% (see table 5).

Thus, irradiation up to 12 kGy does not generate a more resistant film for these three caseinates in the absence of plasticizing agents.

At a 5.0% concentration, the calcium caseinate (alanate 380) produced a rate of bityrosine formation significantly higher (P $\delta$ 0.05) than the two sodium caseinates (alanates 110 and 180) when this caseinate is treated at levels of 4, 8 and 12 kGy. On the other hand, at 7.5% protein, the sodium caseinate (alanate 110) formed significantly more (P $\delta$ 0.05) bityrosine that the sodium caseinates (alanates 180) and the calcium caseinates (alanate 380) at levels of 4 and 12 kGy. At 8 kGy, the three caseinates formed a similar proportion of bityrosine (see tables 8 and 9).

However, the sodium caseinates (alanate 180) and the calcium caseinates (alanate 380) produced significantly more (P $\delta$ 0.05) bityrosine at a 5.0% protein concentration than at 7.5% for levels of 4, 8 and 12 kGy. The sodium caseinate (alanate 110) produced more bityrosine at 5.0% protein than at 7.5% for levels of 8 kGy only (see tables 8 and 9). Then, would it be possible that the 5.0% concentration would represent a zone where the rate of bityrosine formation would be a maximum and that the 7.5% concentration would represent a point of saturation? A much more thorough study should be made to validate this assumption.

The cohesion force of a film, among others, is connected to its polymeric and chemical structure (Kester and Fennema, 1986). The rate of bityrosine formation represents an important factor in the process of polymerization induced by the hydroxyl radicals (Davies, 1987 and Davies et al., 1987a). Thus, at a concentration of 5.0% protein, the calcium caseinate (alanate 380) shows, at the same time, a F/E ratio and a rate of bityrosine formation that is higher than the two sodium caseinates (alanates 110 and 180). On the other hand, such a relation is not observed with a 7.5% protein concentration for the three caseinates.

On the other hand, irradiation up to 12 kGy has little or no significant effect (P>0.05) on the strain at failure of the three caseinates used for the two tested concentrations (see tables 6 and 7).

Likewise, there was no occurrence of a regular and continuous tryptophan loss as a function of the level of irradiation during dosage by fluorescence. This situation was noticed for the three caseinates and at the two concentrations used (see tables 10 and 11). In the absence of glycerol, it is possible that the gamma irradiation generates a proteinic denaturation which exposes the hydrophobic pockets on the surface of the protein. Then, the relative stability of the signal fluorescence which is perceived during the tryptophan dosage, would be more likely explained by a greater quantity of tryptophan having migrated on the surface rather than the formation of new residues by the irradiation.

Influence of Glycerol a) Analyses of Results with 5.0% Protein

Compared to the results obtained in the absence of glycerol, for a treatment from 0 to 12 kGy, at a concentration of 5.0% protein, the presence of 1.0% glycerol significantly lowers (P $\delta$ 0.05) the breaking load, increases the deformation (approximately 0.4 mm) and does not affect the rate of bityrosine formation (see tables 12, 14 and 17). On the other hand, for levels of 15 and 20 kGy, the load breaking shows F/E ratios which are comparable to those obtained in the absence of glycerol for a 0 treatment at 12 kGy. The deformation is increased (approximately 0.6 mm) compared to the results obtained in the absence of glycerol for the amounts varying between 0 and 12 kGy (see tables 12 and 14). The rate of bityrosine formation is significantly higher P $\delta$ 0.05) compared to the absence of glycerol for levels of 15 and 20 kGy (see table 17).

At 2.5% and 5.0% glycerol with 5.0% protein, the F/E ratio, the deformation, the viscoelasticity and the rate of bityrosine formation increase significantly (P $\delta$ 0.05) with the increase in the level of irradiation (see tables 12, 14, 16 and 17).

In the presence of 2.5% glycerol, irradiation made it possible to increase the F/E ratio by a factor of 2.2 and to increase the deformation by a factor of 1.3, while at 5.0% glycerol, irradiation made it possible to increase the F/E ratio by a factor of 1.6 and the deformation by a factor of 1.4 (see tables 12 and 14). The viscoelasticity of films with 5.0% glycerol is higher than that with 2.5%. However, the handling of films with 5.0% glycerol remains much more difficult (see table 16).

The fact of adding a greater quantity of glycerol (2.5 and 5.0%) in the medium considerably reduced the resistance of film but improves greatly its deforming capacity.

The glycerol does not seem to act like a radicalizing inhibitor. By its presence, it even seems to encourage bityrosine formation as a function of the level of irradiation. Indeed, the presence of glycerol (1.0%, 2.5% or 5.0%) significantly improves (P δ 0.05) the rate of bityrosine formation for levels of irradiation equivalent or higher than 15 kGy for a 5.0% concentration of protein (see table 17). On the other hand, the reasons justifying the beneficial effect that the presence of glycerol produces on the rate of bityrosine formation are not shown.

b) Analysis of Results with 7.5% Protein

In the presence of 2.5% glycerol and of 7.5% proteins, irradiation (0–12 kGy) generates a significant reduction (P δ 0.05) in the F/E ratio, a significant increase (P δ 0.05) in the deforming capacity and the rate of bityrosine formation compared to the results obtained in the absence of glycerol (see tables 13, 15 and 18). Nevertheless, a radiative treatment up to 20 kGy does not have significant consequences (P>0.05) on the F/E ratio and the deformation of films formed with 7.5% protein and 2.5% glycerol (see tables 13 and 14).

At 5.0% glycerol and 7.5% protein, the F/E ratio, the deformation, the viscoelasticity and the rate of bityrosine formation increase significantly (P δ 0.05) with the increase in the level of irradiation (see tables 13, 15 and 18). In the presence of 5.0% glycerol, irradiation made it possible to increase the F/E ratio and the deformation by a factor of 1.5 (see tables 13 and 15).

The presence of glycerol also contributes to greatly reduce the resistance of film but greatly improves its deformation.

In the presence of 5.0% protein, the addition of glycerol does not inhibit the formation of bityrosine. Quite to the contrary, the formation of bityrosine, as a function of the levels of irradiation (4 to 20 kGy), is significantly higher (P δ 0.05) (see table 18).

c) Comparison Between the Two Protein Concentrations

In the presence of 2.5% glycerol, the F/E ratios at 5.0% protein are lower than those at 7.5% for levels of irradiation from 0 to 20 kGy. On the other hand, the deformations at proteins 5.0% are significantly higher (P δ 0.05) than those at 7.5% for same the treatments (see tables 12 to 15). At 5.0% glycerol, the F/E ratios at 5.0% protein are significantly lower (p δ 0.05) than those at 7.5% for levels which vary from 0 to 40 kGy, while the deformations at 7.5% proteins are higher than those at 5.0% for levels of 4, 8, 15, 20 and 40 kGy. At 12 and 30 kGy, the deformations at 7.5% protein are lower than those at 5.0% (see tables 12 to 15). The viscoelasticity of films with 5.0% glycerol is significantly higher (P δ 0.05) with proteins 5.0% than at 7.5% (see table 16).

The addition of 2.5% glycerol with 7.5% protein significantly increases (P δ 0.05) the rate of bityrosine formation between the two protein concentrations except for the 15 kGy level. Nevertheless, there is no direct relation between the protein concentration and the formation of bityrosine. Thus, the rate of bityrosine formation is not proportional to the quantity of proteins present in the medium for the same level of irradiation (see tables 17 and 18).

A maximum F/E ratio is obtained at 30 kGy for the two protein concentrations with 2.5% and/or 5.0% glycerol. The deformation is highest between 20 and 30 kGy in the presence of 5.0% protein and 2.5% or 5.0% glycerol. At 7.5% protein with 5.0% glycerol, the deformation is highest between 15 and 20 kGy. Finally, viscoelasticity is at its maximum between 30 and 40 kGy for the two protein concentrations with 2.5% and/or 5.0% glycerol (see tables 12 to 16). Thus, a level of irradiation between 20 and 30 kGy seems to be an area where the tested mechanical properties are highest for these two concentrations of proteins and glycerol.

The glycerol/protein ratio seems to be an important factor on the influence of irradiation on the mechanical, physical and chemical properties for the two protein concentrations with 2.5% or 5.0% glycerol. Thus, a ratio of 0.5 (2.5% glycerol/5.0% protein) shows the strongest increase in the F/E ratio as a function of the irradiation levels whereas the weakest is perceived for a ratio of 0.33 (2.5% glycerol/7.0% protein). The strongest capacity of deformation during irradiation was noticed for a ratio of 0.67 (5.0% glycerol/7.5% protein) and the weakest was obtained for a ratio of 0.33. Finally, the progression obtained for viscoelasticity is appreciably the same one for the 0.5; 0.67 and 1.0 ratios. Thus, the glycerol/protein ratios located between 0.5 and 0.67 seem to show the strongest variations of the rheological properties to irradiation.

Therefore, a radiation treatment is beneficial for the resistance of a film, its deforming capacity and bityrosine formation for the two protein concentrations with 2.5% or 5.0% glycerol. During the process of polymerization, all the polymeric chains are inter-connected and gathered in a gigantic network. If the number of points of contact is not too high, the network shows an appreciable elastic capacity. This recoverable deformation would be due to the presence of flexible junctions (Wunderlich, 1981). Thus, a period of irradiation or an inadequate quantity of glycerol would concretely affect the structure of the protein network which, inevitably, would deteriorate the rheological properties of the film.

d) Tryptophan Dosage in the Presence of Glycerol

The oxidation of a tryptophan solution by the hydroxyl radicals is directly connected to the loss of intensity of the fluorescence signal (Davies et al., 1987a and see FIG. 6). In absence of glycerol, there is no tryptophan loss during dosages of the irradiated caseinate solutions. At the opposite side, a loss of the signal is perceived when glycerol is present in the treated mediums. At 5.0% protein, the loss of the signal in the presence of glycerol is significant (P δ 0.05) from 4 to 20 kGy whereas at 7.5% protein, it is significant (P δ 0.05) for levels of 12, 15 and 20 kGy (see tables 19 and 20).

The presence of glycerol tends to privilege the native or folded up state of a globular protein rather than a denatured state (Gekko and Timasheff, 1981). Thus, only the tryptophan located on the surface of the protein will be affected during irradiation.

All in all, the loss of intensity of the signal at 40 kGy compared to 0 kGy varies from 30 to 40% for the two protein concentrations.

In the presence of 5.0% proteins and 5.0% glycerol, a better protection against the tryptophan loss is observed compared to 2.5% or 1.0% glycerol, whereas between 2.5% and 1.0% glycerol, the proportion of signal loss as a function of the level of irradiation is roughly the same.

On the other hand, at 7.5% protein, the loss of signal intensity as a function of the level of irradiation in the presence of 5.0% glycerol is proportionally higher than when only 2.5% glycerol is present (see tables 19 and 20). The addition of 2.5% glycerol concentration shows a greater resistance to tryptophan loss compared to a solution containing 5.0% protein levels of irradiation varying from 0 to 20 kGy. At 5.0% glycerol, the reverse situation arises; however, for the 30 and 40 kGy levels, the loss becomes slightly higher with 5.0% protein than 7.5% (see tables 19 and 20).

Essentially, there is no direct relation between the loss of the signal and the glycerol content as a function of the level of irradiation for the two studied protein concentrations. It is difficult to establish a glycerol/protein ratio for which protection against tryptophan loss as a function of the level of irradiation would be maximized. For a 5.0% protein concentration a ratio of 1.0 is most adequate whereas for a 7.5% protein concentration, a ratio of 0.33 is more adequate.

The presence of glycerol strongly modifies the physical and chemical properties of calcium caseinate films (alanate 380). It tends to decrease the force at rupture, it increases the strain at failure, it improves viscoelasticity, it does not inhibit the formation of bityrosine and it protects protein from radiation denaturation.

Biodegradability

Generally, maximum bacterial growth is quickly reached when *P. fragi* is in the presence of the film. For the three tests, a maximum of approximately 107 UFC/ml is reached within a time of 60 to 80 hours after the removal of the mediums. A downward trend of the population is noticed after the maximum is reached except for the third test, where the population tends to increase after 1200 hours of agitation.

For the last two tests in the absence of film, the bacterial population requires a latency time of approximately 24 hours before starting to grow. A maximum of 106 UFC/ml is reached after about one hundred hours of agitation and in both cases, the population decreases in an obvious way thereafter.

With the single presence of film, the population remained <5 UFC/ml for the duration of the experimentation and on the three tests.

EXAMPLE 8

Other Formulations

Other films containing caseinate were manufactured by taking the same protocols as in the preceding Examples with the flowing modifications. Alanate 380 was solubilized at a rate of 5% P/P in a Tris-HCl buffer 1 mM with pH 8.0. The added plasticizing agents were propylene glycol (PG) and triethylene glycol (TEG) at 0, 2.5% and 5% P/P concentrations. The average flow of irradiation was 1.5 KGy/h for levels of 8, 16, 32, 64, 96 and 128 KGy. Calcium chloride was added after the irradiation at 0, 0.125 and 0.25% P/P concentrations. The best films obtained were made of 5% caseinate/2.5% PG and 5% caseinate/2.5% TEG (amounts lower than 32 KGy), the first having a higher breaking load and the second being more viscoelastic. Calcium seems to increase the cohesion force of film without affecting the strain at failure.

EXAMPLE 9

Additions of Other Components

One can add polysaccharides to calcium caseinate films/ plasticizing agents. For example, the addition of carboxymethyl cellulose (CMC) gives a rigid film (total composition 5% alanate 380/2.5% glycerol/0.25% CMC). This film is made more viscoelastic if one adds a plasticizing agent supplement like 2.5% sorbitol. The CMC are added after irradiation to avoid a precipitation. The resistance and viscoelasticity properties of a caseinate film can thus be modified at will by the addition of other components (calcium, polysaccharides and plasticizing agents (polyethylene, propylene and triethylene glycols, glycerol and sorbitol). The best mechanical properties are obtained with ratios of 0.5 to 0.67 plasticizing agent/protein to levels of approximately 30 KGy.

When one adds the PEG as a plasticizing agent, concentrations lower than 1% are preferred to avoid the formation of heterogeneous films.

The addition of $CaCl_2$ (approximately 0.125% w/w) to the solution with three components (above) increases the formation of bityrosine and the breaking load. The caseinate films are formed at irradiation levels equal or higher than 16 KGy. The maximum force of films is obtained at 64 KGy. With higher amounts, protein degradation seems to overcome the formation of bityrosine. At 64 KGy, the presence of $CaCl_2$ has little influence on the breaking load in the presence of absence of mannitol or sorbitol.

PEG decreases the breaking load in the presence of $CaCl_2$. PEG seems to inhibit the formation of electrostatic bonds and between salts. Sorbitol is the preferred plasticizing agent since it increases viscoelasticity the most.

EXAMPLE 10

Specific Formulation

One of the preferred formulations is 5% alanate 380/2.5% sorbitol/0.25% CMC/0.125% $CaCl_2$, combining force of cohesion and viscoelasticity. The amount of optimal irradiation is located between 32 and 64 KGy.

REFERENCES

Adams, D. M.; Barach, J. T. and Speck, M. L. 1976, *Effect of psychrotrophicbacteria from milk on milk proteins and stability of milk proteins to ultrahigh temperature treatment*, J. Dairy Sci., Vol. 59, 5, 823–827.

Adams, G. E.; Willson, R. L. ; Bisby, R. H. and Cundall, R. B. 1971, *On the mechanism of the radiation-induced inactivation of ribonuclease in dilute aqueous solution*, Int. J. Radiat. Biol. Vol. 20, 5, 405–415.

Alichanidis, E. and Andrews, A. T., 1977, *Some properties of the extracellular protease produced by the psychrotrophic bacterium PSEUDOMONAS QUORESCENS STRAIN AR-11*, Biochim. and Biophy Acta, 485, 424–433.

Arakawa, T. and Timasheff, S. 1982, *Stabilization of protein structure by sugars, Biochemistry*, 21, 6536–6544.

Avena-Bustillos, R. J. and Krochta, J. M. 1993, *Water vapor permeability of caseinate-based edible films as affected by pH, calcium crosslinking and lipid content*, J. Food Sci., Vol. 58, 4, 904–907.

Banker, G. S. 1966, *Film coating theory and practice*, J. Pharma. Sci., Vol. 55, 1 81–89.

Bull, H. B. and Breese, K. 1968, *Protein hydration, I. Binding sites* Arc Biochem. Biophy., 128, 488–496.

Ciardelli, F.; Ruggeri, G.; Aglietto, M.; Angiolini, D.; Carlini, C.; Bianchini, G.; Siccardi, G.; Bigogno, G. and Cioni, L. 1989, *Advanced polymeric materials for coating technology*, J. Coating Techn., Vol. 61, 775, 77–87.

Davies, K. J. A. 1987, *Protein damage and degradation by oxygen radicals, I General aspects*, J. Bio. Chem., Vol. 262, 20, 9895–9901.

Davies, K. J. A. and Delsignore, M. E. 1987, *Protein damage and degradation by oxygen radicals, III. Modification of secondary and tertiary structure*, J. Bio. Chem., Vol. 262, 20, 9908–9913.

Davies, K. J. A.; Delsignore, M. E. and Lin, S. W. 1987a, *Protein damage and degradation by oxygen radicals, II. Modification of amino acids*, J. Bio. Chem., Vol. 262, 20, 9902–9907.

Davies, K. J. A.; Lin, S. W. and Pacifici, R. E. 1987b, *Protein damage and degradation by oxygen radicals, IV. Degradation of denatured protein*, J. Bio. Chem., Vol. 262, 20, 9914–9920.

Delinc,e, H. 1983, *Recent advances in radiation chemistry of proteins, dans: Recent advances in food irradiation*, Elias, P. S. and Cohen, A. J. (Eds), Elsevier Biomedical, 129–147.

Delisle, J. 1984, *Amélioration de la valeur nutrive des différentes protéines vévétales par des méthodes physiques, chimiques et biochimiques, thèse de Doctorat*, Université Laval, 15

Ferradini, C. and Pucheault, J. 1983, II. *Radiolyse de solution diluée, dans: Biologie de l'action des rayonnements ionisants*, Masson, Paris, (Ed), 31–61.

Feuge, R. O. 1955, *Acetoglycerides-new fat products of potential value to the food industry*, Food Tech. June 314–318.

Fricko H. and Hart, E. 1966, *Chemical dosimetry, dans: Radiation dosimetry, second edition*, Vol. 11, Instrumentation, Attix, F. H. and Roesch, W. C. (Eds), Academic Press, N.Y., 167–175.

Fridovich, I. 1983, *Superoxide radical: an endogenous toxicant*, Ann. Rev. Pharmacol. Toxicol., 23, 239–257.

Gage, P. 1990, *Degradable polyethylene film-the fact*, Tappi J., 10, 161–169

Ganzer, K. M. and Rebenfeld, L. 1987, *Laboratory-scale continuously variable humidity control with saturated salt solutions*, Ame. Lab., March, 40–47.

Gekko, K. and Morikawa, T. 1981, *Preferential hydration of bovine serum albumin in polyhydric alcohol-water mixtures*, J. Biochem., 90, 39–50.

Gekko, K. and Timasheff, S. 1981, *Mechanism of protein stabilization by glycerol: Preferential hydration in glycérol-water mixtures*, Biochemistry, 20, 4667–4676.

Gennadios, A. and Weller, C. 1990, *Edible films and coating from Wheat and corn proteins*, Food Technol., October, 63–69.

Gontard, N.; Guilbert, S. and Cuq, J. L. 1992, *Edible wheat gluten films: influence of the main process variables on film properties using response surface methodology*, J. Food Sci., Vol. 57, 1, 190–195.

Graham, D. E. and Philips, M. C. 1980, *Proteins at liquid interfaces, V. shear properties*, J. Col. Inter. Sci., Vol. 76, 1, 240–250.

Kamper, S. L. and Fennema, O. 1984a, *Water vapor permeability of edible bilayer films*, J. Food Sci, Vol. 49, 1478–1481.

Kamper, S. L. and Fennema, O. 1984b, *Water vapor permeability of edible, fatty acid, bilayer film*, J. Food Sci, Vol. 49, 1482–1485.

Kanig, J. L. and Goodman, H. 1962, *Evaluative procedures for filmforming materials used in pharmaceutical applications*, J. Pharma. Sci., Vol. 51, 1 77–83.

Kasai, S.; Kunimoto, T. and Nitta, K. 1983, *Cross-linking of fibrin by activated factor XIII stimulates attachment, morphological changes and proliferation of fibriblasts*, Biomed. Res., 4, 2, 155–160.

Kester, J. J. and Fennema, O. R. 1986, *Edible films and coating: a review*, Food Technol., December, 47–59.

Klemchuk, P. P. 1990, *Degradable plastics: a critical review*, Pol. Degra. Stab., 27, 183–202.

Krochta, J. M. 1991, *Coatings for substrates including high moisture edible substrates*, U.S. Pat. No. 5,019,403.

Lee, J. C. and Timasheff, S. 1981, *The stabilization of proteins by sucrose*, J. Bio. Chem., Vol. 256, 14 7193–7201.

Lehrer, S. S. and Fasman, G. D. 1967, *Ultraviolet irradiation effects in poly-L-tyrosine and model compounds, indentification of bityrosine as a photoproduct*, Biochemistry, Vol. 6, 3, 757–767.

Li, C. and Kohn, J. 1989, *Synthesis of ploy (iminocarbinates): degradable polymers with potential application as disposable plastics and as biomaterials*, Macromolecules, Vol. 22, 5 2029–2036.

Lim, S.-T.; Jane, J.-L.; Rajagopalan, S. and Seib, P. A. 1992, *Effect of starch granule size on physical properties of starch-filled polyéthylène film*, Biotechnol, Prog., 8, 51–57.

Lovergren, N. V. and Feuge, R. O. 1954, *Permeability of acetostearin products to water vapor*, J. Agric. Food Chem., 2, 558—.

Martin-Polo, M; Voilley, A.; Blond, G.; Colas, B.; Mesnier, M. and Floquet, N. 1992, *Hydrophobic films and their efficiency against moisture transfer. 2. Influence of physical state*, J. Agric. Food Chem., 40, 413–418.

McHugh, T. H. and Krochta, J. M., 1994, *Milk-protein-based edible films and coatings*, Food Technol., January, 97–103.

Merck & Co., Inc., 1960, *The Merck index of chemicals and drugs, seventh edition*, Stecher, P. G.; Finkel, M. J.; Siegmund, O. H. and Szafranski, B. M. (Eds), Merck & Co., Inc., N.J., 733.

Ministère d'approvisionnements et services Canada, 1992, *Le plan vert du Canada, Les instruments économiques et la protection de l'environnement*, No. cat. En 21-119/1992F, Gouvernement du Canada.

Modler, H. W., 1985, *Functionnal properties of nonfat dairy ingredients—a review, Modification of products containing casein*, J. Dairy Sci., 68, 2195–2205.

Motoki, M.; Aso, H.; Seguro, K. and Nio, N. 1987, "$_{s1}$-*Casein film prepared using transplutaminase*, Agric. Biol. Chem., 51, 993–996.

Ndon, U. J.; Levine, A. D. and Bradley, B. S. 1992, *Evaluation of biodegradability of starch-based plastics*, Wat. Sci. Tech., Vol. 26, 9–11, 2089–2092.

Palleroni, N. J. 1984, *Bergey's manual of Systematic bacteriology, Vol* 1, Krieg, N. R. and Holt, J. G. (Eds), Williams & Wilkins, Baltimore, 140–407.

Peleg, M. 1979, *Characterization of the stress relaxation curves of solid foods*, J. Food Sci., Vol. 44, 1, 227–281.

Peyron, A. 1991, *L'enrobage et les produits filmogènes: un nouveau mode d'emballage*, Viandes Prod. Carnés, Vol. 12, 2, Mars-Avril, 41–46.

Prutz, W. A. 1983, *Phenol coupling initiated by one-electron oxidation of tyrosine units in peptides and histone*, Int. J. Radiat. Biol., Vol. 44, 2, 183–196.

Ricard-Blum, S. and Ville, G. 1988, *Review collagen cross-linking,* Cel. Molec. Biol, 34, 6, 581–590.

Santé et bien-être social Canada, 1979, *Numération des colonies aerobics dans les aliments,* MFHPB-18, Direction générale de la protection de la santé.

Schmidt, R. H. and Morris, H. S. 1984, Symposium: *Gelation in food protein systems, Gelation properties of milk proteins, soy proteins, and blended protein systems,* Food Technol., May, 85–96.

Shintani, H. and Nakamura, A. 1991, *Mechanism of degradation and crosslinking of polyurethane when irradiated by gamma-rays,* J. App. Polymer Sci., Vol. 42, 1979–1987.

Sian, N. K. and Ishak, S. 1990, *Effect of pH on formulation, proximate composition and rehydration capacity of winged bean and sorbean protein-lipid film,* J. Food Sci., Vol. 55, 1, 261–262.

Singh, H. and Singh, A. 1983, *Effect of gamma radiation on E. cioli ribosomes II. Efficiencies of inactivation by free radicals,* Int. J. Radiat. Biol., Vol. 44, 6, 607–613.

Singh, H. and Vadasz, J. A. 1983, *Effect of gamma radiation on E. coli ribosomes I. Inactivation by hydrogen atoms, hydroxyl radicals, hydrated electrons and secondary radicals,* Int. J. Radiat. Biol., Vol. 44, 6, 601–606.

Snedecor, G. W. and Cochran, W. G. 1978, *One-way classifications. Analysis of variance.* dans: *Statistical methods,* The Iowa State University press, Iowa State, 258–298.

Tortora, G. J., Funke, B. R. and Case, C. L. 1989, Microbiology, an introduction, third edition, Williams, R. J.; Cusumano, C.; Weisberg, S.; Burner, P. and Olsen, L.(eds), The benjamin/Cummings Publishing Company, Inc., Cal, 260–281.

Torres, J. A. and Karel, M. 1985, *Microbial stabilization of intermediate moisture food surface III. Effects of surface preservative concentration and surface pH control on microbial stability of an intermediate moisture cheese analog,* J. Food Proc. Pre., 9, 107.

Umemoto, Y.; Aoki, T. and Sato, Y. 1968, *Effects of (-ray irradiation upon milk and milk proteins part II. Changes in relatives viscosities and gelation of casein solutions irradiated with (-rays,* J. Agri. Chem. Soc. Japan, 42, 454–460.

Vuillemard, J. C.; Gauthier, S. and Paquin, P. 1989, *Les ingrédients à base de protéines laitières: obtention, propriétés et utilisations,* Lait, 69, 323–351.

Wunderlich. B. 1981, *Thermal characterization of polymeric materials,* Turi, E. A. (Ed), Academic Press, N.Y., 92–234.

Xiong, Y. L. 1992, *Influence of pH and ionic environment on thermal aggregation of Whey proteins,* J. Agric. Food Chem., 40, 380–384.

Yamamoto, O., 1977, *Ionizing radiation-induced crosslinking in proteins,* dans: *Protein crosslinking Biochemical and molecular aspects,* Friedman, M. (Ed), Plenum Press, N.Y., 509–547.

We claim:

1. A composition comprising casein or a casein salt and a plasticizing agent, wherein the ratio of plasticizing agent/casein ranges from 0.33 to 1.0 (weight/weight), wherein said composition has been subjected subjected to a polymerizing level of gamma irradiation causing the formation of crosslinks therein.

2. The composition as defined in claim 1 in which the salt of casein is a calcium caseinate.

3. The composition as defined in claim 2, in which the plasticizing agent is glycerol, propylene glycol, triethylene glycol or sorbitol.

4. The composition as defined in claim 3 including 5% calcium caseinate and 2.5% plasticizing agent.

5. The composition as defined in claim 1, in which the plasticizing agent is glycerol, propylene glycol, triethylene glycol or sorbitol.

6. The composition as defined in claim 5 including 5% calcium caseinate and 2.5% plasticizing agent.

7. The composition as defined in claim 1, including 5% casein or casein salt and 2.5% plasticizing agent.

8. A composition comprising casein or a casein salt and a plasticizing agent, wherein the ratio of plasticizing agent/casein ranges from 0.33 to 1.0 (weight/weight), and carboxymethyl cellulose, wherein said composition has been subjected to a polymerizing level of gamma irradiation causing the formation of crosslinks therein.

9. The composition as defined in claim 8 in which the salt of casein is a calcium caseinate.

10. The composition as defined in claim 9 in which the plasticizing agent is sorbitol.

11. The composition as defined in claim 8 in which the plasticizing agent is glycerol, propylene glycol, triethylene glycol or sorbitol.

12. The composition as defined in claim 8, including 5% casein or casein salt and 2.5% plasticizing agent.

13. The composition according to any one of claims 1 to 5 or 1–9 in which the polymerizing level of gamma irradiation is approximately 32 KGy.

14. A film produced from a composition, comprising casein or a casein salt and a plasticizing agent, wherein the ratio of plasticizing agent/casein ranges from 0.3 to 1.0 (weight/weight) and optionally one or more compounds selected from the group consisting essentially of carboxymethyl cellulose and $CaCl_2$, wherein said composition has been subjected to a polymerizing level of gamma irradiation causing the formation of crosslinks therein.

15. The film as defined in claim 14 in which the salt of casein is a calcium caseinate.

16. The film as defined in claim 14, in which the plasticizing agent is glycerol, propylene glycol, triethylene glycol or sorbitol.

17. The film as defined in claim 14, including 5% casein or casein salt and 2.5% plasticizing agent.

18. The film as defined in claim 14 including 5% calcium caseinate and 2.5% plasticizing agent.

19. The film according to claim 14 in which the polymerizing level of gamma irradiation is approximately 32 KGy.

20. The film according to any one of claims 15–19 in which the polymerizing level of gamma irradiation is approximately 32 KGy.

* * * * *

UNITED STATES PATENT AND TRADEMARK OFFICE
CERTIFICATE OF CORRECTION

PATENT NO.   : 6,120,592
DATED        : September 19, 2000
INVENTOR(S)  : Brault et al.

It is certified that error appears in the above-identified patent and that said Letters Patent is hereby corrected as shown below:

Drawings,
Figures 13A, 13B, 14A, 14B, 15A and 15B of Pat. No. 6,120,592 have been corrected as follows:

Signed and Sealed this

Twenty-third Day of April, 2002

Attest:

JAMES E. ROGAN
*Director of the United States Patent and Trademark Office*

*Attesting Officer*

UNITED STATES PATENT AND TRADEMARK OFFICE
CERTIFICATE OF CORRECTION

PATENT NO. : 6,120,592
DATED : September 19, 2000
INVENTOR(S) : Brault et al.

It is certified that error appears in the above-identified patent and that said Letters Patent is hereby corrected as shown below:

Drawings,
Figures 13A, 13B, 14A, 14B, 15A and 15B of Pat. No. 6,120,592 have been corrected as follows:

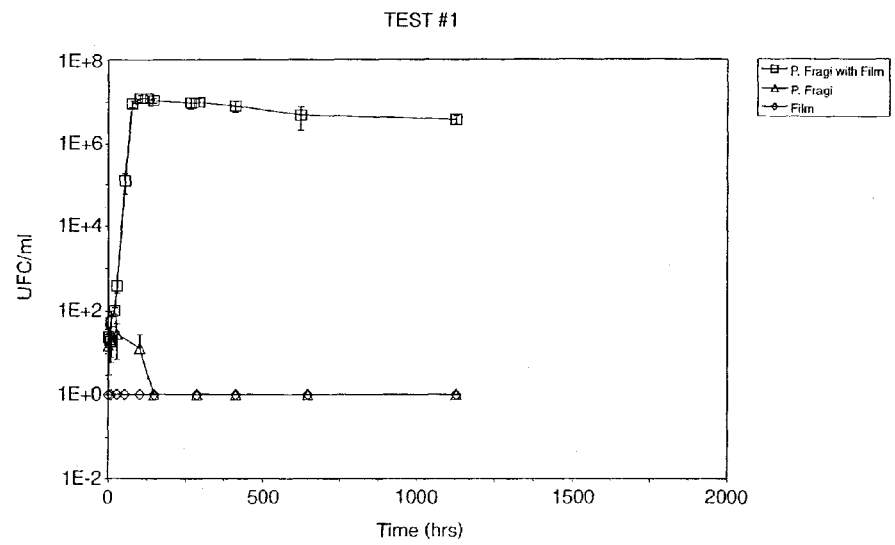

FIG. 13A

UNITED STATES PATENT AND TRADEMARK OFFICE
CERTIFICATE OF CORRECTION

PATENT NO.    : 6,120,592
DATED         : September 19, 2000
INVENTOR(S)   : Brault et al.

It is certified that error appears in the above-identified patent and that said Letters Patent is hereby corrected as shown below:

Figures 13A, 13B, 14A, 14B, 15A and 15B of Pat. No. 6,120,592 have been corrected as follows:

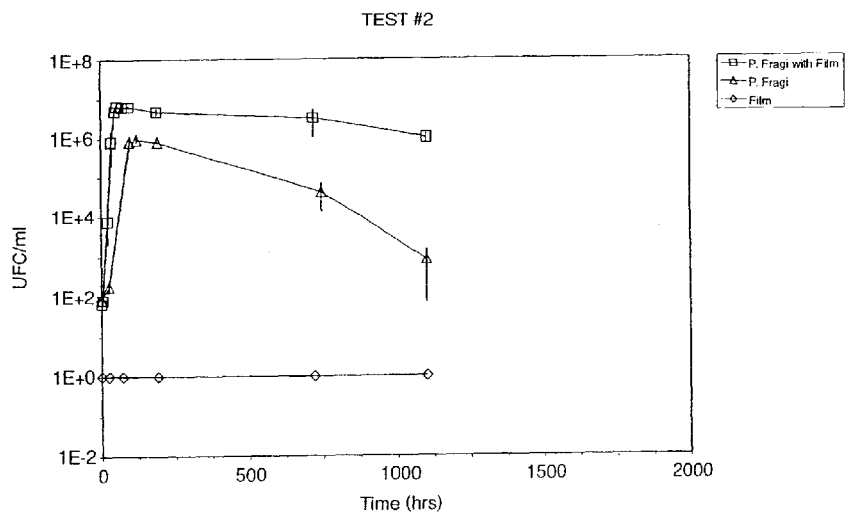

FIG. 14A

UNITED STATES PATENT AND TRADEMARK OFFICE
CERTIFICATE OF CORRECTION

PATENT NO.     : 6,120,592
DATED          : September 19, 2000
INVENTOR(S)    : Brault et al.

It is certified that error appears in the above-identified patent and that said Letters Patent is hereby corrected as shown below:

Figures 13A, 13B, 14A, 14B, 15A and 15B of Pat. No. 6,120,592 have been corrected as follows:

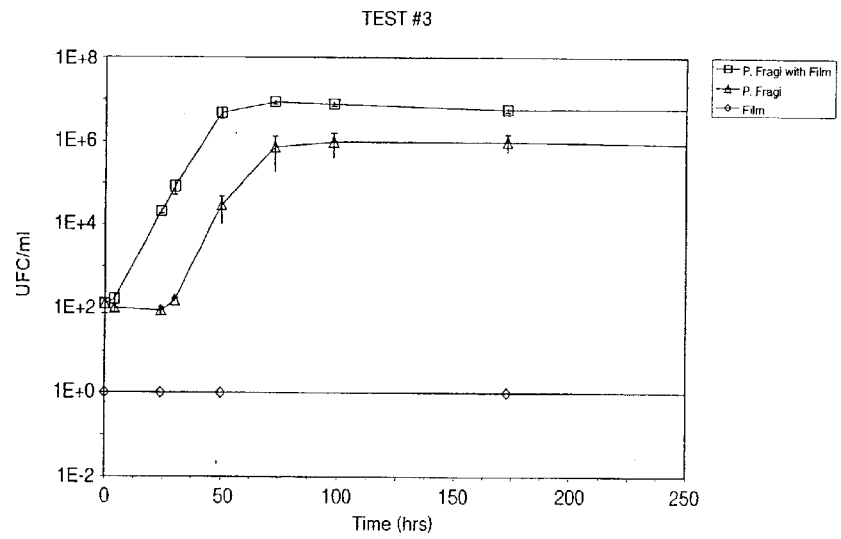

FIG. 15B

Signed and Sealed this

Tenth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,120,592
DATED : September 19, 2000
INVENTOR(S) : Brault et al.

It is certified that error appears in the above-identified patent and that said Letters Patent is hereby corrected as shown below:

Drawings,
Figures 13A, 13B, 14A, 14B, 15A and 15B have been corrected to read as attached.

This certificate supersedes Certificate of Correction issued on June 10, 2003.

Signed and Sealed this

Thirteenth Day of January, 2004

JON W. DUDAS
*Acting Director of the United States Patent and Trademark Office*